(12) United States Patent
Greenwald et al.

(10) Patent No.: US 10,489,014 B2
(45) Date of Patent: Nov. 26, 2019

(54) VENUE AND EVENT INTERFACE

(71) Applicant: Calendre Company, New York, NY (US)

(72) Inventors: Jason Greenwald, East Rockaway, NY (US); Robert Levitan, New York, NY (US); James Glaser, New York, NY (US); Henry Clifford, Brooklyn, NY (US); Adam Alix, Brooklyn, NY (US); Josh Fisher, Brooklyn, NY (US); Daniel Langus, Chappaqua, NY (US); Adam Greenwald, East Rockaway, NY (US)

(73) Assignee: Calendre Company, New York, NY (US)

( * ) Notice: Subject to any disclaimer, the term of this patent is extended or adjusted under 35 U.S.C. 154(b) by 714 days.

(21) Appl. No.: 14/985,999

(22) Filed: Dec. 31, 2015

(65) Prior Publication Data

US 2016/0259500 A1  Sep. 8, 2016

Related U.S. Application Data

(60) Provisional application No. 62/098,985, filed on Dec. 31, 2014.

(51) Int. Cl.
| | | |
|---|---|---|
| *G06F 3/048* | (2013.01) | |
| *G06F 3/0482* | (2013.01) | |
| *G06F 16/25* | (2019.01) | |
| *G06F 16/44* | (2019.01) | |
| *G06F 16/9535* | (2019.01) | |
| *G06F 3/0484* | (2013.01) | |

(Continued)

(52) U.S. Cl.
CPC ........ *G06F 3/0482* (2013.01); *G06F 3/04847* (2013.01); *G06F 16/25* (2019.01);
(Continued)

(58) Field of Classification Search
CPC ...... G06F 3/048; G06F 3/0481; G06F 3/0482; G06F 3/0484; G06F 3/04847;
(Continued)

(56) References Cited

U.S. PATENT DOCUMENTS

| | | | | |
|---|---|---|---|---|
| 7,688,322 B2* | 3/2010 | Kapler | ................... | G06Q 10/06 345/419 |
| 8,484,187 B1* | 7/2013 | Hong | ................ | G06F 17/30554 707/706 |

(Continued)

OTHER PUBLICATIONS

International Search Report and Written Opinion received for International Patent Application No. PCT/US2015/068280, dated May 5, 2016, 6 pages.

(Continued)

*Primary Examiner* — Xiomara L Bautista
(74) *Attorney, Agent, or Firm* — Ziegler IP law Group, LLC

(57) ABSTRACT

A system and method to create and update a live map of venues and events by defining a polygonal area around a pre-determined point, the point being defined by a latitude and a longitude, associating a time window with the polygonal area, associating a geographical region with the polygonal area, creating a dataset including one or more venues identified within the geographical region defined by the polygonal area, and outputting the created dataset to the user interface, wherein the user interface device is configured to generate data objects corresponding to the identified one or more venues in the created data set and present the data objects on the display.

20 Claims, 50 Drawing Sheets

(51) Int. Cl.
　　　*G06Q 30/06*　　(2012.01)
　　　*G06Q 30/02*　　(2012.01)
(52) U.S. Cl.
　　　CPC ........ *G06F 16/444* (2019.01); *G06F 16/9535* (2019.01); *G06Q 30/02* (2013.01); *G06Q 30/06* (2013.01)
(58) Field of Classification Search
　　　CPC .............. G06F 17/30; G06F 17/30061; G06F 17/30557; G06F 17/30867
　　　See application file for complete search history.

(56) References Cited

U.S. PATENT DOCUMENTS

| | | | |
|---|---|---|---|
| 2006/0010100 A1* | 1/2006 | McAvoy | G06F 17/30241 |
| 2011/0173193 A1 | 7/2011 | Ahn et al. | |
| 2011/0270642 A1 | 11/2011 | Schultz | |
| 2011/0306400 A1* | 12/2011 | Nguyen | G07F 17/3218 463/20 |
| 2012/0136895 A1 | 5/2012 | Johnson | |
| 2014/0046934 A1* | 2/2014 | Zhou | G06F 17/30864 707/723 |
| 2016/0005003 A1* | 1/2016 | Norris | G06Q 10/10 705/7.19 |
| 2016/0350868 A1* | 12/2016 | Votaw | G06Q 40/12 |

OTHER PUBLICATIONS

International Preliminary Report on Patentability with Written Opinion received for International Patent Application No. PCT/US2015/068280, dated Jul. 4, 2017, 5 pages.

European Search Report, EP 15876351.6, dated Jun. 12, 2018, 9 pages.

* cited by examiner

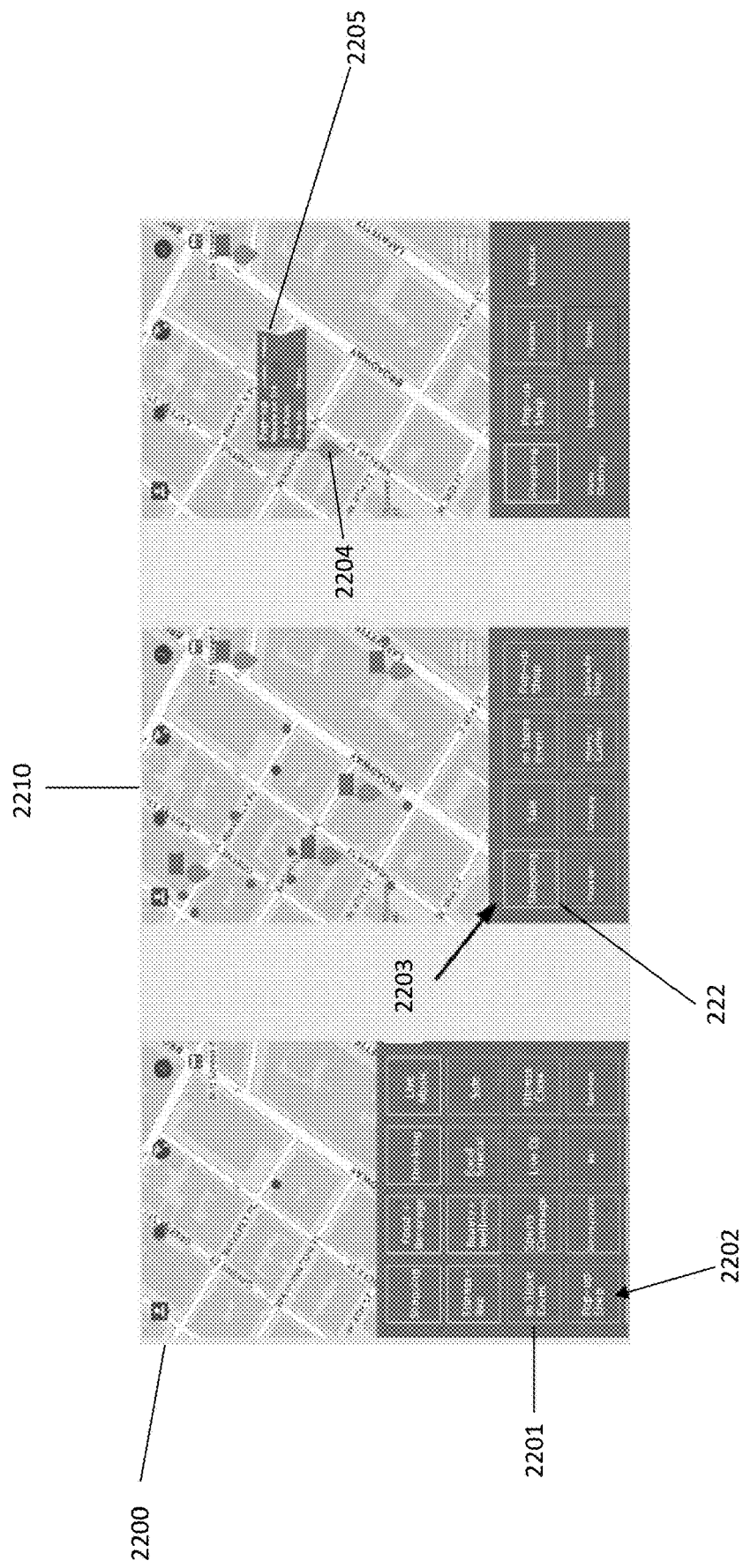

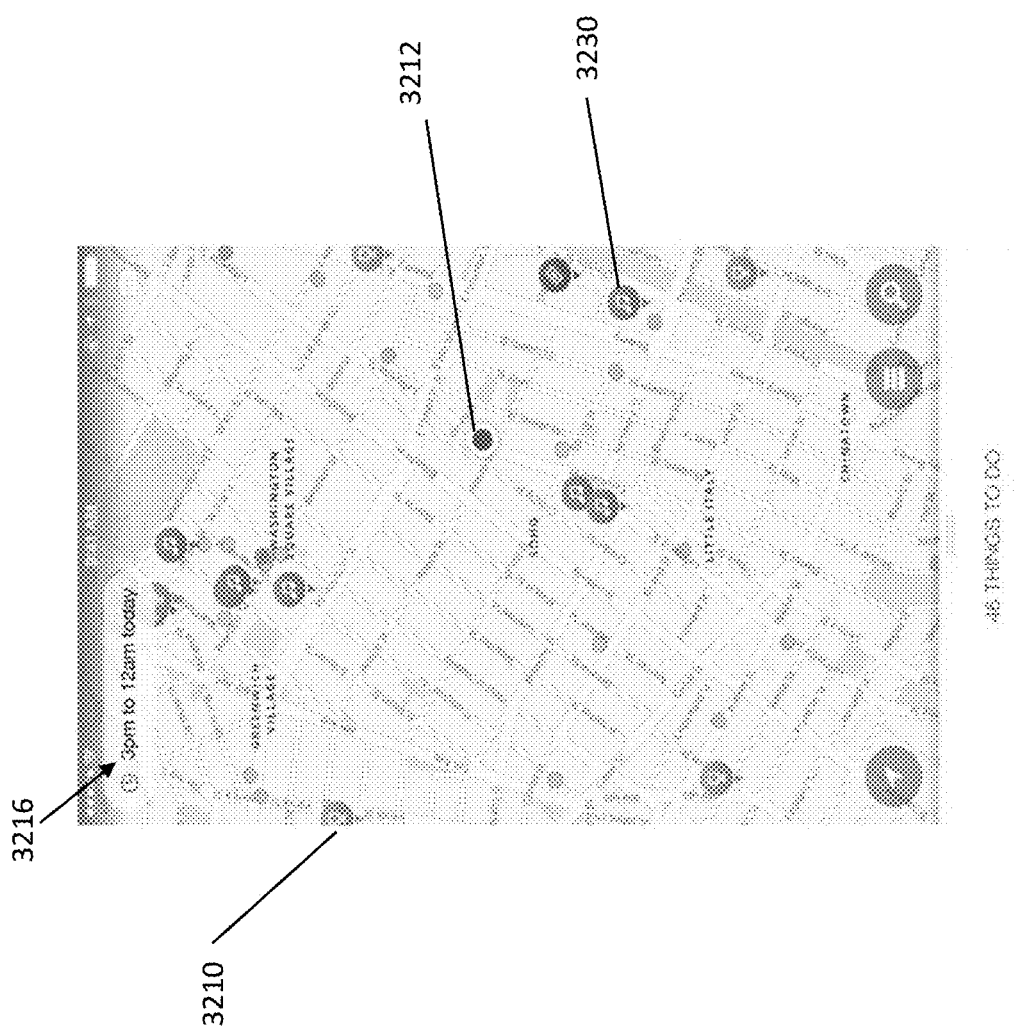

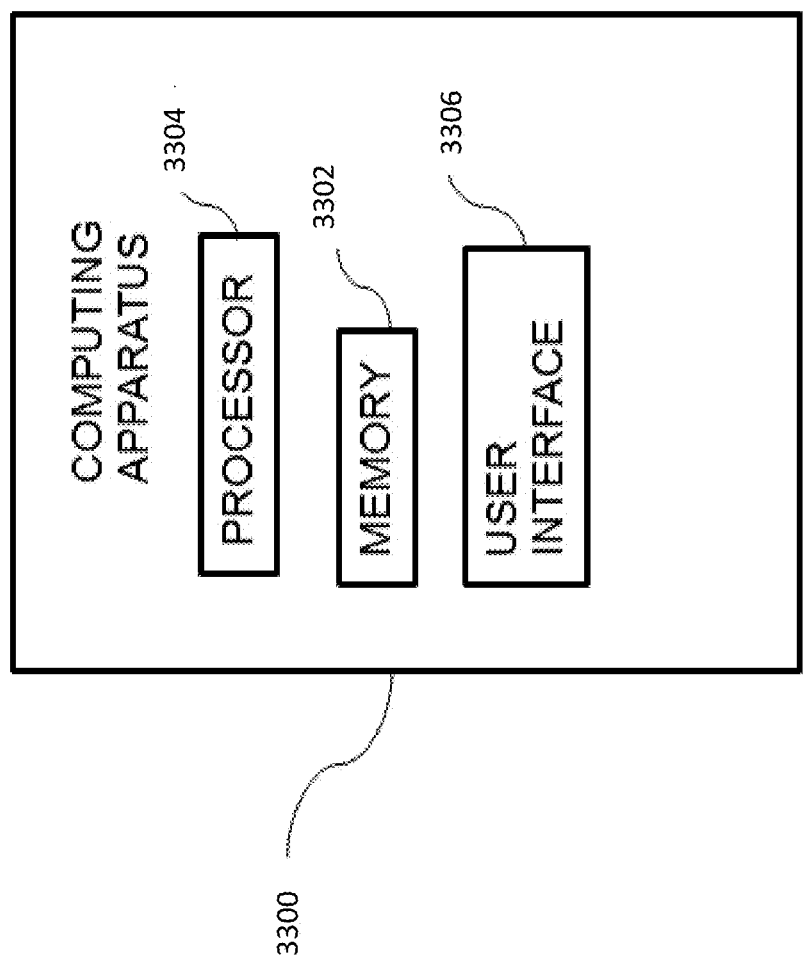

| Category | Food + Beverage | Drinking | Live Music | Entertainment | Fitness + Recreation | Shopping | Business Service | Community | Beauty + Wellness | Travel | Art + Culture | Education + Career |
|---|---|---|---|---|---|---|---|---|---|---|---|---|
| Venue Type | Restaurants | Club | Music Venue | Performing Arts | Sports Facility | Fashion | Banking + ATM | Non-Profit | Body | Places to Stay | Museum | University + College |
| | Specialty Food | Bar | | Places to Fun | Fitness Center | Electronics | Office + Shipping | Religion | Hair + Nails | Transportation | Art Gallery | School |
| | | Brewery | | Movie Theater | Outdoors | Home + Garden | Legal | Public | | | Aquarium | Studio Space |
| | | Winery | | Stadium + Arena | | Health + Beauty | | Government | | | Zoo | |
| | | Distilley | | | | Sporting | | Family | | | Landmark | |
| | | | | | | Auto | | Health | | | | |
| | | | | | | Grocery | | | | | | |
| | | | | | | Specialty Shop | | | | | | |
| | | | | | | Services | | | | | | |
| | | | | | | Books + Leisure | | | | | | |
| Event Type | Brunch | Happy Hour | Music Festival | Show | Play Sports | Sale | | Townhall | | | Fairs + Festivals | Conference |
| | Food Special | Bar Activity | Live Band | Movie | Fitness Class | In-store Event | | Religious | | | Exhibit | Talk |
| | | Bottle Special | Live DJ | Live Sports | Outdoor + Adventure | Popup Shop | | Community Service | | | Cultural Event | Class |
| | | Tasting | | Games | | | | Kids Event | | | Parade | |
| | | | | | | | | Pet | | | Tour | |
| | | | | | | | | Fundraiser | | | Book Signing | |
| | | | | | | | | Block Party | | | Talk | |
| Venue Features | Outdoor Seating | Outdoor Seating | Outdoor Seating | Outdoor Seating | | | | | | | | |
| | Rooftop | Rooftop | Rooftop | | | | | | | | | |
| | Waterfront | Waterfront | Waterfront | | | | | | | | | |
| | Darts | Darts | | | | | | | | | | |
| | Billiards + Pool | Billiards + Pool | | | | | | | | | | |
| | Shuffle Board | Shuffle Board | | | | | | | | | | |
| | Beer Pong | Beer Pong | | | | | | | | | | |
| | Arcade Games | Arcade Games | | | | | | | | | | |
| | Ping Pong | Ping Pong | | | | | | | | | | |

FIG. 34

VENUE AND EVENT INTERFACE

FIELD

The aspects of the present disclosure relate generally to the field of filtered information display systems, and in particular a system for determining and generating a venue and event map interface for a user interface of a device.

BACKGROUND

One of the largest growing areas of internet usage relates to filtered information display systems. In particular, offering users comprehensive information filtered by time and place is of increasing importance. For example, someone may be standing on a street corner using a mobile device, such as a mobile phone, and want to know what events or activities might be available in a certain area, such as the area of the phone. As another example, a person with a mobile device might desire to know what is happening in a certain city on a certain date within a certain period of time. Current systems generally provide static, pre-stored information about venues and activities. It would be advantageous to be able to provide up-to-date and real-time information regarding events and activities that is filtered based on time and location.

Current digital mapping systems have been developed to retrieve information from a server and overlay this information on a digital map. When a user engages with the map and triggers the search, information is displayed based on historic and documented information about a location relating to the search term or query to the database. Some digital maps may also offer information displayed on the map such as transportation hubs and well known venues. However, this type of information does not change or update dynamically based on time.

Systems such as that described in U.S. Pat. No. 7,688,322 create data visualization on a map. Other work such as that described in U.S. Patent Publication No. 2006010100 provides digital information in relation to time about locations. However, there is currently no facility or service that aggregates venue and event data, stores and organizes the data, and allows for presentation of such in a useful, easy to use interface, using the capabilities of location tracking and time tracking of a mobile computing device.

In particular, current systems fail to aggregate, store, and organize data in a format that allows for an interface display to represent both location and time based data values. It would be advantageous to be able to generate filter based discovery of information based on what is available at a place at a particular time, using the devices internal clock and geolocation tracking capabilities.

Accordingly, it would be desirable to provide a system that addresses at least some of the problems identified above.

SUMMARY

As described herein, the exemplary embodiments overcome one or more of the above or other disadvantages known in the art.

The aspects of the disclosed embodiments provide an improved system for generating filtered information and displaying filtered information. The problem addressed by the disclosed embodiments is solved by the subject matter of the independent claims. Further advantageous modifications can be found in the dependent claims.

According to a first aspect of the disclosed embodiments, the above and further objects and advantages are obtained by a device. In one embodiment, the device includes a processor and a user interface coupled to the processor. The device is configured to execute machine readable instructions that cause the processor to define a polygonal area around a pre-determined point, the point being defined by a latitude and a longitude, associate a time window with the polygonal area, associate a geographical region with the polygonal area, create a dataset including one or more venues identified within the geographical region defined by the polygonal area, and output the created dataset to the user interface, wherein the user interface device is configured to generate data objects corresponding to the identified one or more venues in the created data set. The data objects can be presented for example, on a user interface of the device. The aspects of the disclosed embodiments advantageously provide a "live" map of venues where events are taking place. The map is time based and the view of the map will be reconfigured at different points in time. Areas, such as a neighborhood, can be quickly explored to identify venues where certain types of events are taking place.

In a first possible implementation form of the device according to the first aspect as such, the device is a mobile communication device such as smart phone. The aspects of the disclosed embodiments can be easily accessed and utilized via portable devices.

In a second possible implementation form of the device according to the first aspect as such, the device is a computing device with a display. The aspects of the disclosed embodiments can be accessed using computers and smart displays, for example.

In a third possible implementation form of the device according to the first aspect as such or anyone of the first and second possible implementation forms of the first aspect as such, the device is a mobile computing device. The aspects of the disclosed embodiments can be accessed using tablets, phablets, watches, and any other device that is capable of connecting to a network, such as the Internet, for example.

In a fourth possible implementation form of the device according to any one of the second and third possible implementation forms of the first aspect as such, the display is a user interface that is located remotely from the computing device. The aspects of the disclosed embodiments can be accessed using terminals, such as a terminal in a hotel or transportation hub, for example.

In a fifth possible implementation form of the device according to the third and fourth possible implementation forms of the first aspect as such, the device is part of a kiosk type arrangement. The aspects of the disclosed embodiments can be accessed using a smart terminal or a kiosk in a mall or street corner, for example.

In a sixth possible implementation form of the device according to the first aspect as such or any one of the first through fifth possible implementation forms of the first aspect as such, the device is configured to modify data objects in the dataset that have time-based events occurring during the associated time window. The venues and venues where events are taking place can be presented as data objects on the display. The aspects of the disclosed embodiments enable distinguishing venues from venues where events are taking place by highlighting those venues there are events occurring during the specified time window. As the time changes, the data objects in the dataset will also change and the user interface will be updated, providing the user with an up to date or up to the minute time based view of venues and venues where events are taking place.

In a seventh possible implementation form of the device according to any one of the first through sixth possible implementation forms of the first aspect as such, device is configured to modify the data objects by changing an appearance of the data objects on the user interface. The data objects can be modified in any manner, such as appearance, so that a data object representing a venue where there is no event taking place can be distinguished from another data object representing a venue where there is an event taking place, during a specified time window together with other applied filters. The aspects of the disclosed embodiments enable distinguishing venues from venues where events are taking place by highlighting those venues there are events occurring during the specified time window. This makes it easier to identify certain venues.

In an eighth possible implementation form of the device according to the first aspect as such or anyone of the first through seventh possible implementation forms, the device is configured to generate a filter selection menu on the display of the user interface and detect a selection of one or more filter options from the filter selection menu, wherein upon detection of a selection of one or more of the filter options, the device is configured to update the dataset to include only venues and events corresponding to the detected filter options within the specified time window and update or modify the user interface to present the data objects corresponding to the updated dataset. The aspects of the disclosed embodiments provide a drill down type of filter menu and selection process. The user can filter the venues by type and event, and the user interface will show only those venues and events corresponding to the selected filter options.

In a ninth possible implementation form of the device according to any one of the first through the eighth possible implementation form of the first aspect as such, an initial state of the filter selection menu provides a filter selection icon for all types of venues and events possible in an initial dataset of the created dataset based on a time window. The initial dataset will generally include all possible venues within the defined area, subject to the specified time window. All of the possible options corresponding to the identified venues will be made available on the filter menu. As filters are selected and applied the initial dataset is modified to include the corresponding venues and venues with events occurring during the specified time window.

In a tenth possible implementation form of the device according to any one of the first through ninth possible implementation forms of the first aspect as such, the device is configured to detect a selection of one or more of the filter selection icons of the filter selection menu, reconfigure the initial time-based dataset to include only venues and events corresponding to the selected one or more filter selection icons, and reconfigure a display of data objects on the user interface device to present data objects corresponding to the reconfigured dataset. When a filter selection is made, the map interface and view of the map will be updated to show only those venues that correspond to the detected filter selection(s). This provides a more efficient and faster way to identify venues where the desired events during the specified time periods are taking place.

In an eleventh possible implementation form of the device according to the tenth possible implementation form of the first aspect as such, the device is configured to highlight data objects of the reconfigured data set presented on the user interface device. The aspects of the disclosed embodiments make it easy to identify venues where the desired events during the specified time period are taking place.

In a twelfth possible implementation form of the device according to the first aspect as such, the device includes a filter selection device that is configured to receive an input to apply one or more filters to the one or more venues in the created data set and wherein the processor is configured to execute machine readable instructions based on the applied one or more filters to redefine the created dataset and reconfigure the data objects presented on the user interface device to present the data objects corresponding to the redefined data set. The initial data set presented on a display will show all venues available within the polygonal area for a pre-defined time window. A filter menu will also be presented that identifies all available filter options applicable to the available venues shown. The user can select one or more of the filter options to narrow the field of venues shown. When a filter selection is made, the data set will be reconfigured to include only those venues and events corresponding to the filter selection, in a drill down fashion.

In a thirteenth possible implementation form of the device according to the twelfth possible implementation form of the first aspect as such, selection of one filter from the one or more filters will cause the processor to reconfigure the filter selection menu to present only filter options that correspond to the corresponding venues and events. In an initial state, the filter menu will include filters for all available venue and event types presented on the user interface. Selection of a filter, such as restaurants for example, will cause the processor to update the user interface to show only restaurants. The filter selection device will reconfigured the filter menu to show only filter options pertaining to restaurants and events occurring in those specific restaurants shown in the polygonal area, within the pre-defined or specified time window.

In a fourteenth possible implementation form of the device according to any one of the preceding possible implementation forms, the one or more events are linked to a latitude, a longitude and a time. The aspects of the disclosed embodiments enable a user to not just identify venues where certain types of events take place, but also identify venues by when the specific events take place. In this manner, the map generated using the aspects of the disclosed embodiments for a specified area can look different at one point in time relative to another point in time, as the venues with events change and the dataset is updated.

In a fifteenth possible implementation form of the device according to any one of the preceding possible implementation forms, the processor is configured to automatically update the created or reconfigured dataset based on a change in time, and output the updated dataset to the user interface. The change of time can be based on one or more of a change in time as determined by the clock of the device or by the user manually setting or adjusting a time filter. The occurrence of events at the different venues will change over time. Thus, the presentation of the dataset via the data objects on the user interface of the device will change over time. The aspects of the disclosed embodiments will automatically update the dataset and data objects as the events change and modify the user interface to present a current dataset of data objects on the display.

In a sixteenth possible implementation form of the device according to the fifteenth possible implementation form, the processor is configured to automatically update the created dataset based on a change in the latitude and longitude of the pre-determined point around which the polygonal area is defined. As a location of the device changes or varies, the area defined by the polygonal area on the user interface of the device will automatically update. Location changes and information can be determined and set by the device itself, using geo-location capabilities of the device, or manually adjusted by the user defining a specific location or area. As the location of the device, or the desired location of the device changes, the venues and events around the updated location will also change. The aspects of the disclosed embodiments will automatically detect the change in location of the device and update the venue and event dataset to include the venues within a pre-determined or defined region that currently surrounds the device, as well as update the events taking place based on the set time filter and filters selected in the filter selection menu. In a seventeenth possible implementation form of the device according to the first aspect as such, the processor is configured to identify at least one event within the defined polygonal area, the at least one event being linked to a latitude, a longitude and a time, and output an instruction to the output device to generate a data object corresponding to the at least one event. In an initial state of the dataset, all venues and events occurring at those venues, during the specified time window, can be presented as data objects on the user interface. When a filter is applied, such as a time window or event category, only venues with events taking place within the time window are displayed. As further filters are applied, the dataset becomes more refined and limited.

In an eighteenth possible implementation form of the device according to the seventeenth possible implementation form, the user interface presents the data objects on a display, the polygonal area being presented on the display and the data objects located within the polygonal area. The aspects of the disclosed embodiments will present the data objects representing the venues and events on a user interface that includes a display, such a map overlay display.

In a nineteenth possible implementation form of the device according to the first aspect as such, the user interface comprises a display, and the device is configured to cause the output device to present the data objects on the display, wherein the data objects correspond to the one or more venues, the one or more venues defined by a latitude and longitude and time within the geographical region defined by the polygonal area. The aspects of the disclosed embodiments present the venues as data objects on a display. The venues can be represented by icons that are defined by their locations within the polygonal area.

In a twentieth possible implementation form of the device according to the nineteenth possible implementation form of the first aspect as such, the device is configured to cause the user interface to change an appearance of one or more of the data objects presented on the display, the one or more data objects with the changed appearance corresponding to venues with events occurring during the associated time window. Venues with events taking place within the selected time window will be highlighted in some fashion to make it easier and faster for the user to identify such events.

In a twenty-first possible implementation form of the device according to the twentieth possible implementation form of the first aspect as such, the device is configured to generate a filter selection menu on the display of the output device and detect a selection of one or more of the filter options from the filter selection menu, wherein upon detection of a selection of the one or more of the filter options, the device is configured to generate at least another dataset of venues and events that correspond to the associated time window and the selected one or more of the filter options and cause the output device to change an appearance of the display to show only data objects corresponding to this new or changed dataset. The aspects of the disclosed embodiments provide a drill down filter menu. The filters in the menu present all of the available options corresponding to the venues and events currently being presented on the display. When a filter is selected, only those venues and events pertaining to the selected filter(s) are displayed.

In a twenty-second possible implementation form of the device according to the twenty-first possible implementation form of the first aspect as such, the device is configured to limit a number of data objects included in the dataset based on one or more of a type of venue and a type of event based on detection of a selection of one or more of the filter options on the filter selection menu. The aspects of the disclosed embodiments advantageously limit the data set of data objects (venues and events) presented on the display to only the available data objects as filter selections are made. This reduces the amount of information presented on the user interface, which conserves computing resources, and speeds the identification of relevant information.

In a twenty-third possible implementation form of the device according to the twenty-first and twenty-second possible implementation forms of the first aspect as such, the device is configured to adjust the time window to a new time window and reconfigure the data objects in the new or modified dataset to present only data objects associated with the new time window. The change or adjustment of the time window can be based on a detected change in time of a clock of the device or by the user adjusting a time filter. The aspects of the disclosed embodiments will advantageously change and update the display of venues and events based on a selected time window. Since the events taking place at venues are time based events, the display of venues and events will be configured differently at different points of time.

In a twenty-fourth possible implementation form of the device according to the first aspect as such, the aspects of the disclosed embodiments organize content in a unique way by combining event and venue data in a single taxonomy dataset.

In a twenty-fifth possible implementation form of the device according to the first aspect as such, the aspects of the disclosed embodiments use the device's location tracking capabilities and internal clock to filter a default display.

In a twenty-sixth possible implementation form of the device according to the first aspect as such, the aspects of the disclosed embodiments enable a filter "drill down". In accordance with the aspects of the disclosed embodiments, the display and filter system of a tag based overlay represents an organized raw data set representing every venue and event based on a place and time.

In a twenty-seventh possible implementation form of the device according to the first aspect as such, the open platform and interaction between users and the content interface experience, including the addition of user generated content, saving and sharing content, and tracking user preferences enables the building and creation of new layers of content relevance and usability on the platform.

According to a second aspect, the process and system of the disclosed embodiments includes acquiring data about events and venues; organizing the data under a single taxonomy and tag system; applying the capabilities of a device to track location and time to filter information; algorithmic logic generates the filter and visual overlay; and user actions on the platform to filter one or more of time, venue types and event types.

According to a third aspect, the system and method of the disclosed embodiments include generating a digital map displayed on a mobile computing device using the device's geo-location and time of the devices internal clock.

In a first implementation form of the third aspect as such, the system and method includes providing a visual representation of location data on the map.

In a second implementation form of any one of the preceding implementation forms of the third aspect as such, the system and method includes displaying a complete set of unfiltered information on a map interface.

In a third implementation form of any one of the preceding implementation forms of the third aspect as such, the system and method includes overlaying content on the map interface, where the content is automatically generated and dynamically updated, requiring no input from the end user.

In a fourth implementation form of any one of the preceding implementation forms of the third aspect as such, the system and method provide a digital map that uses the internal capabilities of a computing device to generate an information layer on top of the map based on at least the device's place and time.

In a fifth implementation form of any one of the preceding implementation forms of the third aspect as such, no user action is required to be input to gather information about the visible map area.

In a sixth implementation form of any one of the preceding implementation forms of the third aspect as such, the map and tags are automatically generated without any user input based on the location and time of the device. This advantageously reduces or eliminates the need for a user to search or input some form of information.

In a seventh implementation form of any one of the preceding implementation forms of the third aspect as such, the aspects of the disclosed embodiments provide a map with a tile type interface for visually displaying and overlaying map based information.

These and other aspects and advantages of the exemplary embodiments will become apparent from the following detailed description considered in conjunction with the accompanying drawings. It is to be understood, however, that the drawings are designed solely for purposes of illustration and not as a definition of the limits of the invention, for which reference should be made to the appended claims. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

In the following detailed portion of the present disclosure, the invention will be explained in more detail with reference to the example embodiments shown in the drawings, in which:

FIGS. 22A-22C illustrates exemplary user interfaces for a system and device incorporating aspects of the disclosed embodiments;

FIG. 33 illustrates an exemplary architecture for a computing device that can be used to practice aspects of the disclosed embodiments.

FIG. 34 illustrates Table 1.

DETAILED DESCRIPTION OF THE DISCLOSED EMBODIMENTS

The aspects of the disclosed embodiments are directed to a system and method for presenting venue and event data using geo-location and time data. A "live" interface is provided in the form of an overlay for a location and time-based digital map. The aspects of the disclosed embodiments identify venues where events can take place, and further limits and updates the display of these venues to show only those venues where certain events, or types of events, are taking place within a certain time period. By leveraging the geo-location data of the device, together with time data, the event and venue data can be displayed on a display of a computing device. In an exemplary embodiment, the venue and event data content can overlayed on a map interface, which is automatically generated and dynamically updated, requiring no input from the end user. As time continues to change the data content will also change. This results in a constantly updating map.

Figure 1:
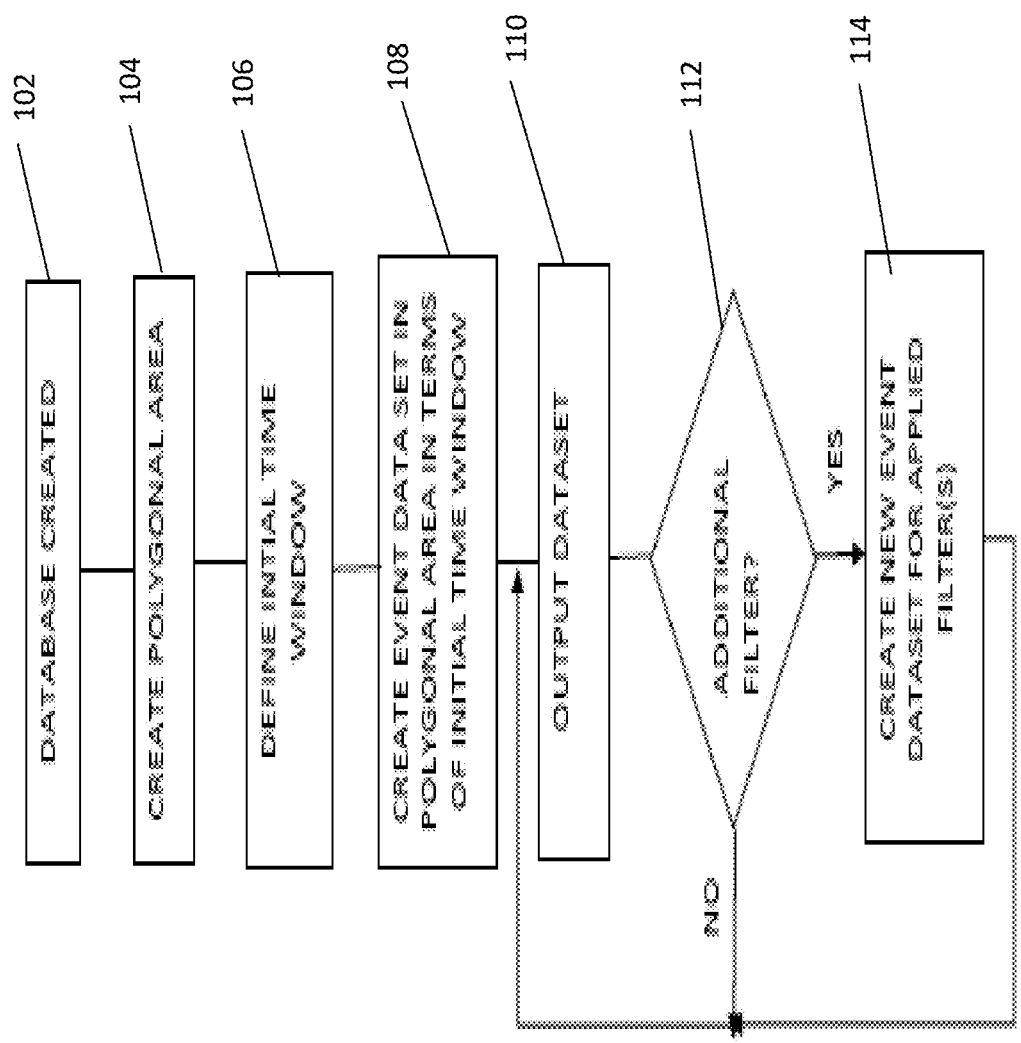
FIG. 1 is a block diagram of an exemplary process incorporating aspects of the disclosed embodiments.

Referring to FIG. 1, an exemplary process incorporating aspects of the disclosed embodiments is illustrated. In this example, a database of venue and event data is created 102. As is generally described herein, a "venue" refers to a given space that is defined by a set of information that is specific to that space. A venue is a physical location where an event can take place. A venue is a location that could be described by or in one or more of the following ways:

A specific latitude and longitude;
Indoors or outdoors;
Representing an area or establishment.

The examples above are merely representative, and any suitable manner of describing a venue can be included. The location data for a venue can include one or more of the geographical coordinates, address or other spatial data that will allow the venue location to be identified and plotted, such as on a map for example.

An "event" refers to any information stored representing an occurrence of an activity at a given space. An "event" is something that happens or takes place at a venue during a particular window of time or at a particular time. The activity can include any suitable event or activity that can take place or in conjunction with a venue.

Information representing physical things that change over time are all around us. This information is unique in that it includes the properties of space and time and has a specific purpose of physical discovery. For example, restaurants, bars, parks, parking garages, hiking trails or other places are physical locations and tangible objects. Information related to these places or locations can be stored as attributes, including properties such as a specific spatial bound that also includes the temporal property of when the information is accessible at this location. This information can also include events taking place at or around these locations, such as live music or shopping sales. The information might also include hours of operation or other key properties, such as menus, activities and scheduled offerings.

The venue and event information can be captured, stored and normalized to include parameters such as the published time, meaning the time at which the information was made available, the occurrence time, meaning the time at which the information is relevant in regards to the space or location, and the spatial or location based bounds of the information.

The information can be collected and processed into a data set from any one of a number of generally publically available or accessible sources. These can include for example, all publicly available information channels, including information published on a website such as a web announcement, media outlets or information received from users of the platform and system that is described herein. Information can also be received and collected from email notifications and information read or heard through any public means that may exist in the physical world.

A polygonal area is defined 104. The aspects of the disclosed embodiments create an interface or overlay, that can be used to create a digital map of venues and venues with events, as is described herein. In one embodiment, the polygonal area is generally defined by geographical coordinates in the form of a latitude and longitude. In alternate embodiments, any suitable number and types of variables can be used to define the polygonal area or region. These variables, such as the geographical coordinates, can be set by the user or automatically determined based on a position, or desired position, of the device. In one embodiment, the polygonal area can be provided in a visual format, such as a map interface on a display of a device, as will be further described herein.

In one embodiment, an initial time window or period is defined 106. The aspects of the disclosed embodiments allow the time window to be set using a time clock of the device, or by the user. For example, the aspects of the disclosed embodiments enable a user to manipulate a filter device through a visual display of the device, allowing for adjustments of start times and end times. This time adjustment can result in an automatic filtering of the dataset. The aspects of the disclosed embodiments define events that occur in a venue in terms of a latitude, longitude and time. A map of venues and events that is generated by the system and device of the disclosed embodiments will change over time. Thus, the map at one point in time can look different relative to another point in time, whether it is in the past or the future.

An event data set is created 108, defined by the polygonal area within which venue data, and venue with event data is identified. As described herein, the venues that are available within the polygonal area are identified or linked together with the venues in which events are taking place, during a defined time window. The data set can be represented in the polygonal area in terms of icons or data objects.

The data set is outputted 110 to a user interface, such as a display. The information of the data set can be displayed in visual format, list format, textual format or any suitable manner of presenting information to a user. In one embodiment, data objects are used to represent the venues and venues with events, and are output and presented on the display. The venues and venues with events can also be represented by graphical objects such as icons on the display. As one example, the complete set of information pertaining to venues and venues with events in a given time is compiled and categorized based on a taxonomy of characteristics, as will be described herein. This taxonomy of location and time based characteristics is then presented as a visual display, such as an overlay for a digital map.

The aspects of the disclosed embodiments allow one or more filters to be applied to the data set. Through the taxonomy categorizing the information of the dataset as well as groups of other characteristics and attributes of the venues and events, items within the dataset can be further filtered through a faceted approach. For example, a dataset filtered by time and place may contain the categories of restaurant venues together other categories or categorizations. A user may add the additional filter "restaurants" and then receive updated information from a newly created or updated dataset based on the time, space and restaurants filter. Users can add and remove filters to manipulate and change the information from the dataset and the presentation of that information on, for example, the display of the device.

The "filters" as will be described herein, will generally utilize "terms" that are connected to the physical space of a venue, or type of event. Each time a filter is applied to a current dataset of information, a new dataset can be created 114. The new data set, compiled in a manner as generally described above, will be outputted and presented on the user interface. In one embodiment, when one or more filters are applied, the user interface or display is reconfigured to show only those venues and venues with events that correspond to the applied filters. The aspects of the disclosed embodiments allow application of multiple filters to the data set, which enables further modification and refinement of the outputted data set. In this manner, the aspects of the disclosed embodiments advantageously provide a "live" map of venues where events are taking place.

In one embodiment, the "live map" that is generated from the dataset described above, can be presented on a display of a device, such as a smart phone, computing device or terminal. A "device" or "devices" as that term is generally presented herein, includes, but is not limited to electronic device, mobile communication devices, computing devices, terminals, kiosks, watches, tablets, projected visualizations or any other such device that generates a display or delivers information. The delivery of information can include audio, visual, any combination or singular use thereof. This can also include an audio device that is projecting audio information that is filtered by time and place, a mobile phone that is projecting a digital map on a display, or a watch that is providing a list of items.

In an exemplary embodiment, in addition to text based and audio based delivery of the dataset, the aspects of the disclosed embodiments provide for the information of the dataset to be represented through a visual graphics display. In one embodiment, the display exists on top of a map, represented virtually or using the physical presence of reality to offer a geographical reference to the visual information provided.

Figure 2:
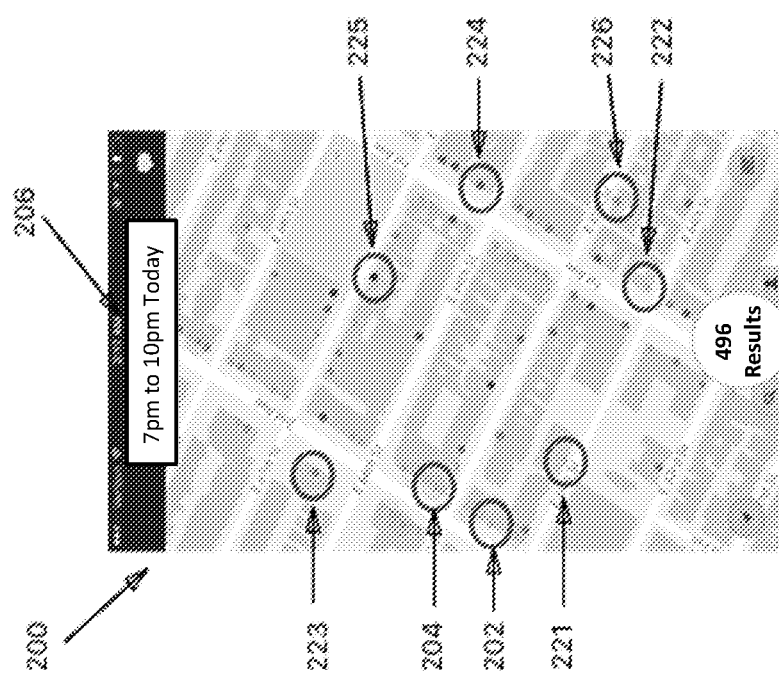
FIGS. 2-6 illustrate exemplary map interfaces for a system and device incorporating aspects of the disclosed embodiments.

One method of map-based graphic overlay includes iconography representing activity on the map, displaying the information categorized through the taxonomy by color, shape, size and other attributes or representations. An example of this can include a map that has venues and venues with events categorized with the taxonomy as containing different key defining features displayed in shapes and colors to represent those features. An example of this is shown in FIG. 2.

In this example, the live map is time based and the view of the map will be reconfigured at different points in time. Time is filtered as a range of information that occurs between a set start time and an end time. This can be referred to as "now" or "real time", which includes information that is published within the filtered start-time and end time range. This can also include a time range that is set for the past or future, not inclusive of the current "real-time" period.

Venues include the attribute of location. As a location of the device changes, or a user redefines an area to be encompassed by the polygonal area, the dataset of venues and venues with events will change and update, as will the presentation and display of the information from the dataset. Spatial or geo location tracking of the venues can be filtered by a set geographical or spatial range. This can include a source's latitude or longitude, or a point on the map, with an additional bound set from that point. In one embodiment, the spatial filter may be set by an input that defines a set bound outside of the base location of the source point. This can include the user redefining the area to be encompassed by the polygonal area, such as by moving or selecting a point on a map.

The application of filters to further refine the data set, will allow the map representation to be re-configured to provide more precise results. In this manner, areas such as a neighbourhood can be quickly explored to identify venues where certain types of events are taking place. One favorable methodology displays the complete available information set that falls within a filtered time place. The visual display and textual representations are generated directly from the complete available information source that fall within any time and place filter. The result is an information source generated from any given time and place that offers complete access to all information filterable within any information set, reflecting the complete set of information available.

Referring to FIG. 2, an exemplary display of a map interface 200 on a computing device is illustrated. In this example, the reference points 202 on the map interface 200 represent venues. The highlighted reference points 204 represent venues where events are taking place during defined time periods. The reference points 204 are highlighted in some fashion to distinguish the venues where events are taking place from the venues where there are no events taking place. The aspects of the disclosed embodiments advantageously identify a location of every venue within a certain area. When a venue is having an event, the representation of that venue, reference point 204, is modified relative to other venues 202, to illustrate the occurrence of an event at the venue. In the example of FIG. 2, the reference points 204, or venues where events are taking place, have or present a "halo" effect, relative to reference points 202. In alternate embodiments, any suitable representation can be used.

The area defined by the map interface 200 is generally in the form of a polygonal area. In one embodiment, the polygonal area will be defined around a particular point, such as the geographical location of the device. In alternate embodiments, the geographical location around which the polygonal area is formed can be any suitable point or location, as will generally be described herein. The point can be set by the device or manually by a user.

The reference points 204, or venues where events are taking place, are time based. In one embodiment, the map interface 200 that is presented is a time-based map interface. As is shown in block 206 on the map interface, a time period is set, which in the example of FIG. 2 is "6 pm to 11 pm today." Thus, the venues with events identified by the reference points 204 are those venues where there events taking place in the time period "6 pm to 11 pm today." The aspects of the disclosed embodiments advantageously provide a location and time based map interface, or "live map", which will have a varied appearance as time changes. The map interface 200 can have a certain configuration or appearance during the time period of "6 pm to 11 pm today", and another or different configuration and appearance during the time period of "1 pm to 5 pm today", for example.

Referring again to FIG. 2, in one embodiment, the venues 202 can include any one or more of any number of different types of venues. For example, venue 221 could be a shopping venue, venue 222 a place to eat, venue 223 a live music establishment, venue 224 a bar or club, venue 225 a movie theatre and venue 226 a salon or spa. This list of venues, together with the layout and arrangement is merely exemplary, and it will be understood that the map interface 100 can show any one of a number of different types of venues, in a particular layout and arrangement. The different venues 221-226 can be distinguished from one another in any suitable manner, including shape, style, size or color, for example.

Figure 3:
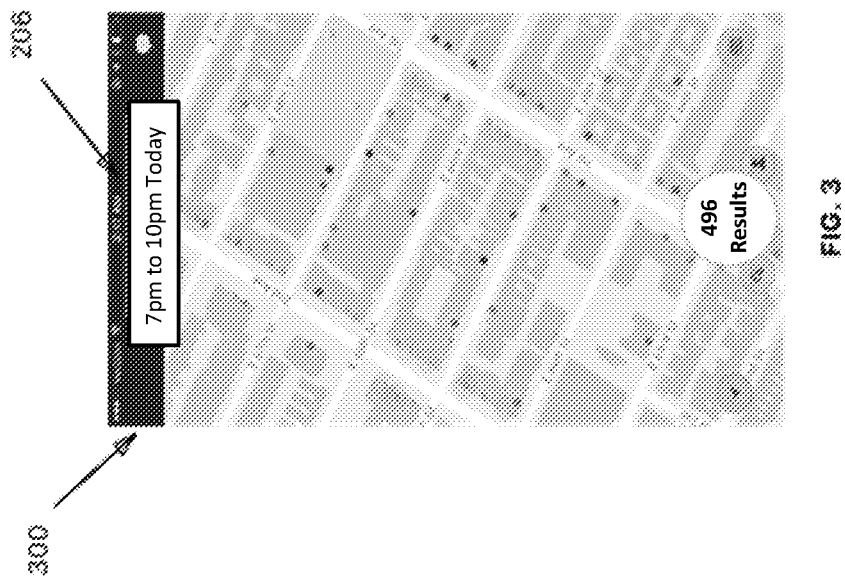
Figure 4:
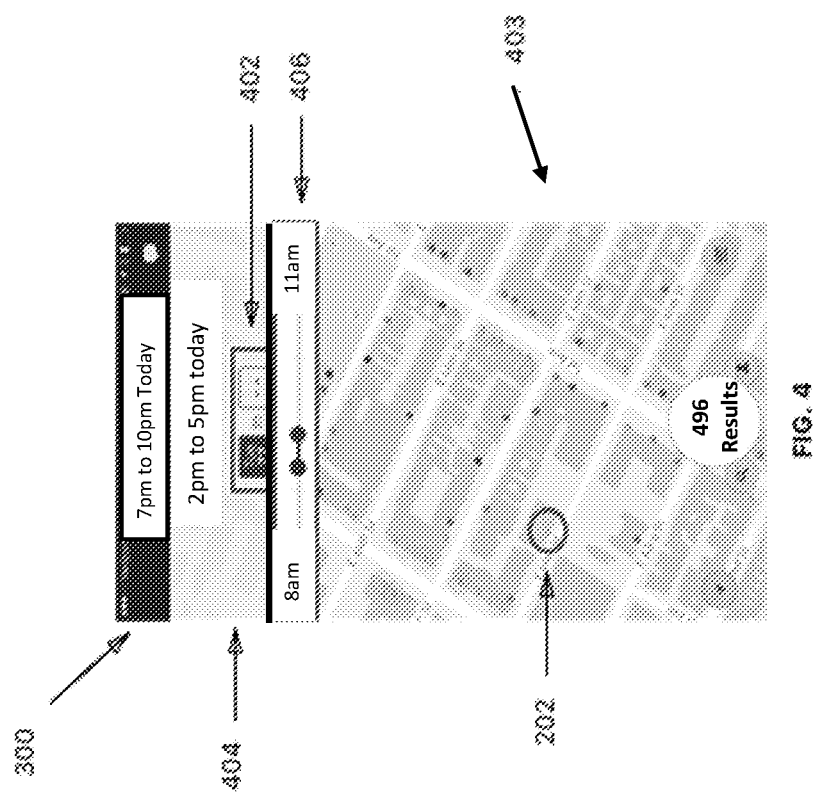
Figure 5:
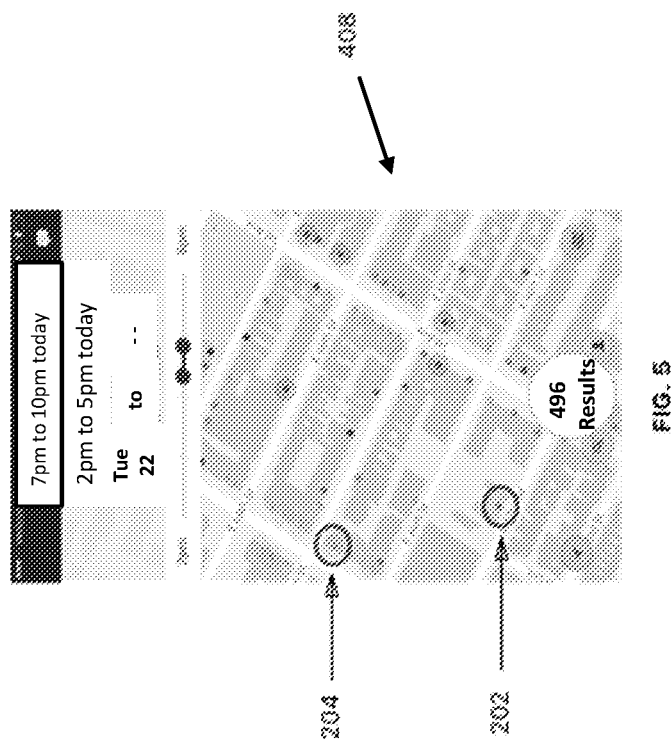

FIGS. 3-5 illustrates the time varying aspects of the disclosed embodiments. In the example of FIG. 3, the time window 202 is "7 am to 10 am today." FIG. 4 illustrates an adjustment pane 402 for the time window 402. As is shown in the example of FIG. 3, the date selection filter 304 allows for the date or date range to be set. A time filter 306, which in this example is a slider, allows for setting a specific time, or a range of times. With the date and time settings of FIG. 3, a particular arrangement 300 of venue/event icons is illustrated.

In the example of FIG. 5, the time settings have been changed to "6 pm to 9 pm today", from the "7 am to 10 am today" shown in FIG. 4. The time window of the map can be adjusted to any suitable time, past, present and future. While the geographical area is the same as that shown in FIG. 4, the arrangement 408 of venue/event icons in FIG. 5 is different. The icons 204 in FIG. 5 that represent venues where events are taking place are highlighted, while icons 202 that represent venues are not. Distinguishing icons 202 from icons 204 in some manner makes it easy to identify venues from venues where events are taking place.

Figure 6:
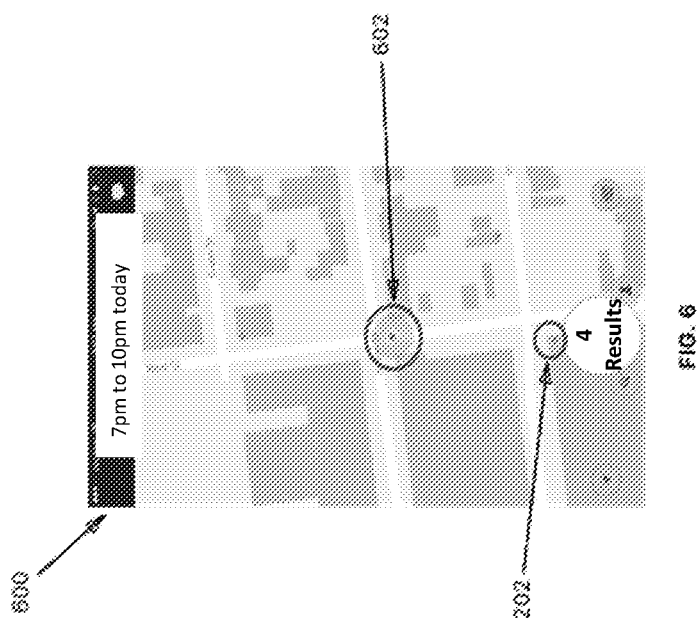

The aspects of the disclosed embodiments allow the area within the polygonal region represented by the map interface 200 of FIG. 2 to be changed. In the example of FIG. 6, the area of map interface 600, which is centered on the location 602 of the corresponding device, illustrates a zoomed in, or expanded view of the map interface 300 shown in FIG. 4. In this manner, the number of venues presented can be adjusted to be more inclusive or less inclusive.

In the example of FIG. 6, there are four (4) results shown within the area represented by the map interface 600. The four results in FIG. 6 correspond to venues within the geographical area defined by the polygonal region of the map interface 600 having events occurring during the indicated time period of "7 pm to 10 pm today." In contrast, in FIG. 4, there 496 results shown on the map interface 300, which correspond to venues within the geographical area defined by the polygonal region of the map interface 300 having events occurring during the indicated time period of "7 pm to 10 pm today."

Figure 7:
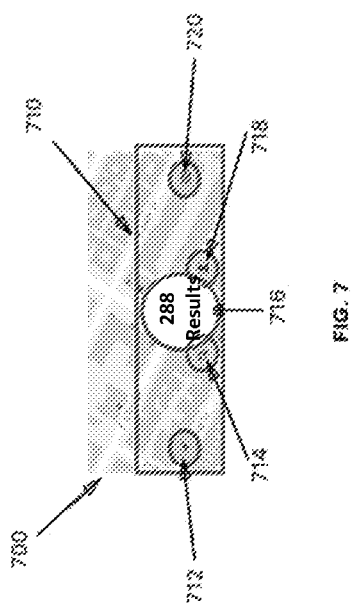
FIG. 7 illustrates an exemplary navigation menu for a system and device incorporating aspects of the disclosed embodiments.

Referring to FIG. 7, an exemplary map interface 700 incorporating aspects of the disclosed embodiments can include a navigation menu 710. In one embodiment, the navigation menu 710 can include functions such as location centering 712, searching 714, filtering 716, profile 718 and list view 720. In alternate embodiments, the navigation menu 710 can include any suitable or desired functions.

For example, in one embodiment, by activating the icon 702, which in the example of FIG. 7 is shown as highlighted, the location of the device can be centered on the map interface, such as location 602 shown in FIG. 6. The polygonal area of the map interface 700 can then be scaled to make the defined area larger or smaller.

Figure 8:
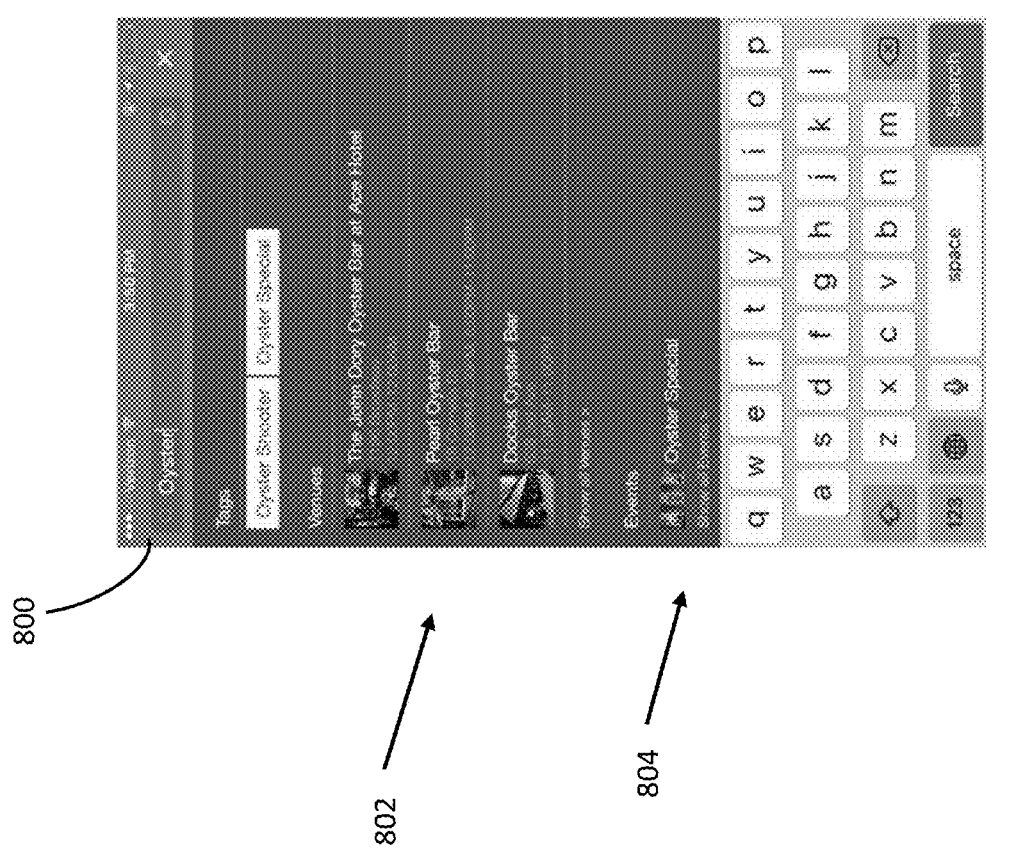
FIG. 8 illustrates an exemplary search interface for a system and device incorporating aspects of the disclosed embodiments.

The aspects of the disclosed embodiments also enable searching for tags venues, events, lists and friends. Activating the search function 714 can cause the generation of a search menu interface 800, as is shown in FIG. 8. In this example, the search query "Oyster" is entered. "Tags" 806, as that term will be further described herein, are generated. The tags 806 are generally used within the data set of venues and events to identify specific venues and events. When a search query is entered, the aspects of the disclosed embodiments can search for corresponding "tags", which can then be used to identify venues and events that are similar or correspond to the search query.

In one embodiment, a listing 802 of venues can be generated that pertain to the search query. The results can also include a listing of events 804 that correspond to the search query. The results can include any suitable information pertaining to the venue and event, including one or more of a name, address, event time, and picture. The listing 802 of venues and events is taken or derived from the data set that generates the venues and events on the map interface. It will be understood that the listing of venues and events can include any number of such venues and events.

Figure 9:
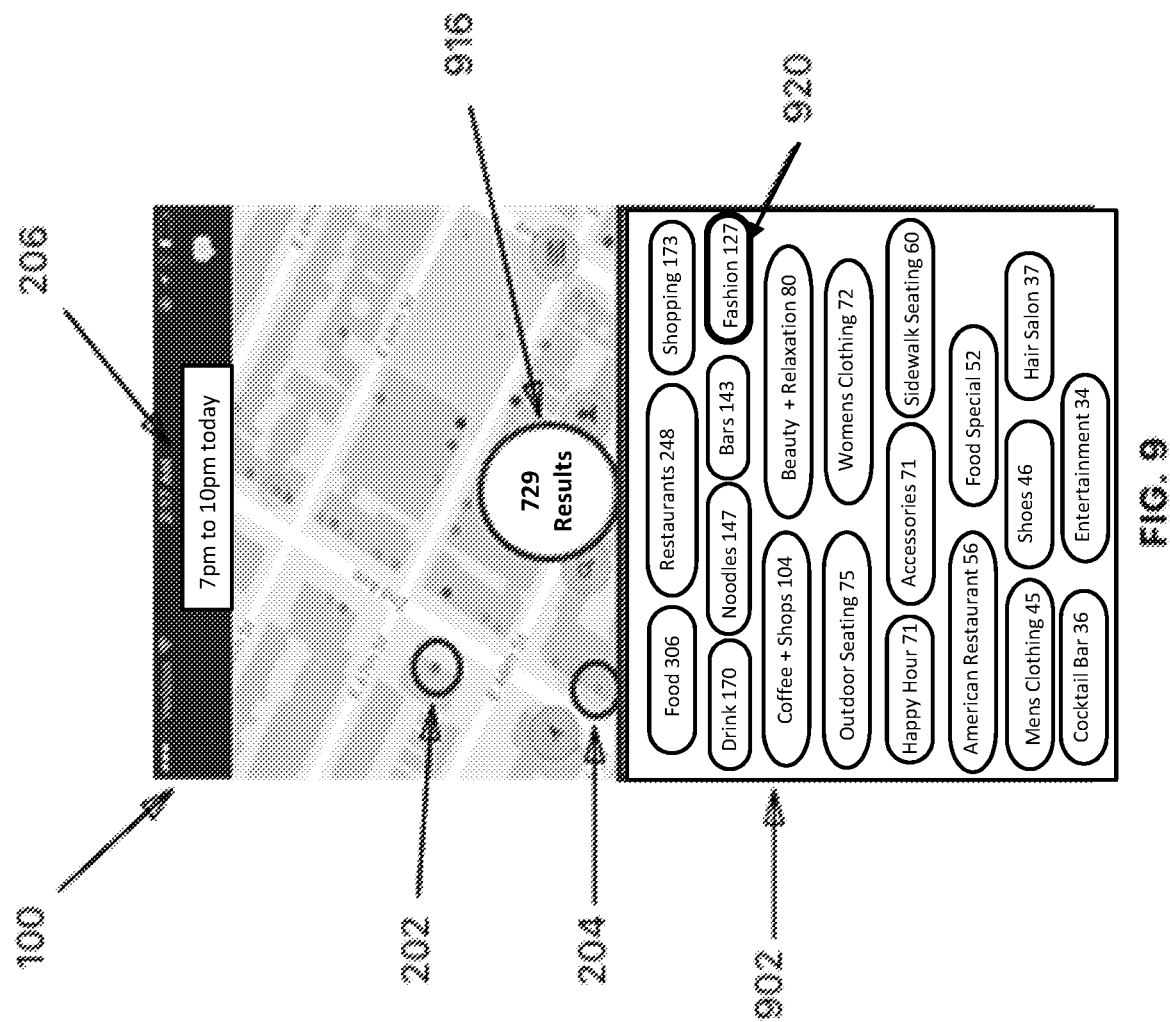
FIGS. 9-11 illustrate exemplary filter menus for a system and device incorporating aspects of the disclosed embodiments.

Referring to FIG. 9, the aspects of the disclosed embodiments enable the application of one or more filters to the venues and events. As is noted with respect to FIG. 7, the map interface 700 can include a filter function or tool 716. This function is shown as 916 on the map interface 900 of FIG. 9. Selection of the filter function 916 will generate a filter menu 902. The filter menu 902 generally includes one or more filter selection icons 920. In one embodiment, there will be as many filter selection icons as there are categories of venues and events corresponding to the venues and events presented in the exemplary map interface 900 shown in FIG. 9.

In the example of FIG. 9, the generation of the filter menu 902 will cause the size of the map interface 900 to change in order to accommodate the size and area needed to display the filter selection icons 920 in the filter menu 902. The aspects of the disclosed embodiments provide for scaling the map interface to any suitable size.

In one embodiment, the filter selection icons 920 can be color coded or otherwise suitably identified to correspond to one or more of the icons 202 representing venues and icons 204 representing venues where events are occurring during the time period indicated in the time window 206. While color is generally referred to herein as a distinguishing attribute, the filter icons 920 can be highlighted or distinguished in any suitable manner, such as shape, position, type face, font, for example.

In the example shown in FIG. 9, the filter menu 902 includes all filter selection options that are available for the area represented in the map interface 900. The filter selection categories shown in the exemplary filter menu 902 of FIG. 8, includes, but are not limited to, Food, Restaurants, Shopping, Drink, Bars, Fashion, Cafes and Shops, Beauty and Relaxation, Outdoor Seating, Womens Clothing, Happy Hour, Accessories, Sidewalk Seating, American Restaurant, Food Special, Men's Clothing, Shoes, Hair Salon, Cocktail Bar, Entertainment, Latin American Restaurant, Italian Restaurant. This list is merely exemplary, and in alternate embodiments, the categories can include any suitable categories and types of categories.

As is shown in the example, each filter icon 920 will also include a number, such as "Restaurants 248." This number generally represents the number of venues with events that correspond to this category.

As will be described in more detail below, the filter selection categories shown in the filter menu 902 generally correspond to the "tag" or "tags" referenced above. Thus, the filter menu 902 will generally present categories that correspond to pre-defined categories or "tags" as established in the data set of venues and events, as is further described herein.

Figure 10:
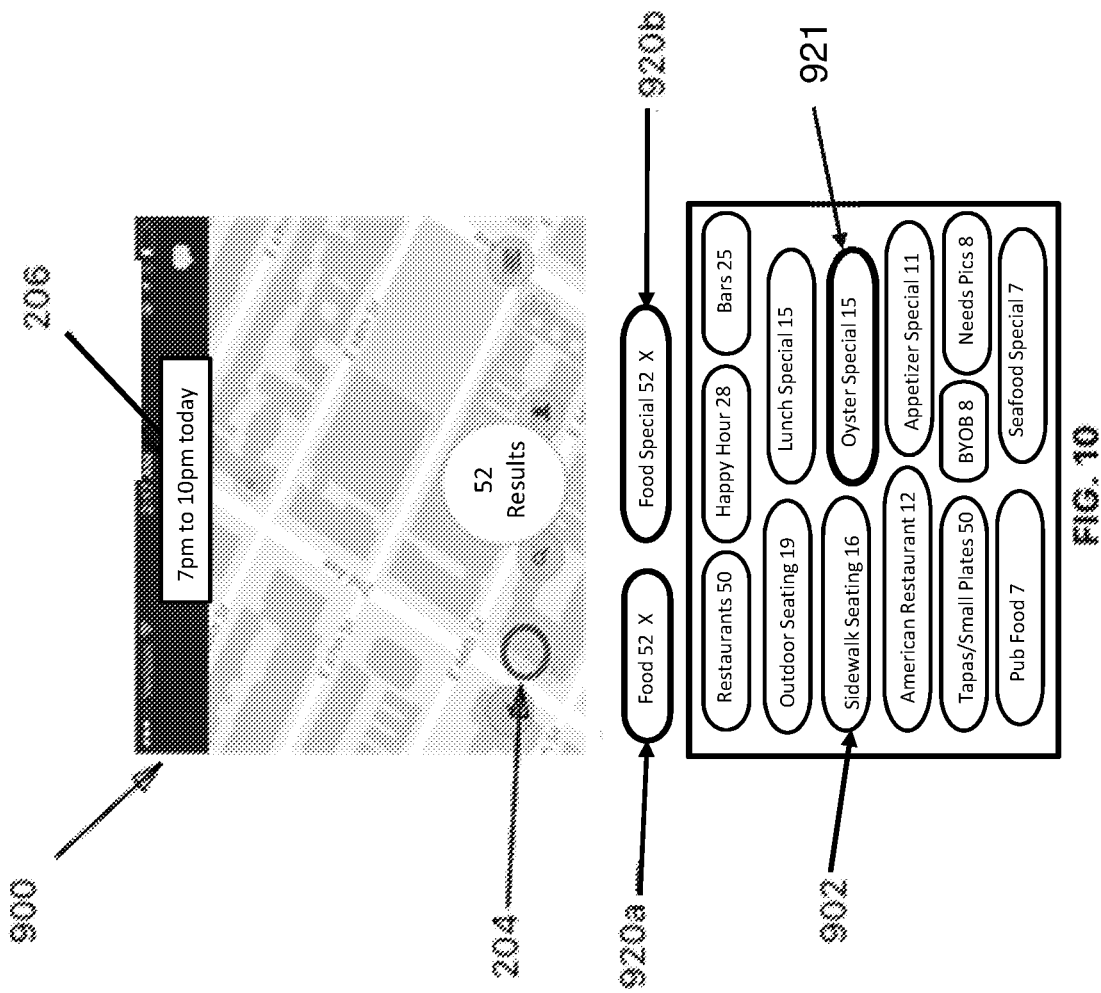

In the example of FIG. 10, the map interface 900 of FIG. 9 has been reconfigured or modified to reflect the selection of filter selection icon 920a for "Food" and filter selection icon 920b for "Food Specials." The icons 204 that are highlighted on the map interface 900 of FIG. 10 represent those venues that have "Food" and "Food Specials" during the time period of "2 pm to 5 pm today" as is reflected in the time window 206. While the example of FIG. 10 only shows the selection of two filter selection icons 920a and 920b, in alternate embodiments any suitable number of filter icons 920 from the filter menu 902 can be selected and applied. The aspects of the disclosed embodiments provide a "drill down" style of filtering and filter selection system. While an initial map interface may present more general categories, the filter menu 902 can be modified and changed to present more refined and specific categories and of filter selection options 920.

In one embodiment, once filter selection icons 920a and 920b are selected, the filter menu 902 of FIG. 9 is modified or reconfigured. Referring to FIG. 10, the filter menu 902 is reconfigured to present only those filter selection icons 921 that correspond or are otherwise related to "Food" and "Food Specials." The filter selection icons or filters 921 shown in the example of FIG. 10 include categories or "tags" such as Restaurants, Happy Hour, Bars, Outdoor Seating, Lunch Special, Sidewalk Seating, Oyster Special, American Restaurant, Appetizer Special, Tapas/Small Plates, BYOB, Pub Food and Seafood Special. Here again, the list is not exhaustive, and the filter menu 902 can include any suitable number of filter icons 921.

As was also reflected above, adjacent to the text of each filter icon is a number indicating the number of venues with events that correspond to the selected filter options. Thus, in the example of FIG. 10, there are 52 venues with Food and 52 venues with Food Specials between 2 pm and 5 pm.

Figure 11:
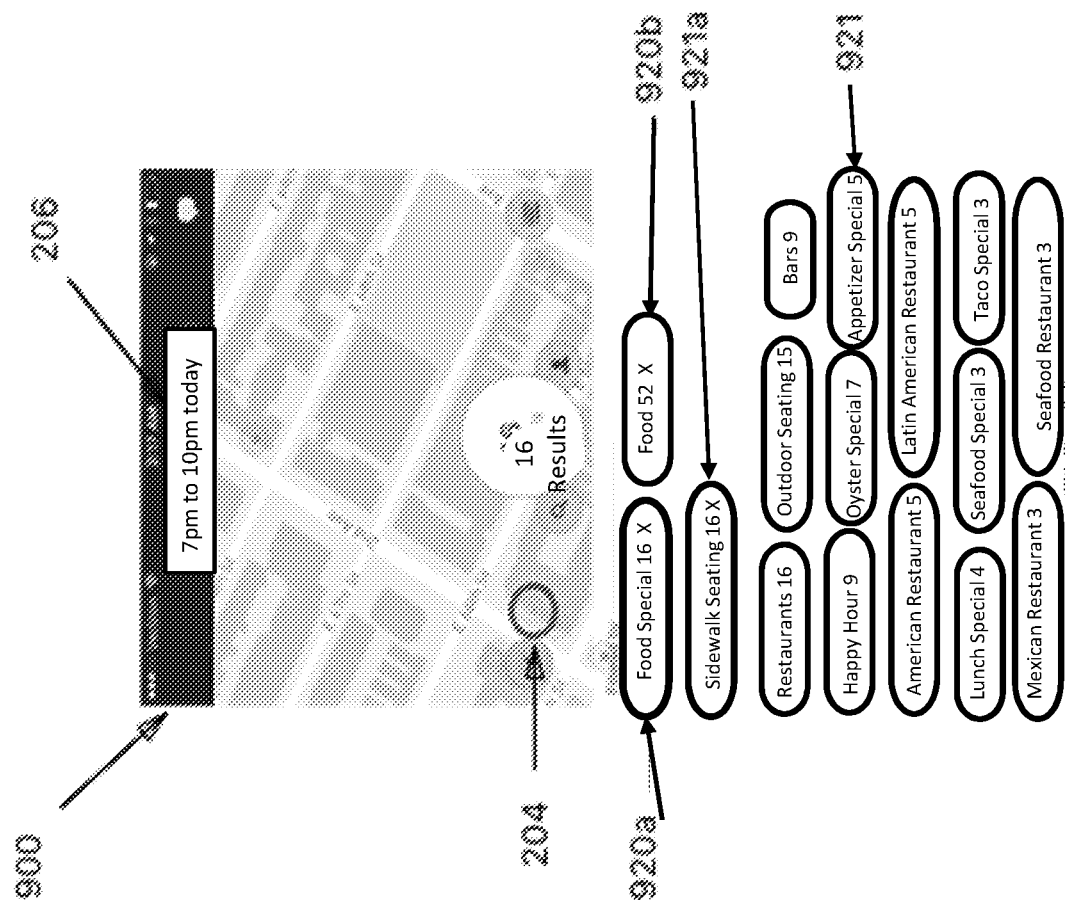

FIG. 11 reflects the further selection of filter selection icon 921a for "Sidewalk Seating." In this example, the map interface 900 has been reconfigured or modified to present only those icons 204 that are filtered by, or correspond to, the tags "Food Specials", "Food" and "Sidewalk Seating." In the example of FIG. 11, there are 16 results for venues that have "Food Specials", "Food" and "Sidewalk Seating" during the time period of 2 pm and 5 pm today. The aspects of the disclosed embodiments provide for filtering the venues and events on the map interface by tags and adding multiple filters.

Figure 12:
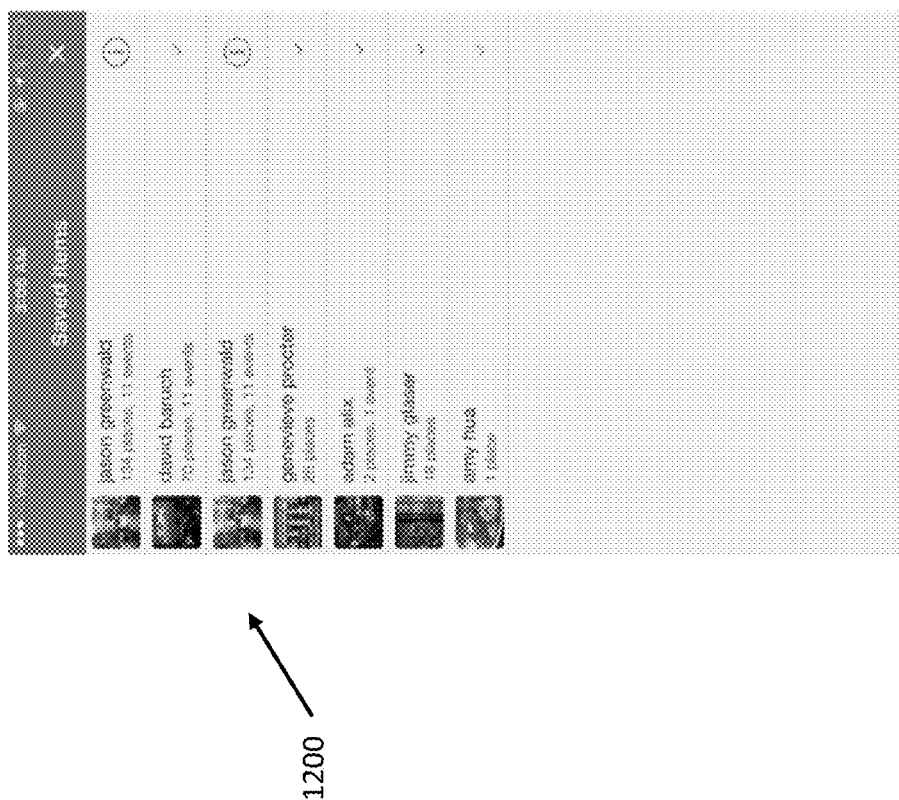
FIG. 12 illustrates an exemplary profile interface for a system and device incorporating aspects of the disclosed embodiments.

Referring to FIGS. 7 and 12, in one embodiment, the navigation menu 700 includes a profile function or icon 718. As shown in FIG. 12, the profile function 718, when selected, can provide a profile 1200 of saved places, events, lists and friends.

Figure 13:
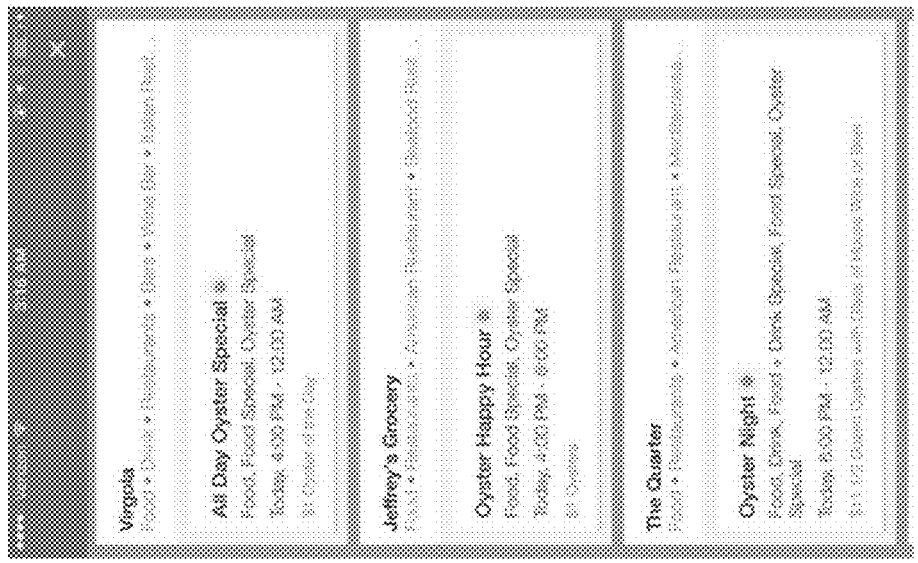
FIG. 13 illustrates an exemplary list view of venues and events for a system and device incorporating aspects of the disclosed embodiments.

Referring to FIGS. 7 and 13, in one embodiment, the navigation menu 700 can include a list function or icon 720. As is shown in FIG. 13, selection of the list function 720 will present a list view 1300 of all of the venues and events shown on the map or map interface.

Figure 14:
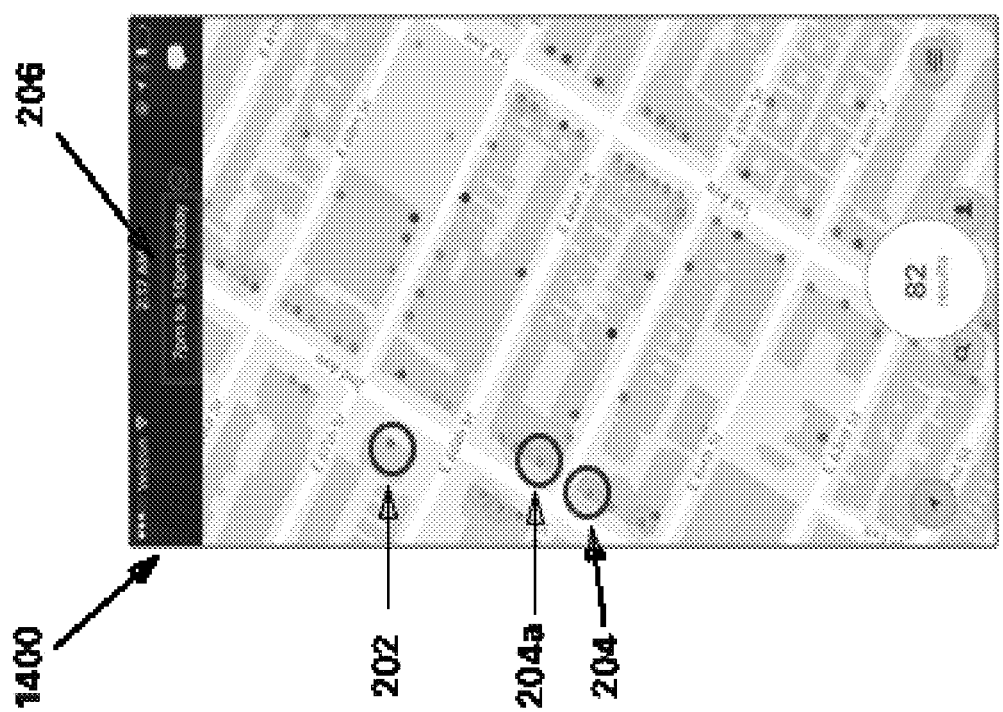
FIG. 14 is an exemplary map interface for a system and device incorporating aspects of the disclosed embodiments.
Figure 15:
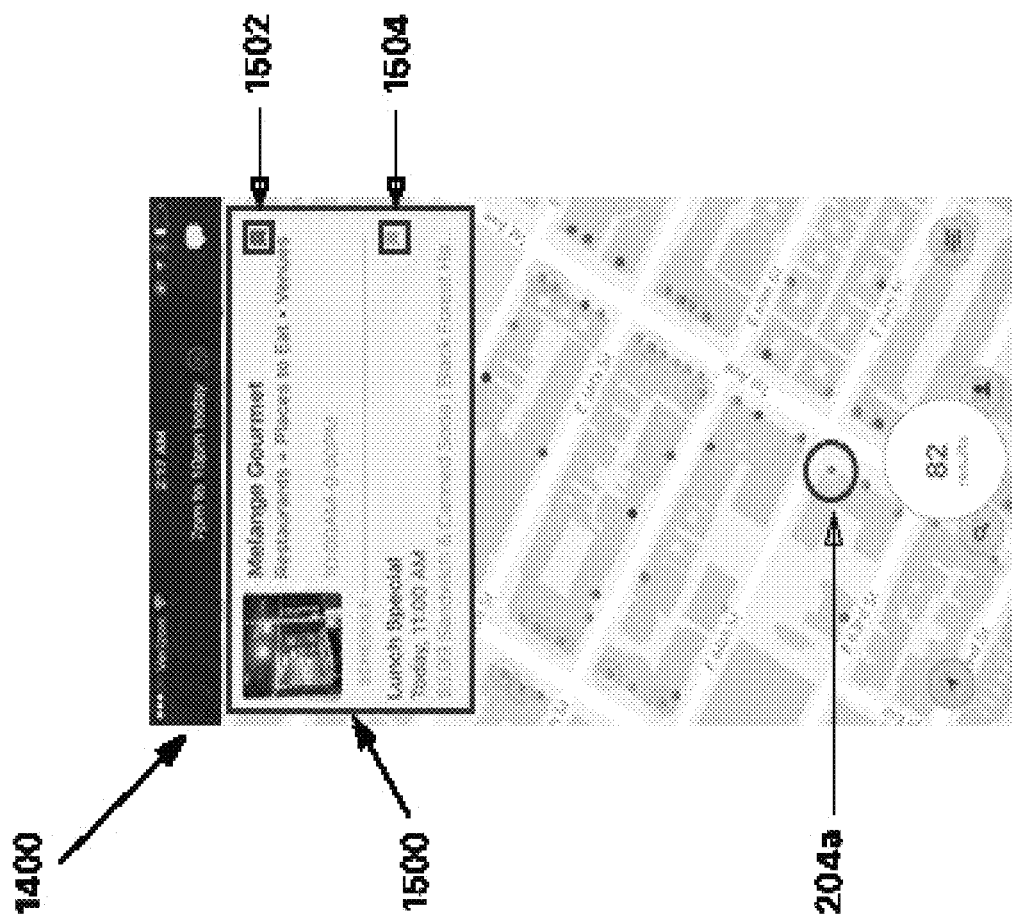
FIG. 15 illustrates an exemplary venue information panel on the map interface of FIG. 14.

Referring to FIGS. 14-17, the aspects of the disclosed embodiments also provide for obtaining more detailed information about venues and events. Starting with the exemplary map interface 1400 shown in FIG. 14, venues 202 and venues with events 204 for events occurring from "3 pm to 12 am Tuesday" are illustrated. To obtain more details about a venue or venue where an event is occurring, the corresponding icon can be selected. In the example of FIGS. 14 and 15, icon 204a has been selected. As shown in FIG. 15, icon 204a is highlighted to indicate that the icon has been selected. A pop-up window 1500 presents an information view or panel on the map interface 1400. The pop-up window 1500 provides more detailed information about the selected venue, and the event(s) taking place at the selected venue. In one embodiment, this detailed information can be saved, by selecting one or more of the save icons 1502, 1504. In one embodiment, selecting one or more of 1502, 1504 will save the information to the user's profile, as described with respect to FIG. 12, above.

Figure 16:
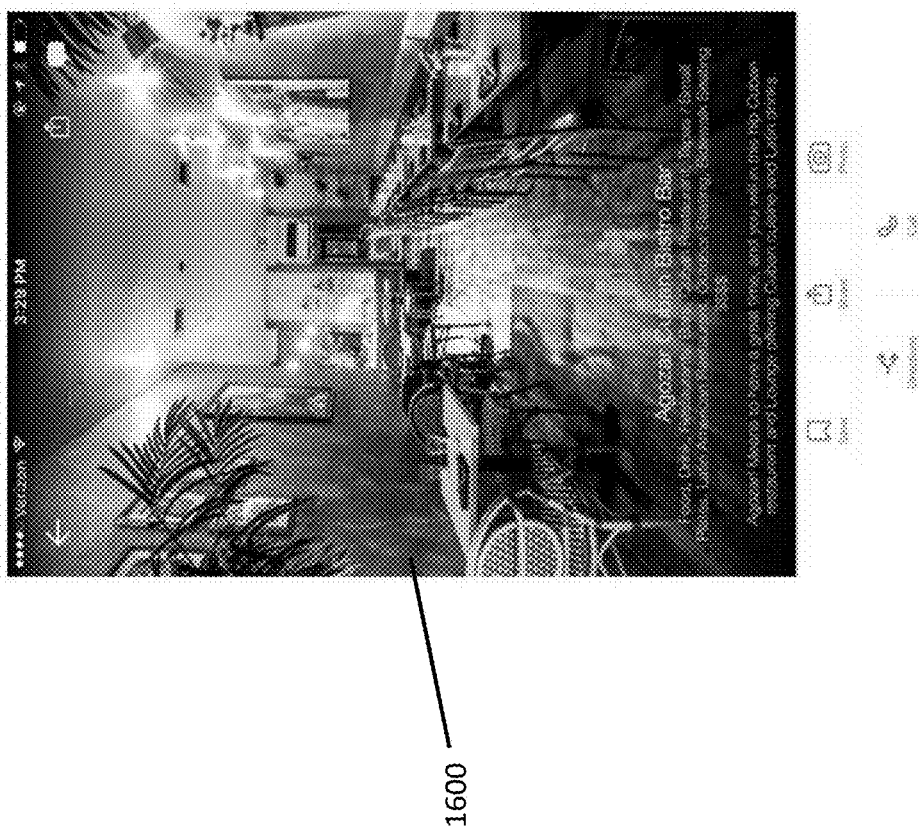
FIGS. 16 and 17 illustrate exemplary venue information interfaces for a system and device incorporating aspects of the disclosed embodiments.
Figure 17:
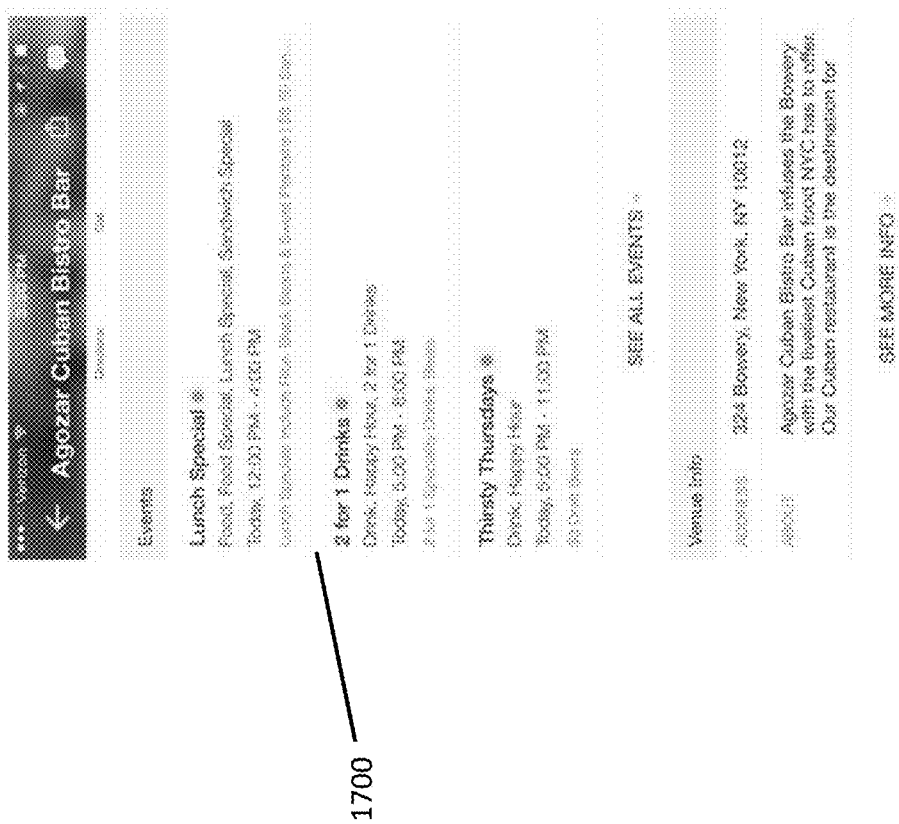

FIG. 16 illustrates how further information regarding the selected venue 204a can be presented. In this example, a further selection on the pop-up window 1500 can cause the display to change and present further information, such as a picture 1600 of the venue. FIG. 17 illustrates further detailed information regarding the venue, such as a full schedule 1700 of events. In one embodiment, the information and data, or links to the information and data presented in FIGS. 14-17 is obtained from a database of venues and events, as is further described herein.

Figure 18:
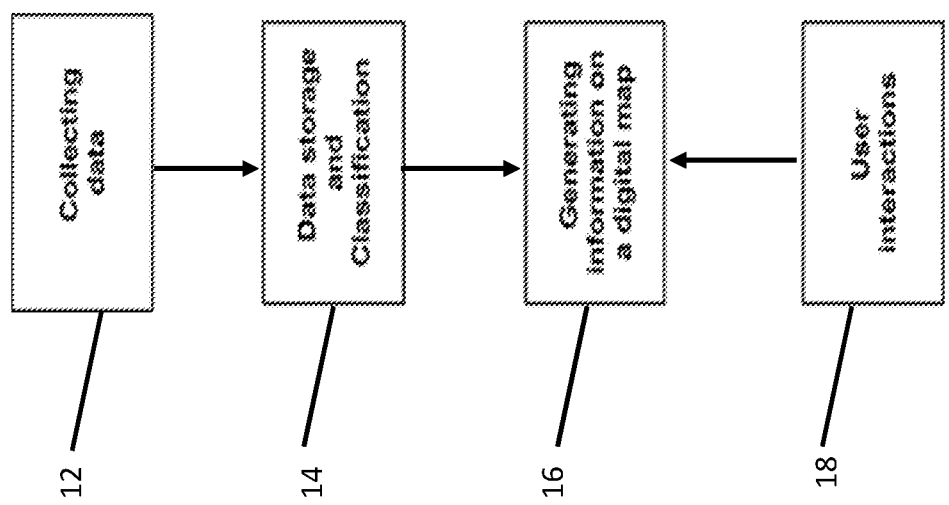
FIG. 18 is a block diagram of an exemplary process incorporating aspects of the disclosed embodiments.

FIG. 18 illustrates a block diagram of a process incorporating aspects of the disclosed embodiments. In one embodiment, data is collected 12. The collected data is stored and classified 14. The stored data can be used to generate 16 information on a digital map. The information presented on the digital map can be filtered and modified based on user interaction 18.

Data about locations is published in many formats, both online and offline. Data collection 10 can include going to sources and obtaining data, or ingesting data from sources, such as pulling information form a network such as the Internet. The aspects of the disclosed embodiments search for venue and event information online, in the real world, and through any available open public data source.

Figure 19:
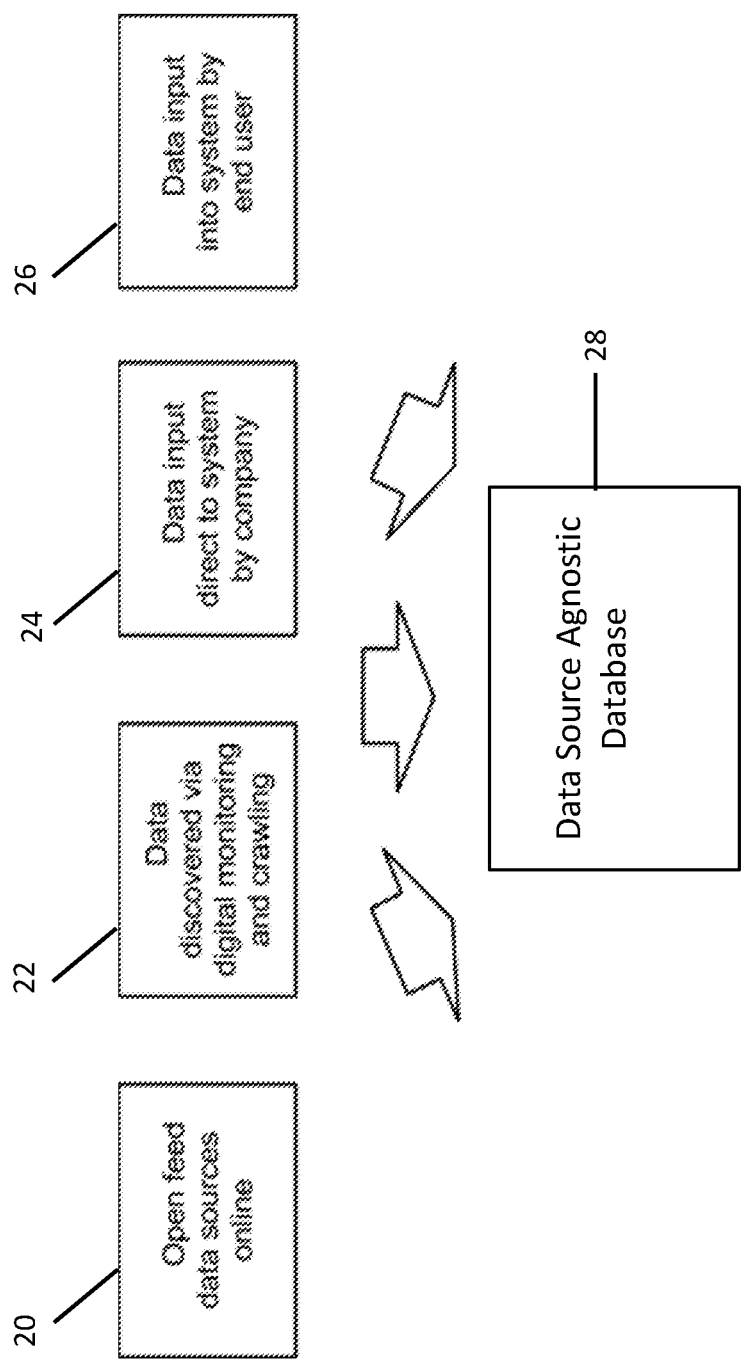
FIG. 19 is a block diagram of an exemplary data collection process for a system incorporating aspects of the disclosed embodiments.

Referring to FIG. 19, the process of collecting data allows for the ingestion of information from any data source to be input and stored in servers, for example. The ingestion of information may include, but is not limited to, open published feeds and online data sources 20, digital web crawling and monitoring 22, data input directly into the system 24, or data input into the system by an end user 26. The data that is collected, which is data source agnostic, generally comprises venue and event data as will be further described herein, can be aggregated and stored in a memory storage, such as a database, for example.

The data storage and classification 12 can include identifying different data types. The aspects of the disclosed embodiments will categorize the data types as "venue" data and/or "event" data. This occurrence of an event at a venue in addition to the venue data, represents the data set for a location at a particular time. Examples of data that may be gathered as "event" data may include, but is not limited to, a Sale happening at a Retail store or a Live Music event happening at a Bar. The information may include data such as the start time and end time of the event, the title of the event, the cost of the event, and other data about the venue or what is happening at that venue at a given time. As is illustrated in the example of FIG. 2, a venue at which an event is occurring is shown as a highlighted or otherwise distinguished icon 204.

The data that makes up the database 28 of the disclosed embodiments is based on a data storage structure, referred to herein as a "tag" or single tag dictionary. This tag based data storage structure classifies events and venues into a highly usable organization that yields a complete and raw set of data. The tag based dictionary of the disclosed embodiments is a text based structure describing venues and events.

This data storage structure is not the raw data acquired through the data collection process. Rather, when event data and venue data is collected, a determination is made as to what tag best classifies the data. The tag is then stored in association with the venue or event in the database 28.

Figure 20:
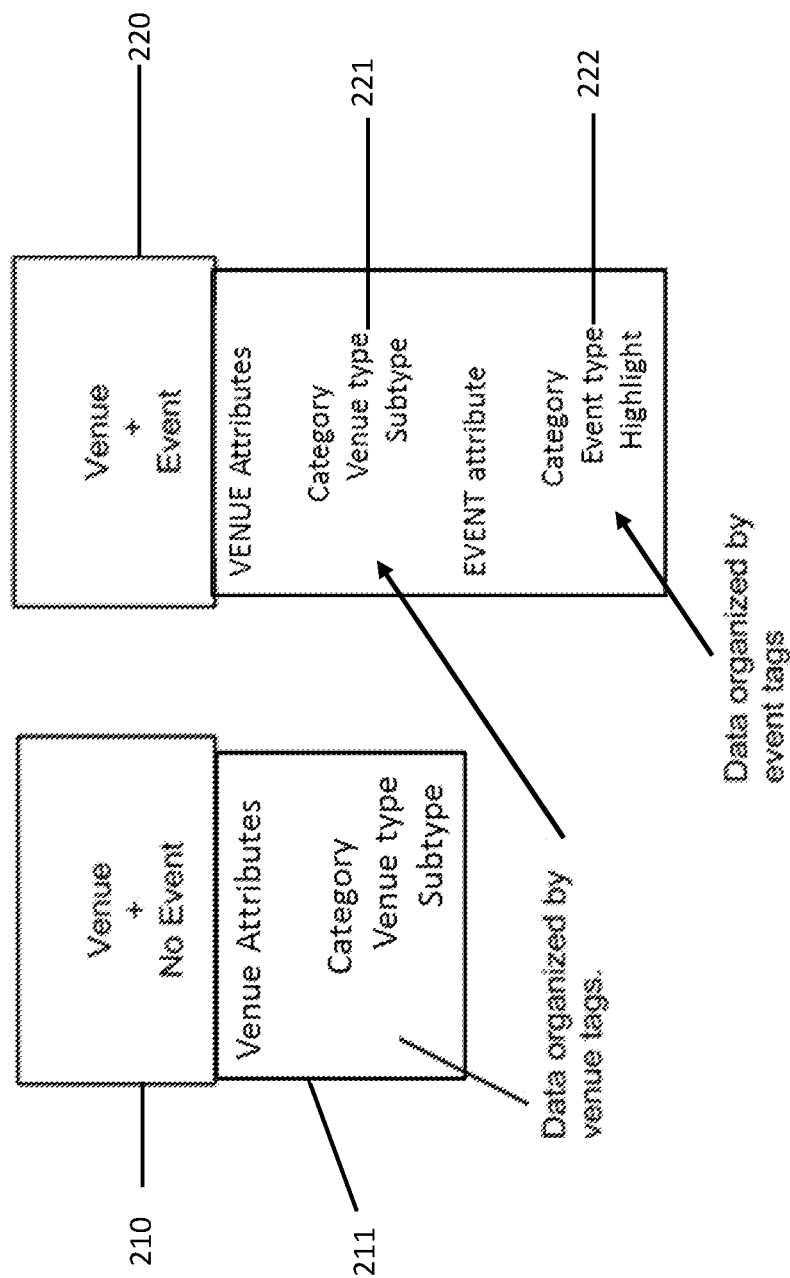
FIG. 20 is a block diagram illustrating exemplary attributes for venues and events.

Referring to FIG. 20, in one embodiment, both event and venue data are combined to create a time-based view of a location. The possible combinations include venue 210 with no event and venue 220 with an event. Even if there is no event taking place at a location, such as at venue 210, the location will be representative of, or represented by, the venue attributes. The venue attributes 211, 221 for the respective venue types 210, 220 in this example include "category", "venue type" and "sub-type." Event attributes 221 in this example include category", "event type" and "highlight."

The aspects of the disclosed embodiments use a specific taxonomy to classify both events and locations in order to categorize the world into text based groups. Referring to FIG. 34, Table 1, illustrates an example of an ever evolving tag based dictionary. The tag dictionary and taxonomy is shared across venue and event data. The categories and information shown below are merely representative and are not intended to include all categories that can be encompassed within the taxonomy of the disclosed embodiments.

Table 1 is shown in FIG. 34

For example, a selection of the tag "Food" may represent both locations associated with the tag "Food" in combination with the locations at the time of search that have events taking place with the tag "Food". Therefore, at a single location, one can see both Food venues and Food events.

The aspects of the disclosed embodiments gather data and input the data into the system. The data is then formatted, organized, categorized and tagged. The formatted and tagged data creates a data set that can be used to create and generate a digital map, as is generally described herein.

The aspects of the disclosed embodiments build a new digital map overlay using a mobile devices geo location tracking and internal clock. As is generally described herein, the location tracking and internal clock will be used to filter information overlaid on the map interface. The information displayed may include but is not limited to a text derived representation of data in the form of a tag drill down interface and spatial graphical data representations.

Figure 21:
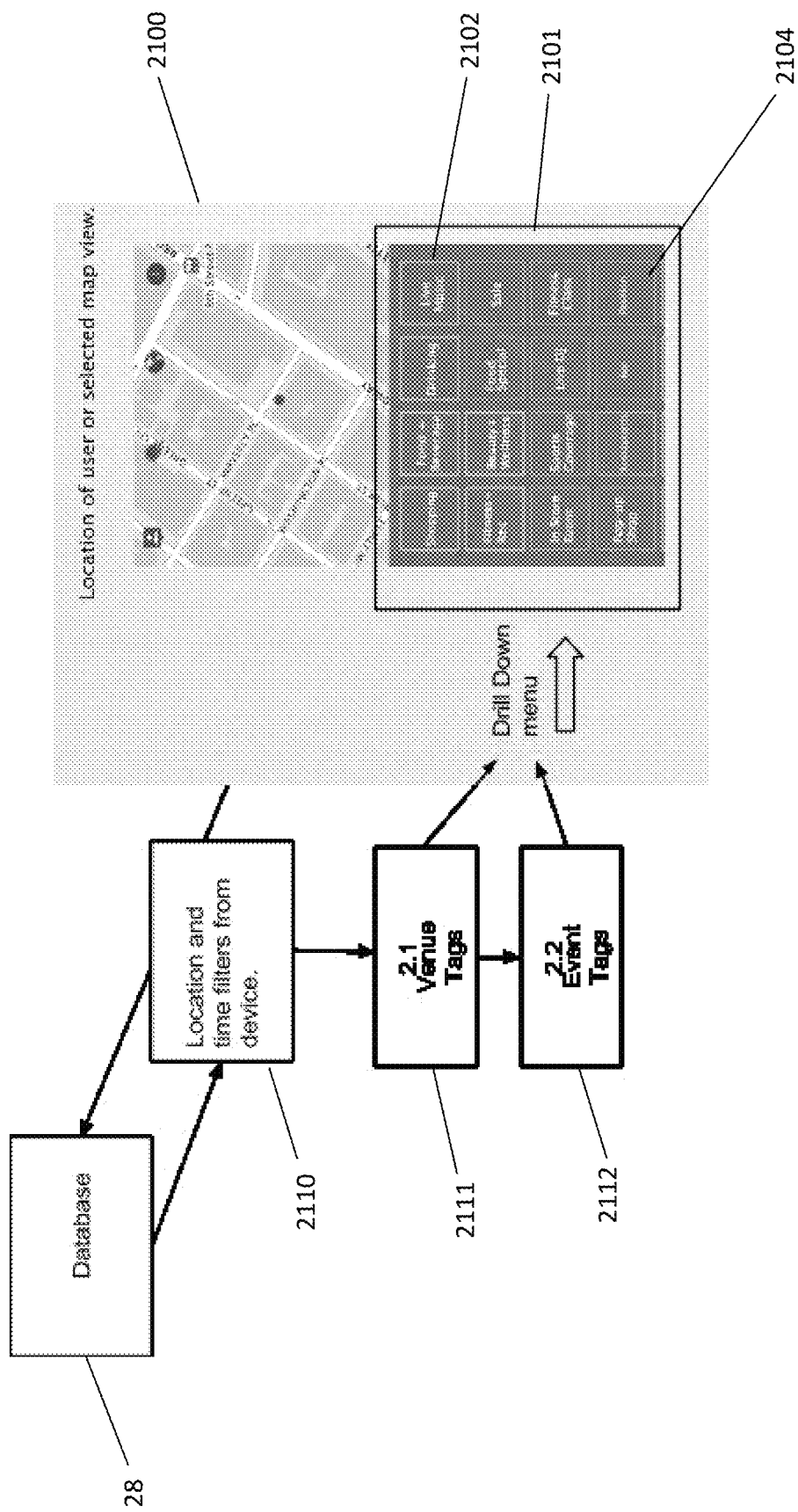
FIG. 21 is a block diagram illustrating a process for generating an exemplary filter menu incorporating aspects of the disclosed embodiments.

By leveraging the capabilities of a computing device to track location and time, the system of the disclosed embodiments is configured to display an automatically generated tag based information interface, called a "drill down" or filter menu display with information filtered by the devices geo location and time of the devices internal clock. The digital map overlay and the drill down interface changes based on time and location. Referring to FIG. 21, the filter menu 2101 can include overlays 2102, also referred to as filter selection icons, which may be squares, circles, or other shapes and may include text, icons, or images representing organized tag data based for venues and events filtered by location and time.

An example of generating a filter menu is shown in FIG. 21. In the example of FIG. 21, the filter menu 2101 appears on the map interface 2100 based on the program being open or active. Another example of a filter menu is shown in FIGS. 9-11 as filter menu 902 with filter selection icons 920. The filter menu 2100 shown in FIG. 21 is based on the location and time filters 2110, the venue tags 2111 and event tags 2112.

The set of tags or filter selection icons 2102 that make up the filter menu 2101 in FIG. 21 is ordered optionally but preferably based on the frequency of each textual tag within the available dataset. In the example of FIG. 21, the most frequent tag in the dataset is listed or presented first, or the upper left corner 2103, and the least frequent or relevant position is last, or the lower right corner 2104. As shown in FIG. 21, the overlay 2103 for the tag "Shopping" is displayed as the most relevant tag in the filter menu 2101 (upper left corner). The least referenced tag 2104 associated with the location in the illustration above is "Fashion", in the lower right corner. Thus, if in a certain geographic area during a certain window of time the most frequent category of tag may be "Shopping", "Shopping" would be displayed as the most relevant tag in the filter menu 2101. While the relevance is generally described herein with reference to an upper left corner and a lower right corner, the aspects of the disclosed embodiments are not so limited. In alternate embodiments, any suitable manner of illustrating relevance can be used.

It is noted that the number of overlays in the filter menu 2101 is not limited to the number illustrated in the example of FIG. 21. Rather, the filter menu 2101 can include any number of overlays for any number of tags, or filter selection elements.

In one embodiment, the filter menu 2101 can be scrolled up and down in a manner as is generally understood to view the most relevant tag down to the least relevant tag. There can be more overlays below it, as the filter menu 2101 is scrolled down.

Although the exemplary filter menu 2101 shown in FIG. 21 is in the shape of a square or squares, it will be understood that the filter menu 2101 can comprise any suitable geometric shape or image. The aspects of the disclosed embodiments are not intended to be limited by the particular shape of the filter menu 4.1, the shape of the tag overlays, or the particular arrangement of the tag overlays in or on the filter menu. FIGS. 9-11 illustrate an alternative layout and arrangement of tags or filter selection elements 920.

The tag overlays or filter selection elements are configured to be selected, in a manner that will be generally understood. When a tag is selected, such as by touching, the user makes a selection on a tag and the selected tag becomes an additional filter applied to the dataset. The remaining tags displayed are all derived from venues and events that share the selected tag. Users can select multiple tags and un-select tags to change the data filter and dataset. A tag can also be removed from the filter interface and the program will remove all venues and events that contain this tag.

One such example is shown in FIGS. 22A-22C. FIG. 2A present an initial, time based dataset, with a filter menu 2201 including all possible filter selections 2202 for the venues presented on the user interface 2200. Selecting Shopping tag 2203 in the filter menu 2201 of FIG. 22A results in the map overlay 2210 shown in FIG. 22B. The map overlay 2210 in FIG. 22B shows a map interface based on the filters of location, time, and the selected tag 2203, shopping. The shopping venues are identified in FIG. 22B by the flagged icons. FIG. 22C illustrates the selection of one of the flagged icons 2204. Further information pertaining to the selected icon is presented in a pop-up 2205.

Figure 23C:
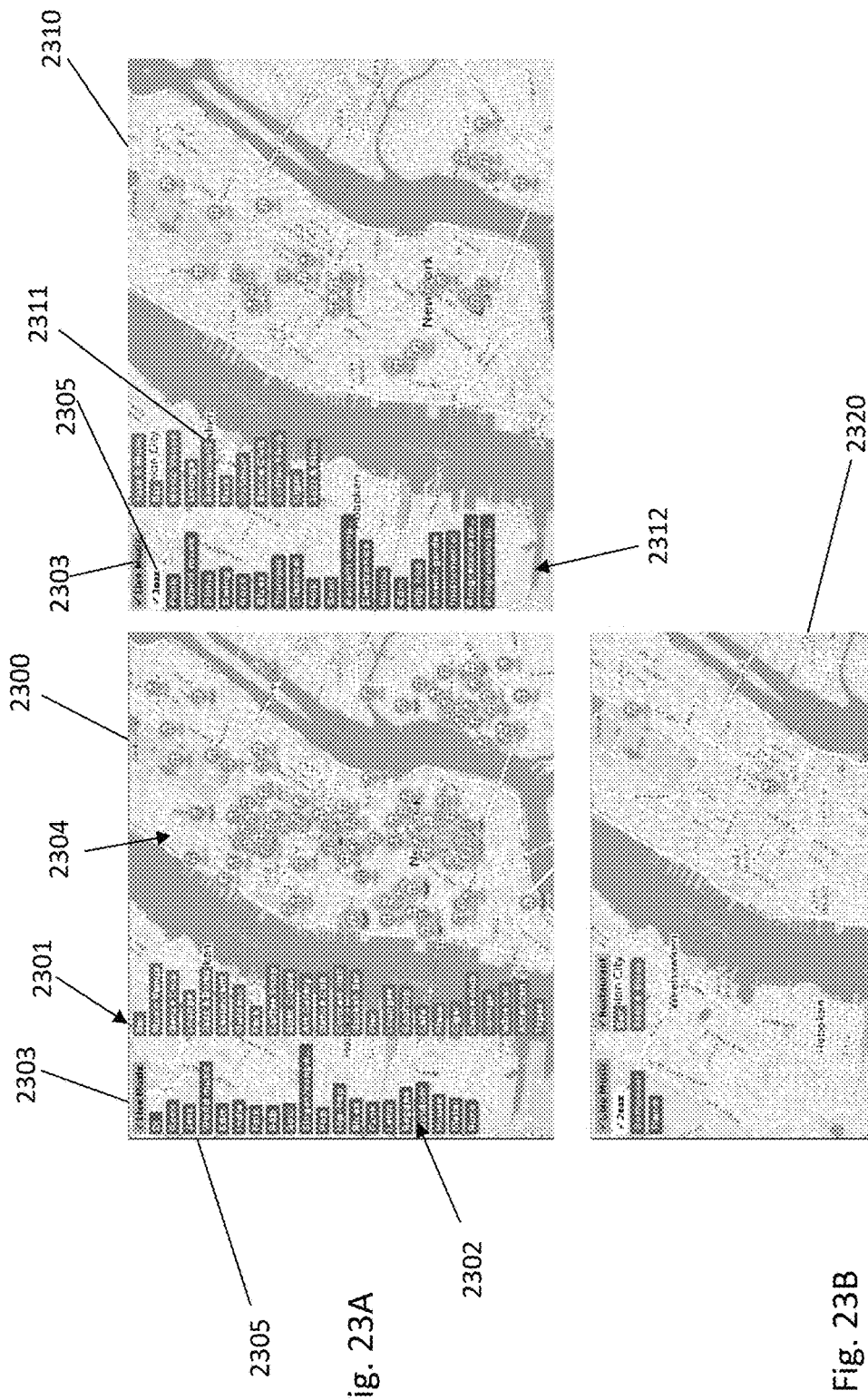
FIGS. 23A-23C illustrate exemplary user interfaces for a system and device incorporating aspects of the disclosed embodiments.
Figure 23A:
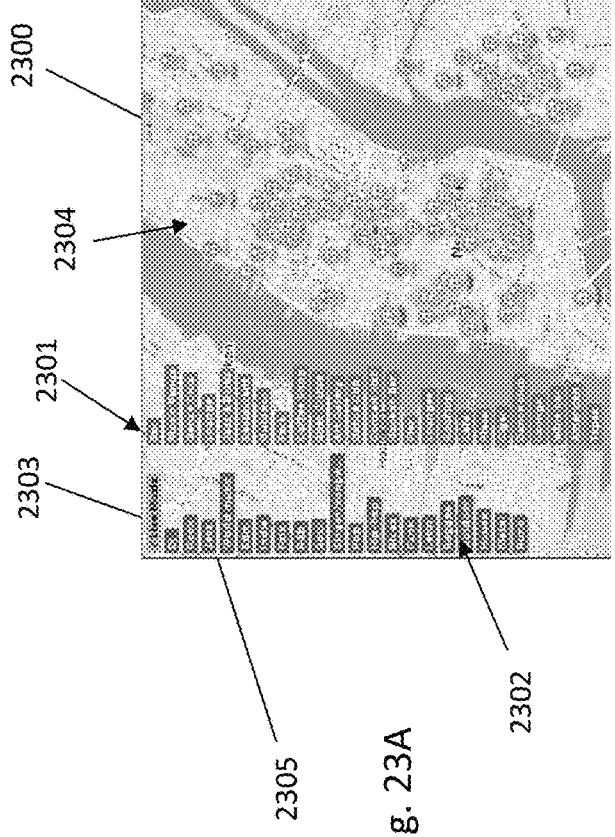
Figure 23B:
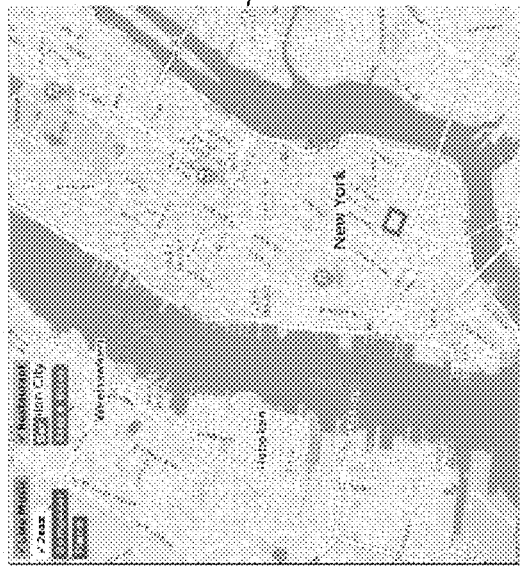

FIGS. 23A-23C illustrate another exemplary map view or interface in a system incorporating aspects of the disclosed embodiments. In this example, a text based filter menu 2301 is adjusted based on the selection of one or more of the different filter icons 2302. FIG. 23A illustrates the representation of a dataset for the map interface 2300 based on the selection of the Live Music tag 2303 for the time-based geographic area. The set of icons 2304 in FIG. 23A shows those venues with live music for the geographical area during a set time window. Selection of the Jazz tag 2305 from the filter menu 2301 results in a new dataset represented by the map interface 2310 shown in FIG. 23B.

Selection of the Restaurant tag 2311 from the filter selection menu 2312 in FIG. 23B results in the map interface 2320 shown in FIG. 23C. As more filters are applied, the resulting dataset is more refined and limited. The structure, filtering, and presentation of the data set allows for fast and simple filter based search that may be accessible on a variety of display sizes and formats.

Data is visualized on the map based on the unfiltered venue and event data set that is returned from the server. The visualizations created may be adjusted based on the density of data, viewpoint of the map, or other factors that may require specific data visualizations.

Figure 24:
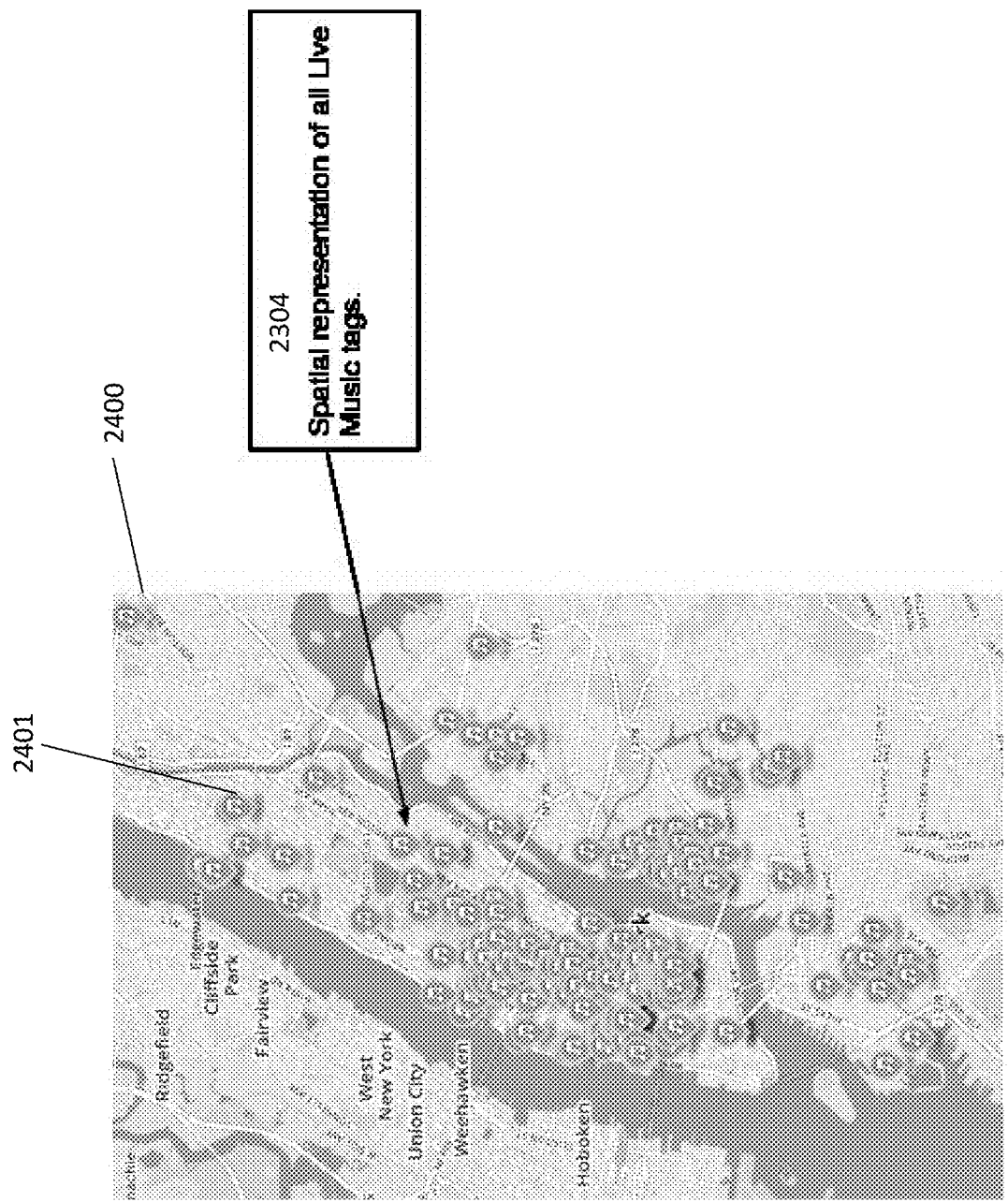
FIG. 24 illustrates an exemplary representation of data objects on a map interface for a system and device incorporating aspects of the disclosed embodiments.

FIG. 24 illustrates an example of what the Live music data set 2304 from FIG. 23A could look like. The pins 2401 on the map interface 2400, which are spatial representations of all Live Music tags, represent geographical locations or venues. The geographical locations or venues can be identified by geographical coordinates, such as a latitude and a longitude. In accordance with the aspects of the disclosed embodiments, the geographical location or venue is also identified by time. As is further described herein, the pins 2410 on the map interface 2400 of FIG. 24, which are in the form of musical notes, represent venues that have or correspond to the "Live Music" tag 2303 of FIG. 23A, during a specific or designated time period. Thus, not only do the pins 2401 identify a venue by geographical location, but the venue is also identified by time.

In accordance with the aspects of the disclosed embodiments, the view of the map is time dependent. Since events happen at different times, the event view of the map at one point in time may be different from the event view of the map at another or different point in time. Thus, according to the aspects of the disclosed embodiments, a venue on the map can be identified by its place and time, such as its latitude, longitude and the time.

The aspects of the disclosed embodiments provide an interface that allows for adjusting the time and location filters. A user may adjust the map interface by moving the map interface or other various interactions to adjust the scope of the location filter. For example, the user can zoom-in and zoom-out the map view. The system will re-filter the data set and change the information displayed on the corresponding filter menu as these adjustments take place.

The location filter will primarily be adjusted by, but not limited to, the physical representation of the viewable area or region on the map interface. As the location changes, the information organized over the map will also change, displaying what is available behind the visible map on the filter menu. The location can be set and changed by the device, or the user can adjust a location filter.

Figure 25:
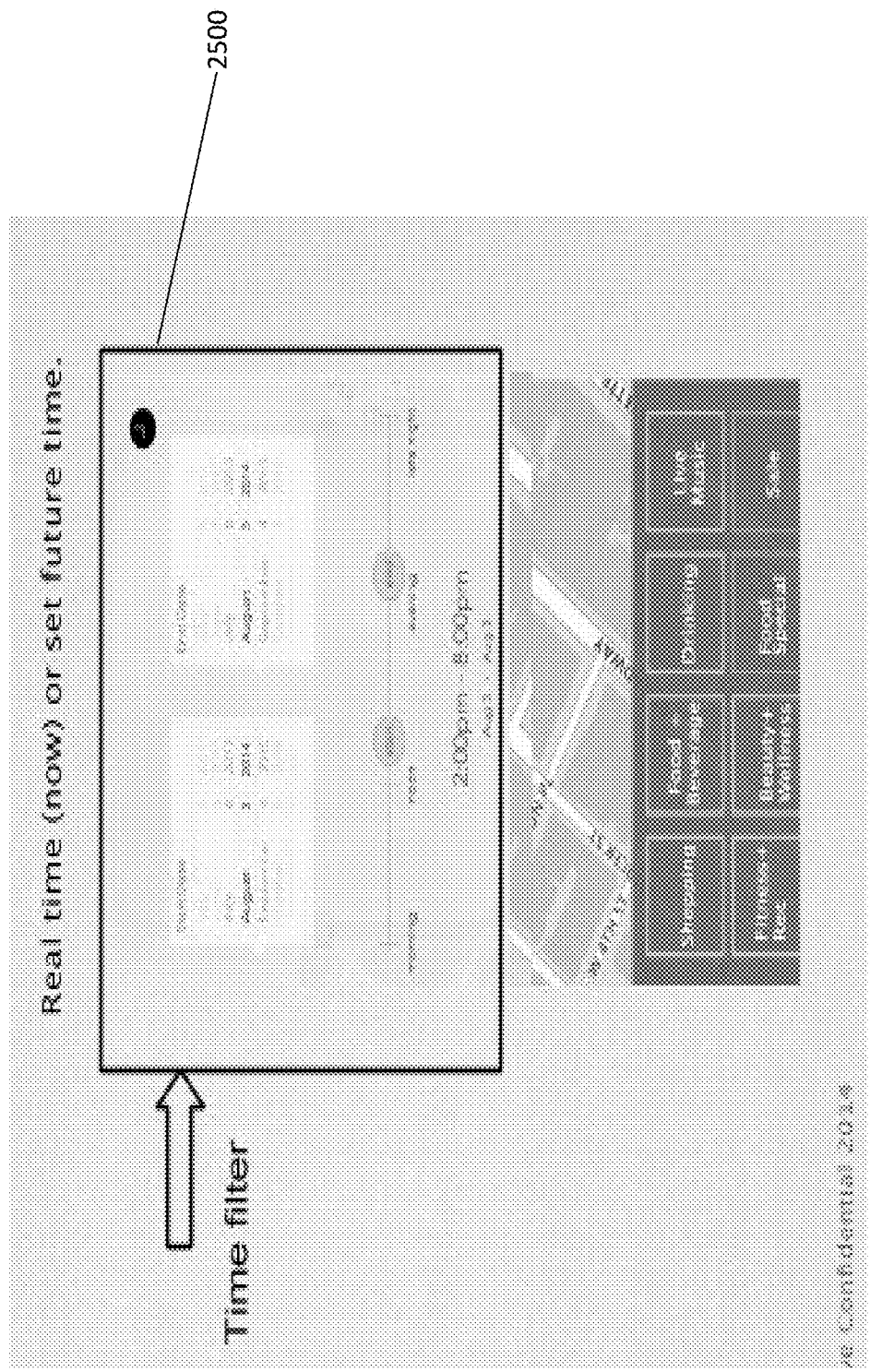
FIG. 25 illustrates an exemplary time filter for a system and device incorporating aspects of the disclosed embodiments.

The time or date may also be adjusted in order to change the period of time the information should be filtered by, allowing you to see not only current information, but also one or more of past or future information about a location. FIG. 25 illustrates one embodiment of a time filter 2500 for use with the system of the disclosed embodiments. Adjustment of the time filter 2500 can be used to change the time window 206 shown in FIG. 2, for example. The time filter 2500 can be set for the current time, a future time or even a past time. As the time filter 2500 is adjusted, what is displayed on the map changes, referring to FIG. 26 for example.

Figure 26:
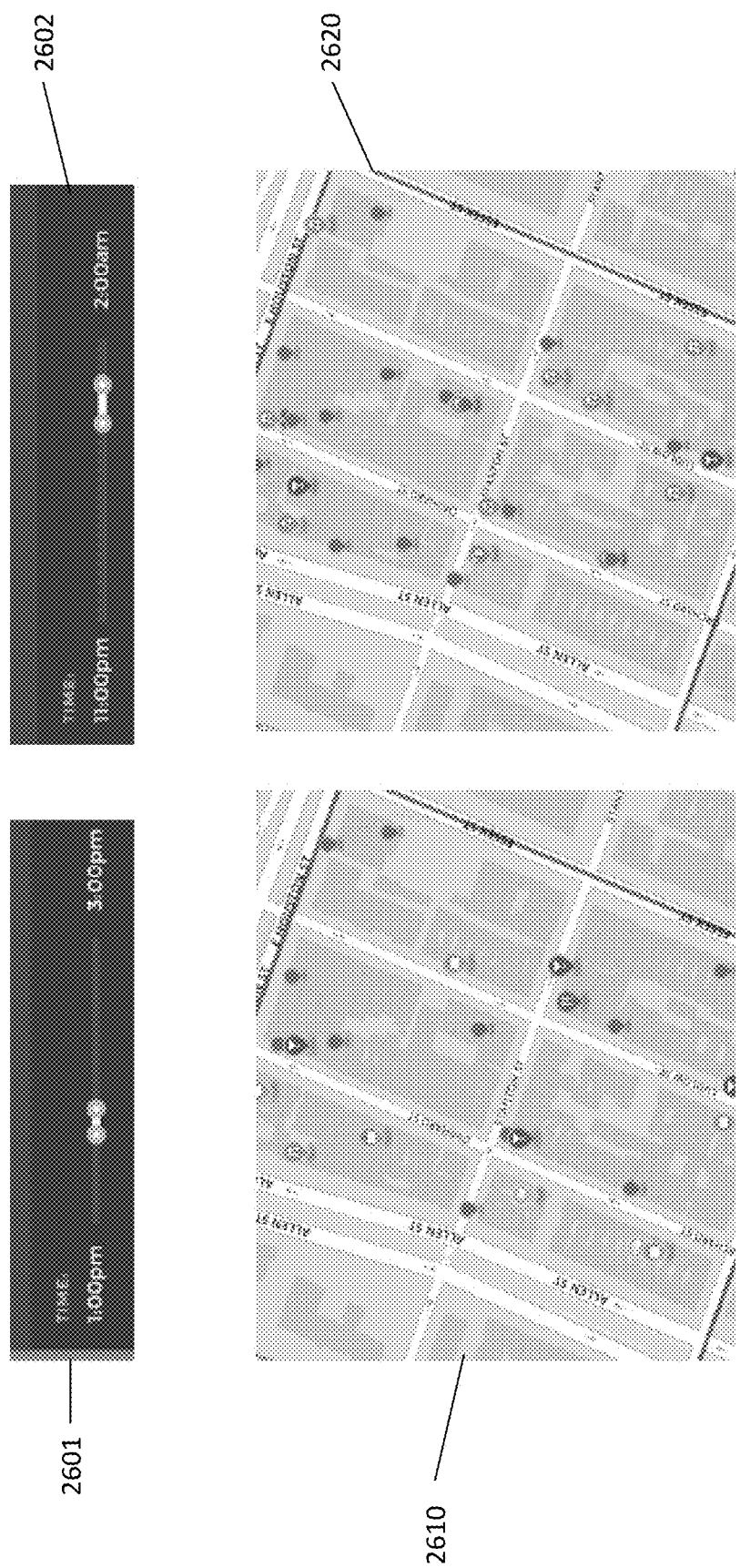
FIG. 26 illustrates the use of an exemplary time filter for a system and device incorporating aspects of the disclosed embodiments.

In FIG. 26, the map interface 2610 illustrates the view for the time window or filter 2601 of 1 pm to 3 pm, while map interface 2620 illustrates the view for the time window or filter 2602 from 11 pm to 2 am. The aspects of the disclosed embodiments can incorporate or make use of any suitable time adjustment device or filter.

Figure 27:
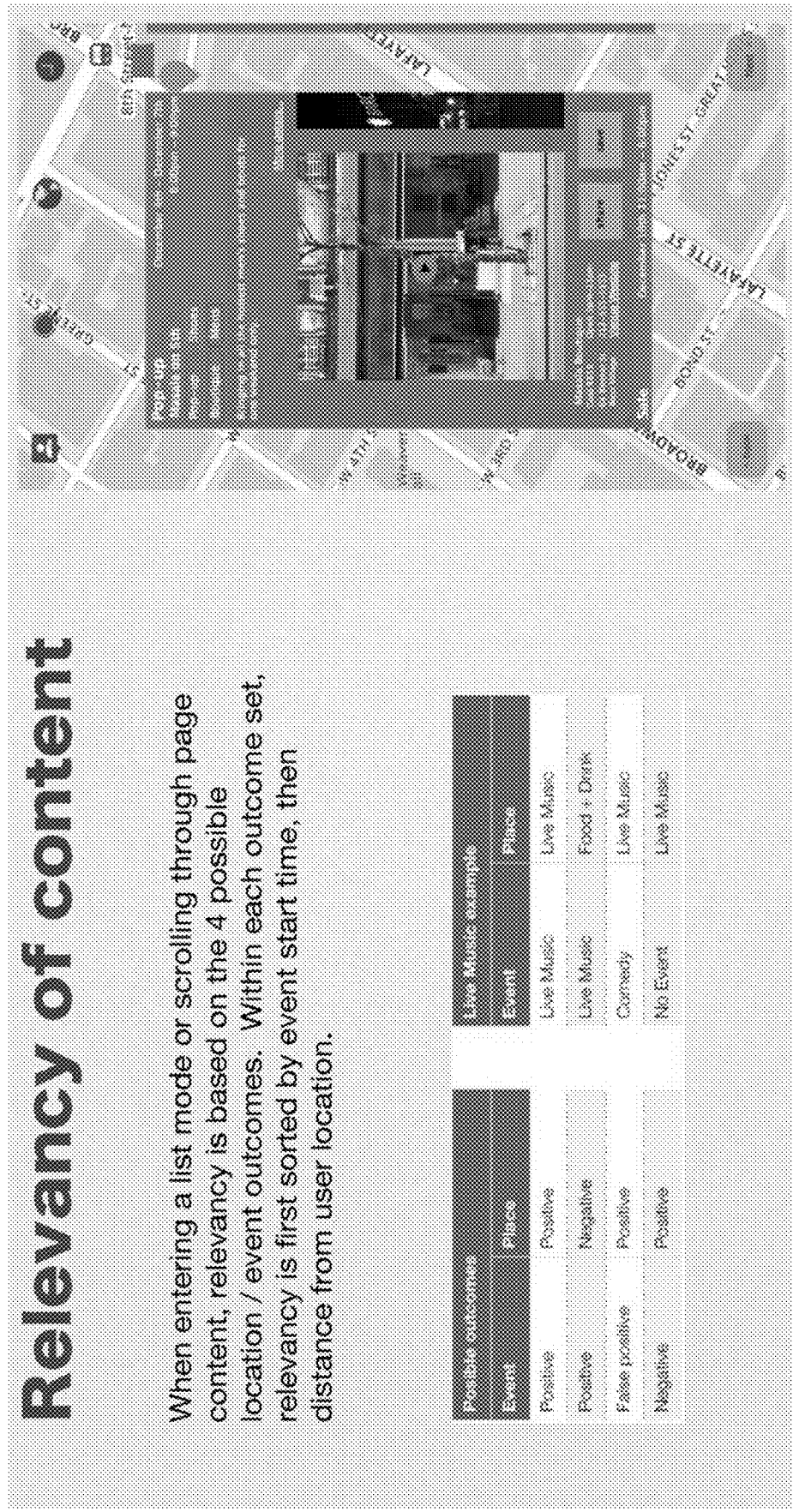
FIG. 27 illustrates an exemplary determination of content relevancy for a system and device incorporating aspects of the disclosed embodiments.

The aspects of the disclosed embodiments enable content relevancy to be presented to the user on the user interface of the device. Relevancy will be generally based on four possible location/event outcomes. An example is shown in FIG. 27. Within each outcome set, the relevancy can be first sorted by event start time and then distance from the location of the user, or the particular location set in the map.

Figure 28:
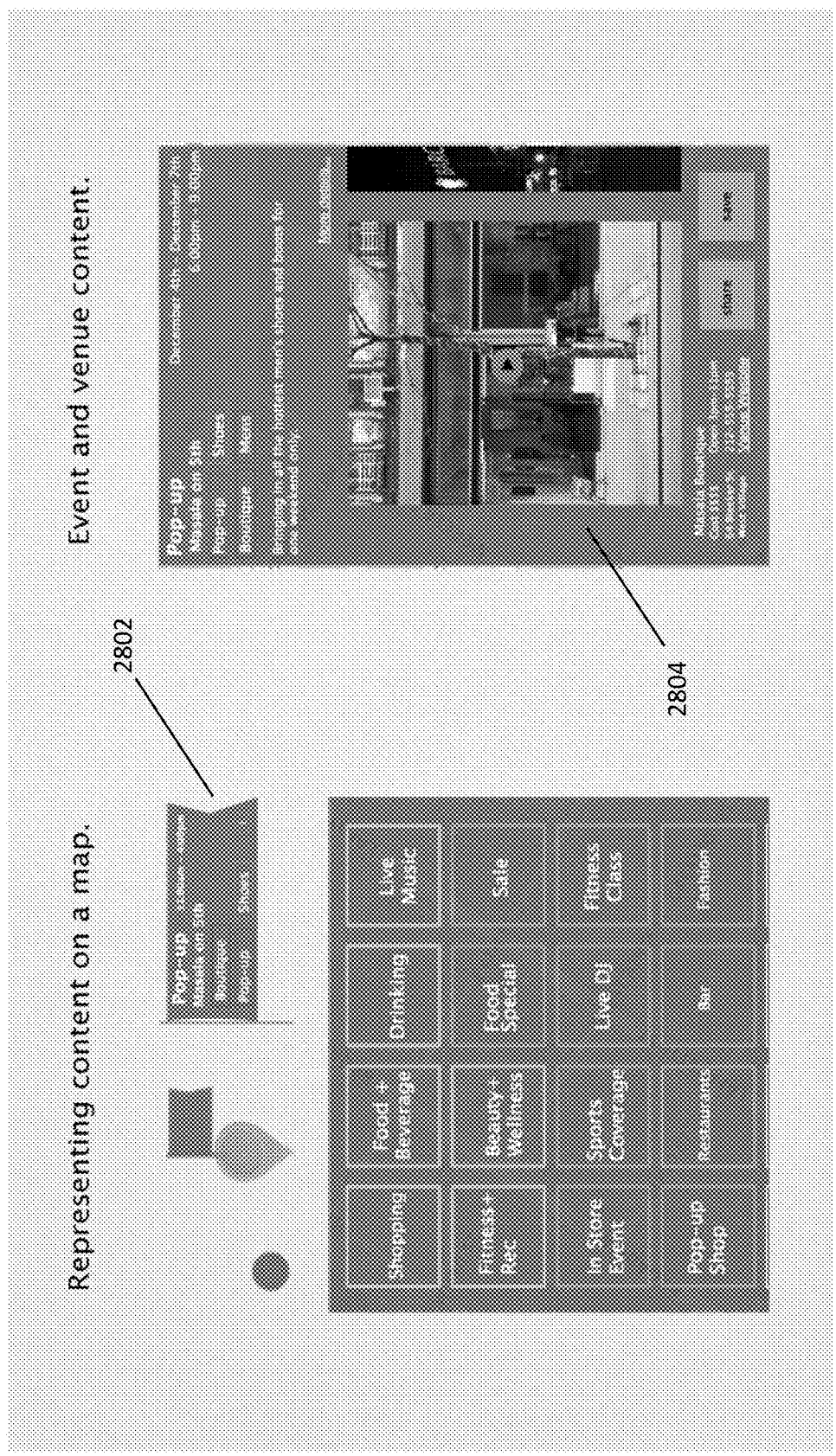
FIG. 28 illustrates an example of how content can be represented on a map interface for a system and device incorporating aspects of the disclosed embodiments.

FIG. 28 illustrates one embodiment of how content may be represented on a map view incorporating aspects of the disclosed embodiments. In this example, the relevant tag appears as a pop-up 2802. A more detailed view of the event and venue content corresponding to the pop-up can then be provided, as is shown in window 2804.

Figure 29:
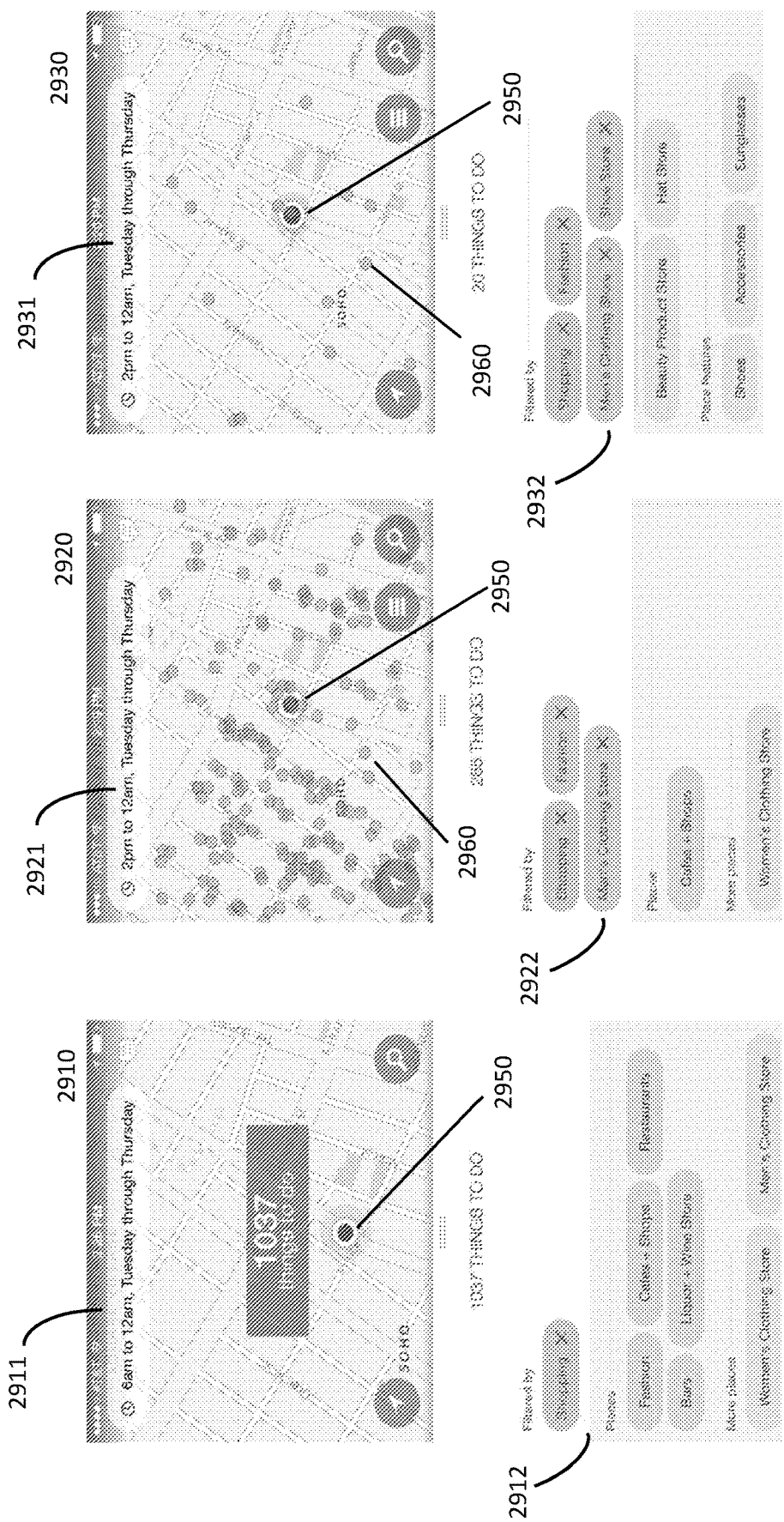
FIG. 29 illustrates an exemplary application of the drill down menu for a system and device incorporating aspects of the disclosed embodiments.

The map interface views in FIG. 29 provides one example of how a user can select multiple categories or tags and drill down in the data in accordance with the aspects of the disclosed embodiments. In this example, map 2910 illustrates a geographical area generally encompassing an approximate location 2950 of the user, or the user's mobile device. A time filter 2911 has been set, for a time period including 6 A.M. to 12 A.M, Tuesday through Thursday. A category filter 2912 has also been set, where the geographical location and time period are filtered by "Shopping." As indicated in map interface 2910, for the time and category filters, there are 1037 identified matches, or "things to do." These 1037 matches generally comprise venues where there is "Shopping", Tuesday through Thursday, from 6 am to 12 am.

Map interface 2920 shown in FIG. 29 illustrates further filtering of the initial map interface 2910. The time filter 2921 is changed to reflect a time period of 2 P.M. to 12 A.M, Tuesday through Thursday. This change can be manually set by the user by adjustment of the time filter 2921, or automatically by the device, if a change in time is detected. For example, in one embodiment, the time filter 2921 can be configured to detect a current time from the device, and then establish a time window of a pre-determined number of hours. Thus, in the example of FIG. 29, if the device detects that the time is 2 pm, the time window can be set for 2 pm to 12 am, or any other suitable time period.

The category filter 2922 reflects the selection of the following categories: Shopping; Fashion and Men's Clothing Store. In this example, the map interface 2920 identifies 265 Things to Do for the particular combination of location, time and category filters. Each venue or place shown in the map interface 2920 is represented by the set of icons, including for example icon 2960, and can be identified by time and location.

The map interface 2930 illustrates an even further refinement, or filtering. In the example of map 2930, the time filter 2931 reflects the time period of 2 P.M. to 12 A.M, Tuesday through Thursday. The category filter 2932 reflects the selection of the following categories: Shopping; Fashion; Men's Clothing Store; and Shoe Store. For this particular filter of location, time and category, there are 20 things to do, as represented by the set of icons, such as icon 2960. Thus, as is illustrated by the examples shown in FIG. 29, as one drills down into the data, the view of the map interface and the underlying map will change.

Figure 30:
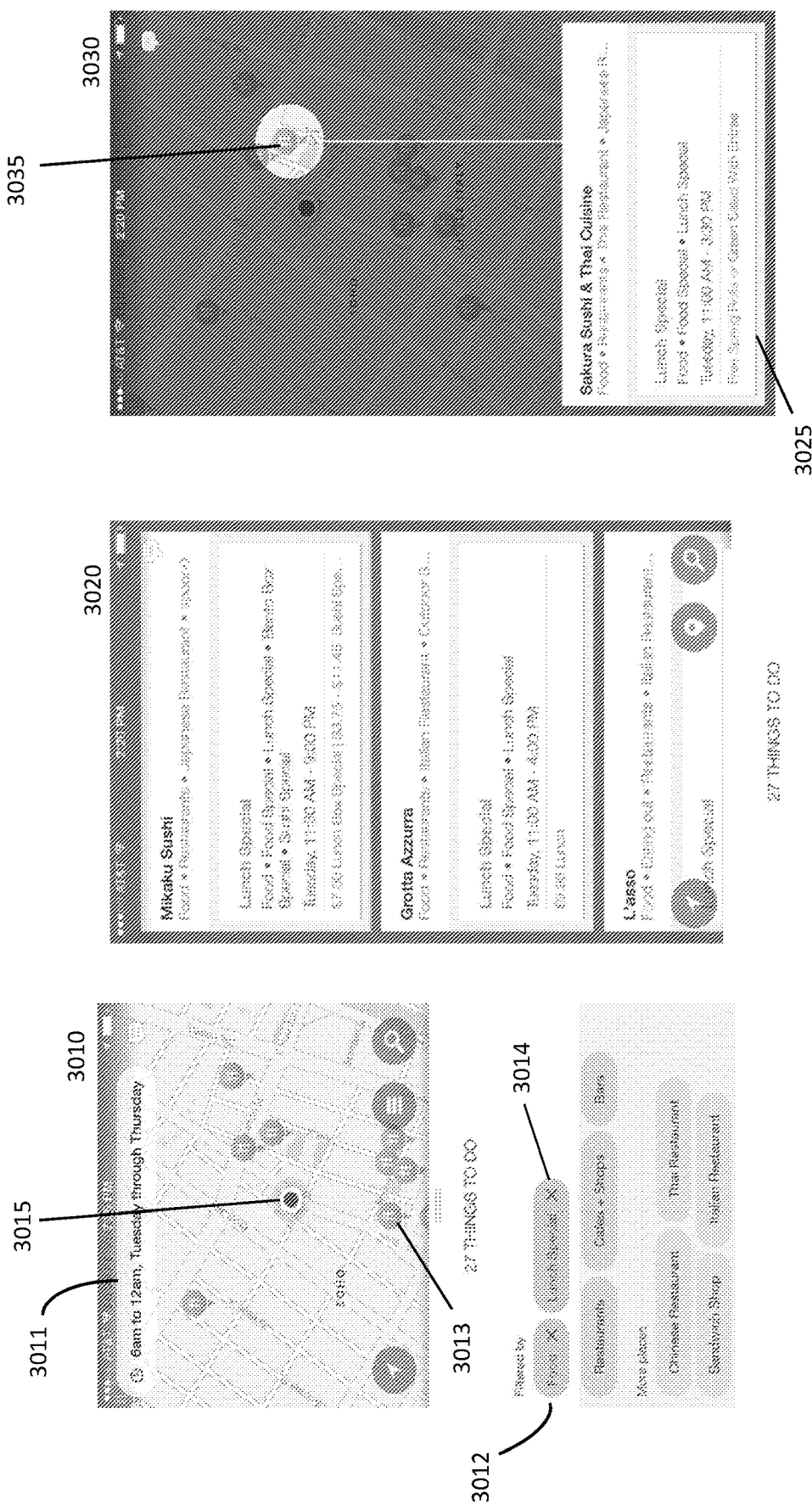
FIG. 30 illustrates the use of a scrollable list for a system and device incorporating aspects of the disclosed embodiments.

FIG. 30 illustrates an example of how the map pins 3013 representing the venues and events, can also be provided in the form of a list or as a single call out. The map 3010 illustrates a number of map pins 3013, which represent the identified venues based on the location, time and category filters. The time filter is shown in field 3011. The location filter corresponds to a geographical area surrounding location 3015. The category filter 3012 is based on the selection of the tag or filters Food 3012 and Lunch Special 3014.

The map interface view 3010 can also be presented in the form of a list, as is shown by the list view 3020. In this example, each venue is presented in the form of a scrollable list. In the map interface view 3030 of FIG. 30, a venue identified by icon 3035 is selected and a single call out or pop-up window 3025 is presented. The call out 3025 provides details associated with the venue identified by icon 3035.

Figure 31:
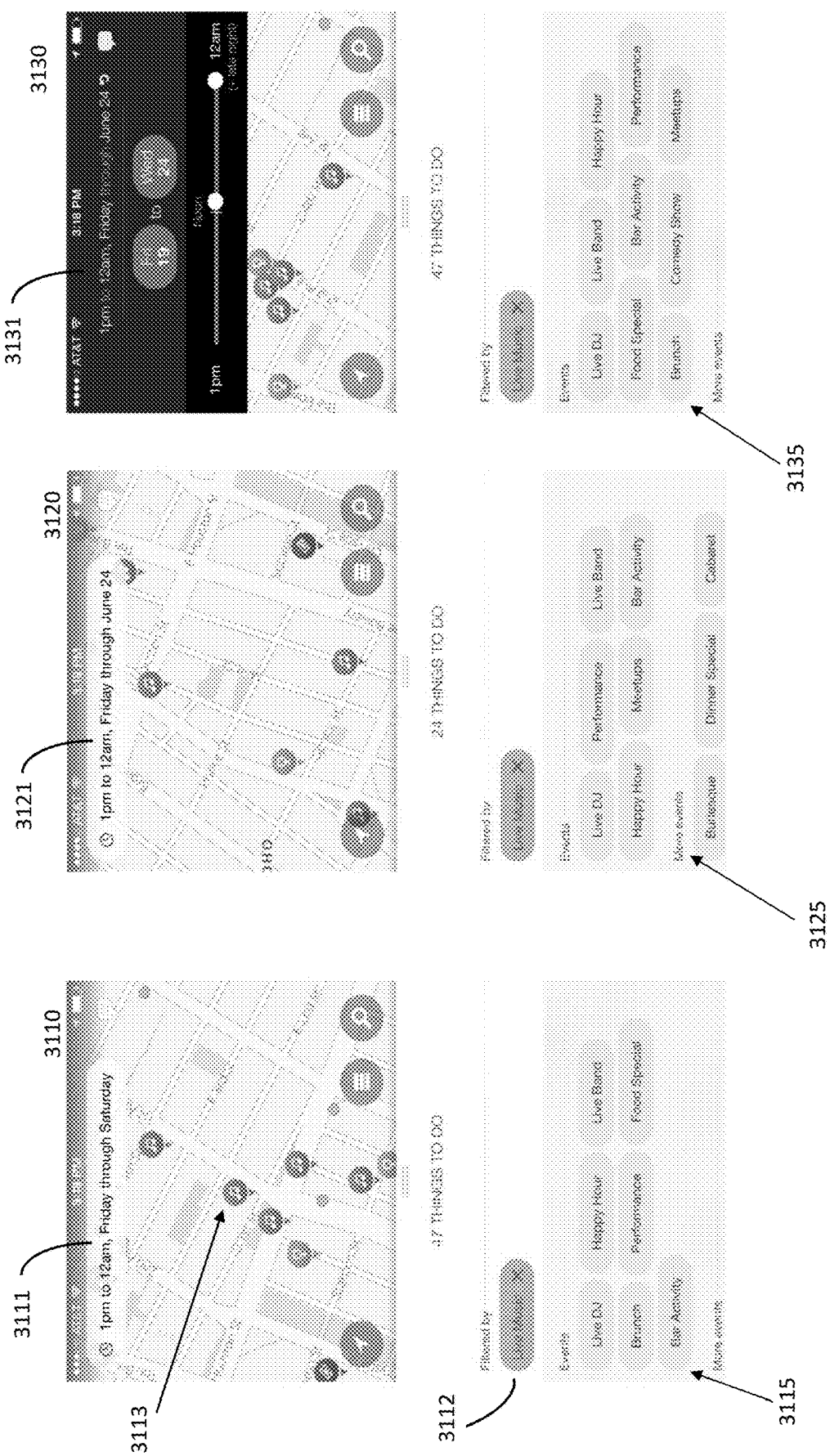
FIG. 31 illustrates the application of a time filter for a system and device incorporating aspects of the disclosed embodiments.

Referring to FIG. 31, in this example, map 3110 identifies 47 Things to Do, or events for the given filters of location, time and category. The map 3110 is filtered by selection of the "Live Music" tag 3112 for the time period of 1 pm to 12 am, Friday through Saturday as shown in the time filter window 3111. The corresponding venues are identified by the icons or pins 3113.

In the map interface 3120, the view of the map has changed from that presented in map interface 3110, responsive to changes in the time filter 3121. The time filter window 3121 for map interface 3120 reflects a time period of 1 P.M. to 12 A.M., Friday through June 24. In this example, the particular combination of location, category and time identifies 24 things to do.

The map interface 3130 illustrates another example of a time and date filter 3131. The time and date filter 3131 for the map interface 3130 provides options for adjusting the date window as well as the time window. As the time and date filter 3131 is adjusted, the view on the map interface 3130 will change to present the available events and venues for the particular time period shown in the time and date filter 3121 and the selected tag 3112.

In the example of FIG. 31, the filter selections or options in the filter menu changes as the time window changes. In the filter menu 3115, the event filter options include Live DJ, Happy Hour, Live Band, Brunch, Performance, Food Special and Band Activity. In filter menu 3125, the available event filters include Live DJ, Performance, Live Band, Happy Hour, Meetups, Bar Activity, Burlesque, Dinner Specials and Cabaret. In the exemplary filter menu 3135, the available filter options include Live DJ, Live Band, Happy Hour, Food Special, Bar Activity, Performance, Brunch, Comedy Show and Meetups. These examples illustrate how the filter menus 3115, 3125 and 3135 are modified or changed to reflect what is available at a given time, or give time period, as determined by the dataset based on the location, tag and time filters. The data objects represented in each of the respective map interfaces 3110, 3120 and 3130 will also change to reflect the possible venues and venues with events.

Figure 32A:
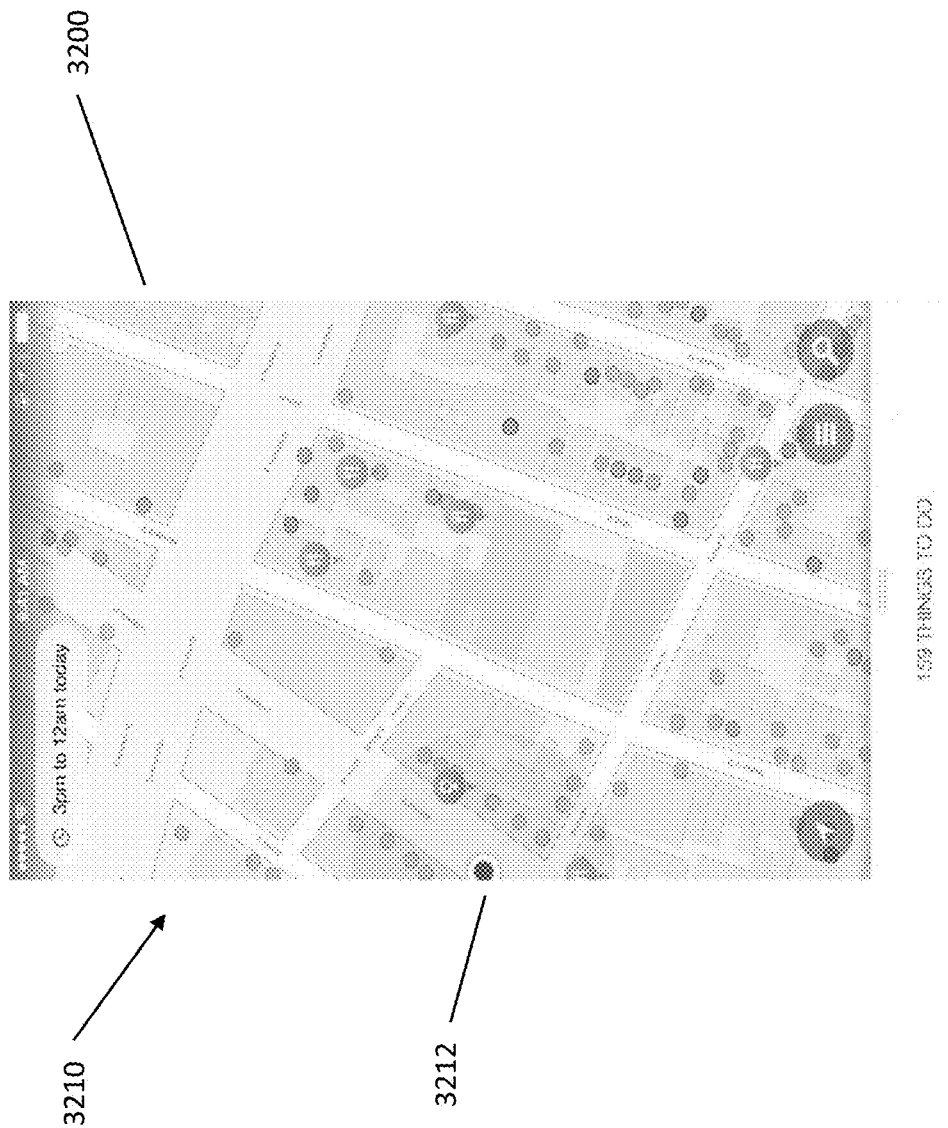
FIGS. 32A-32P are screen shots on a device illustrating the use of an application incorporating aspects of the disclosed embodiments.
Figure 32B:
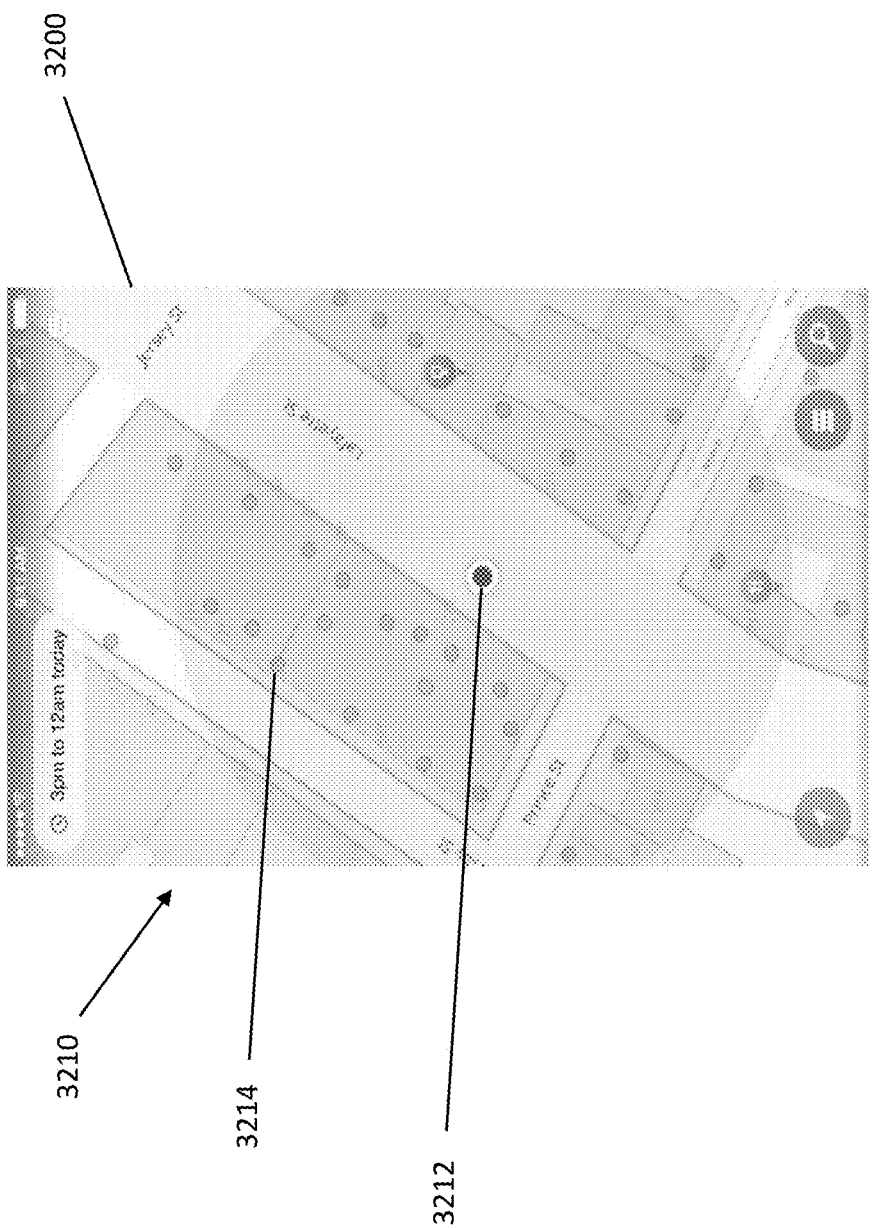
Figure 32C:
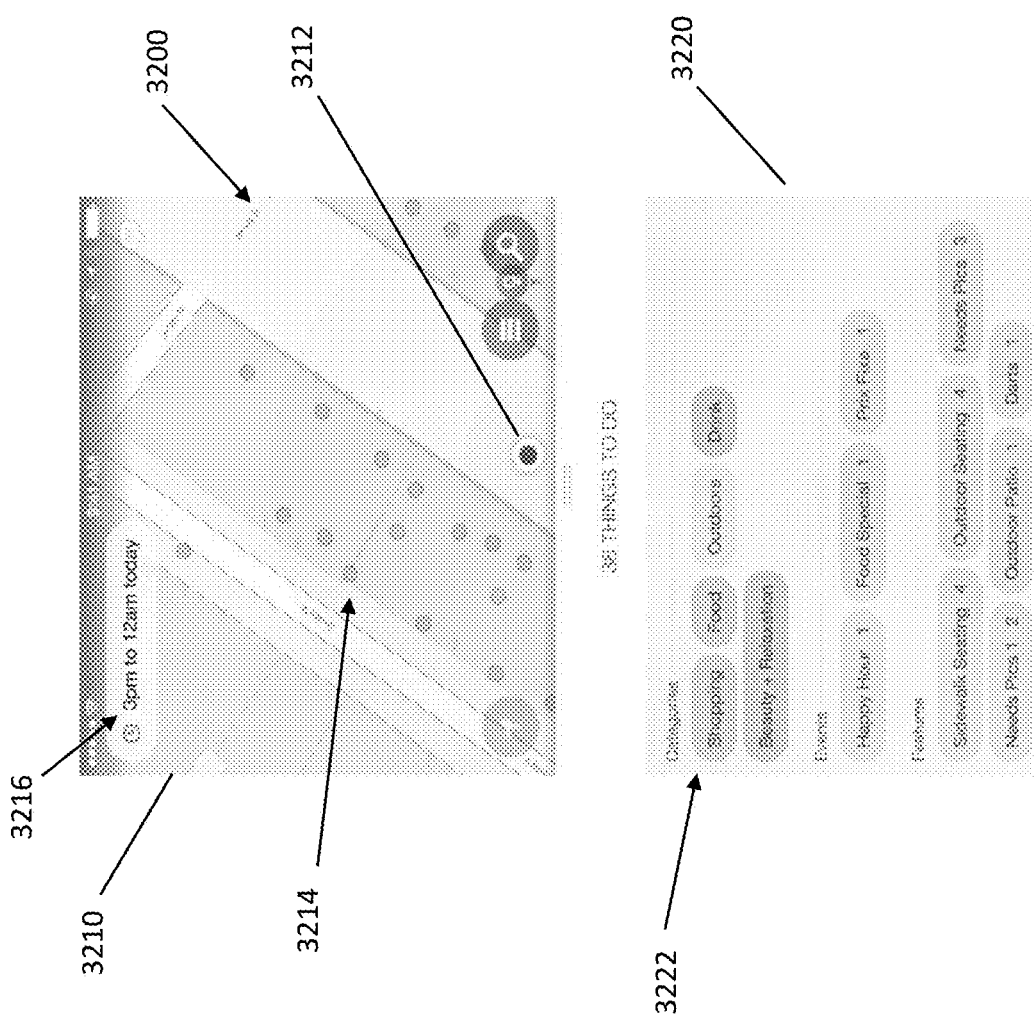
Figure 32D:
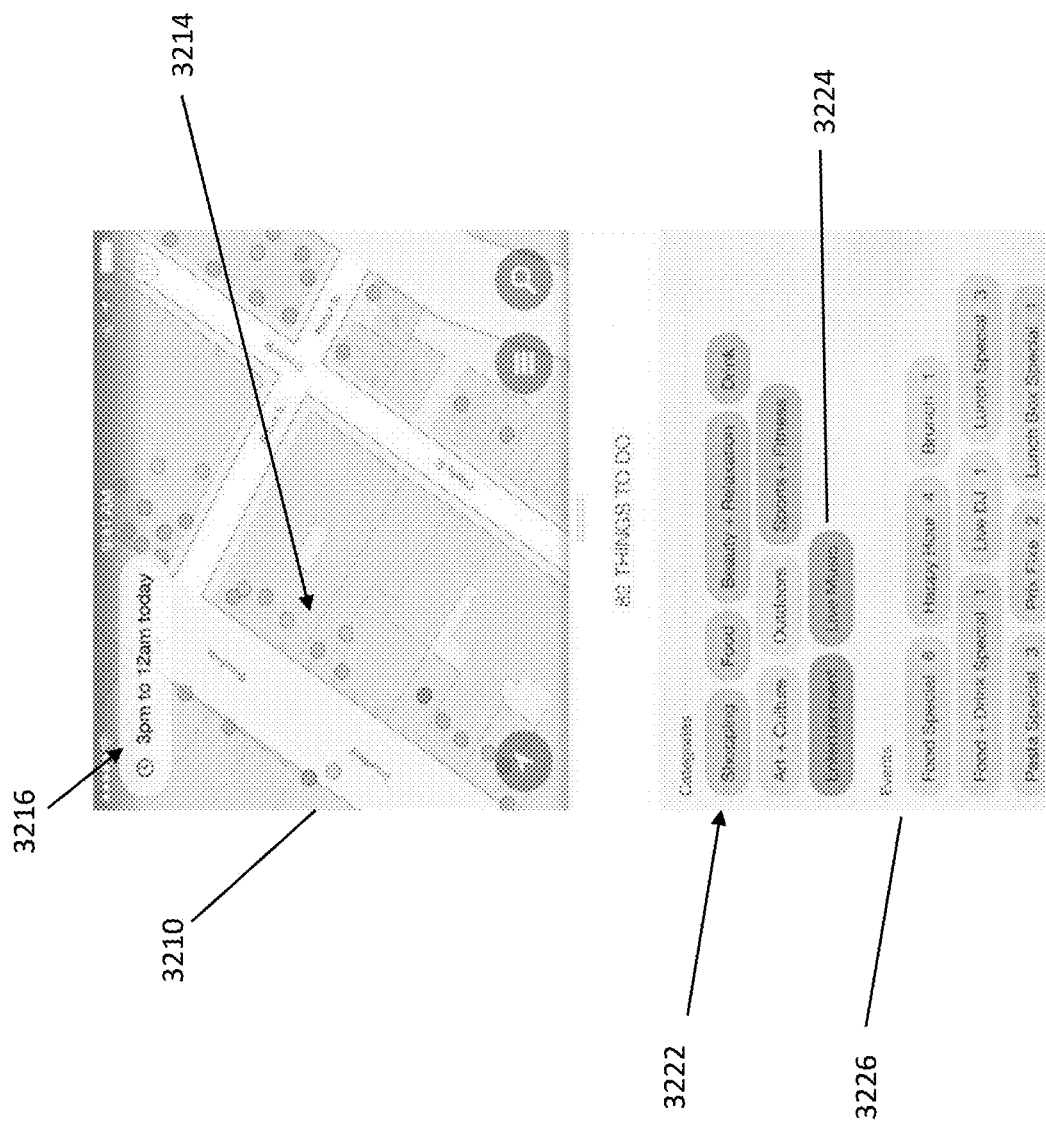
Figure 32E:
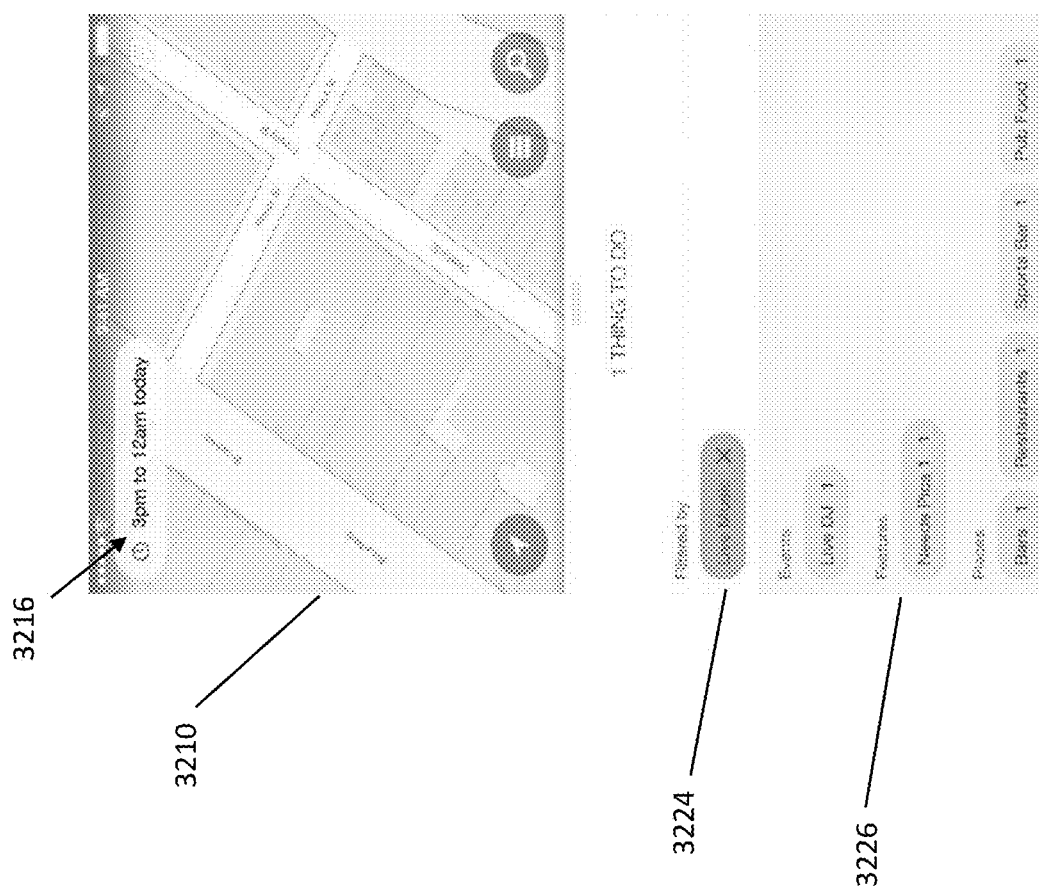
Figure 32G:
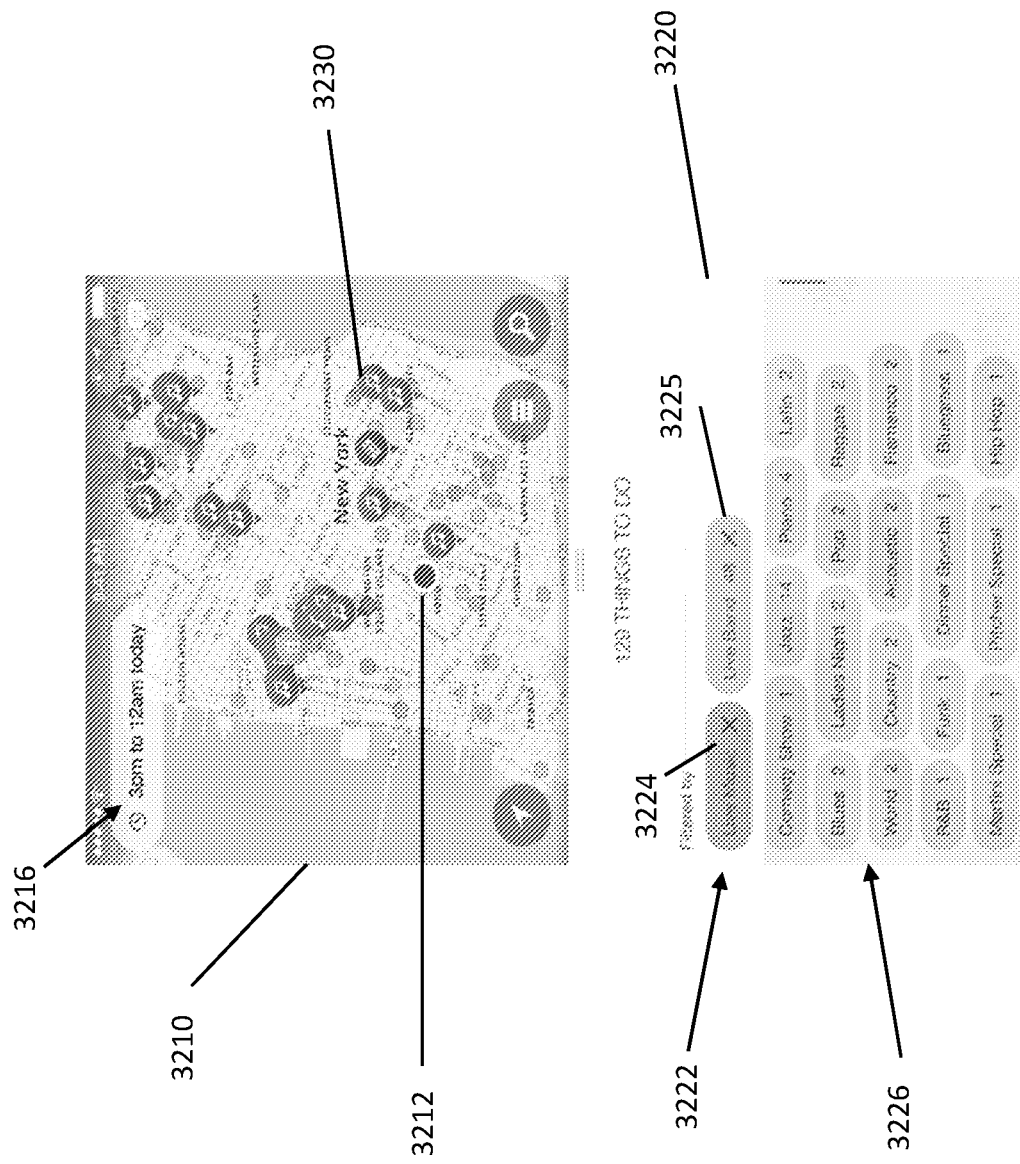
Figure 32H:
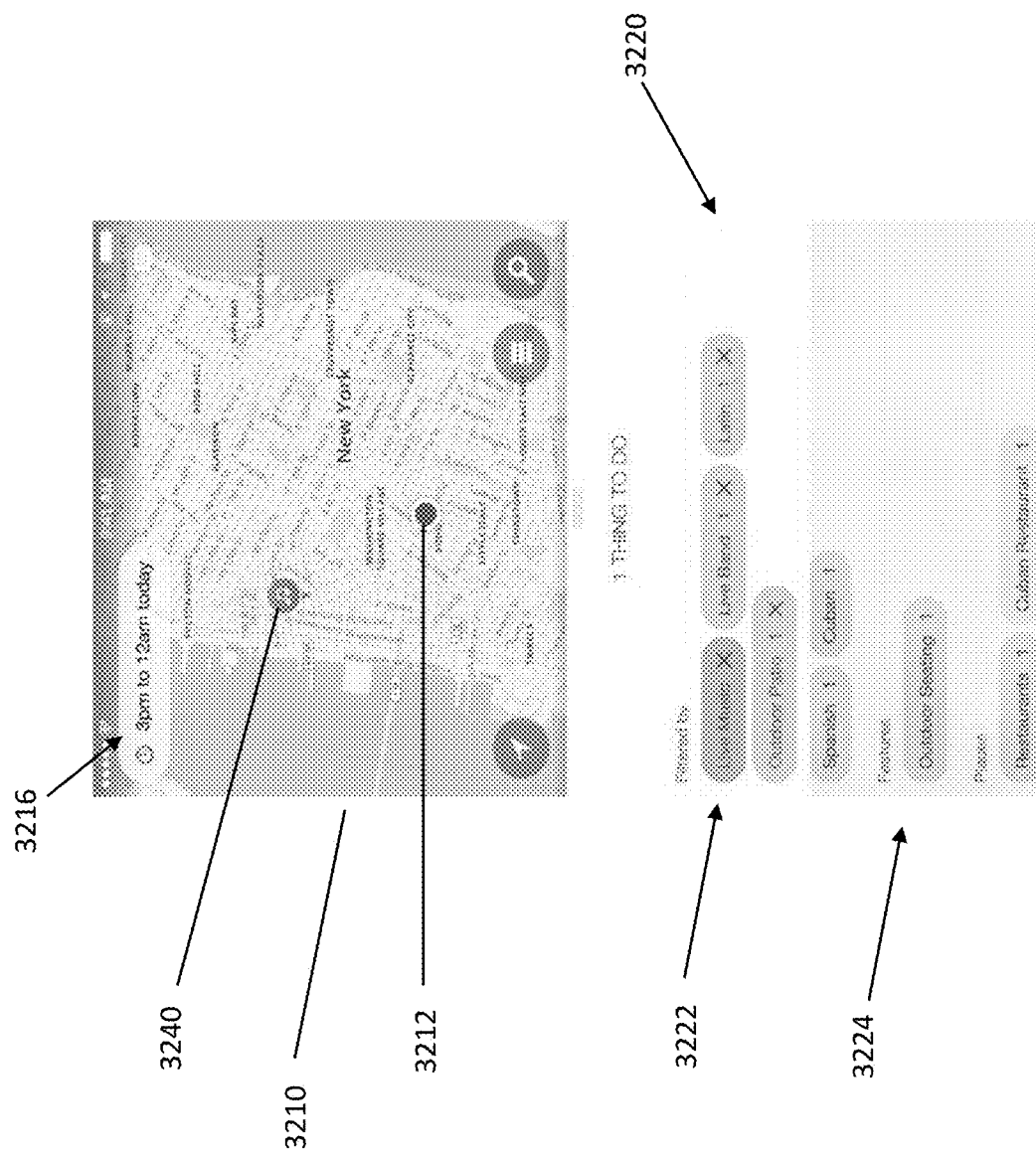
Figure 32I:
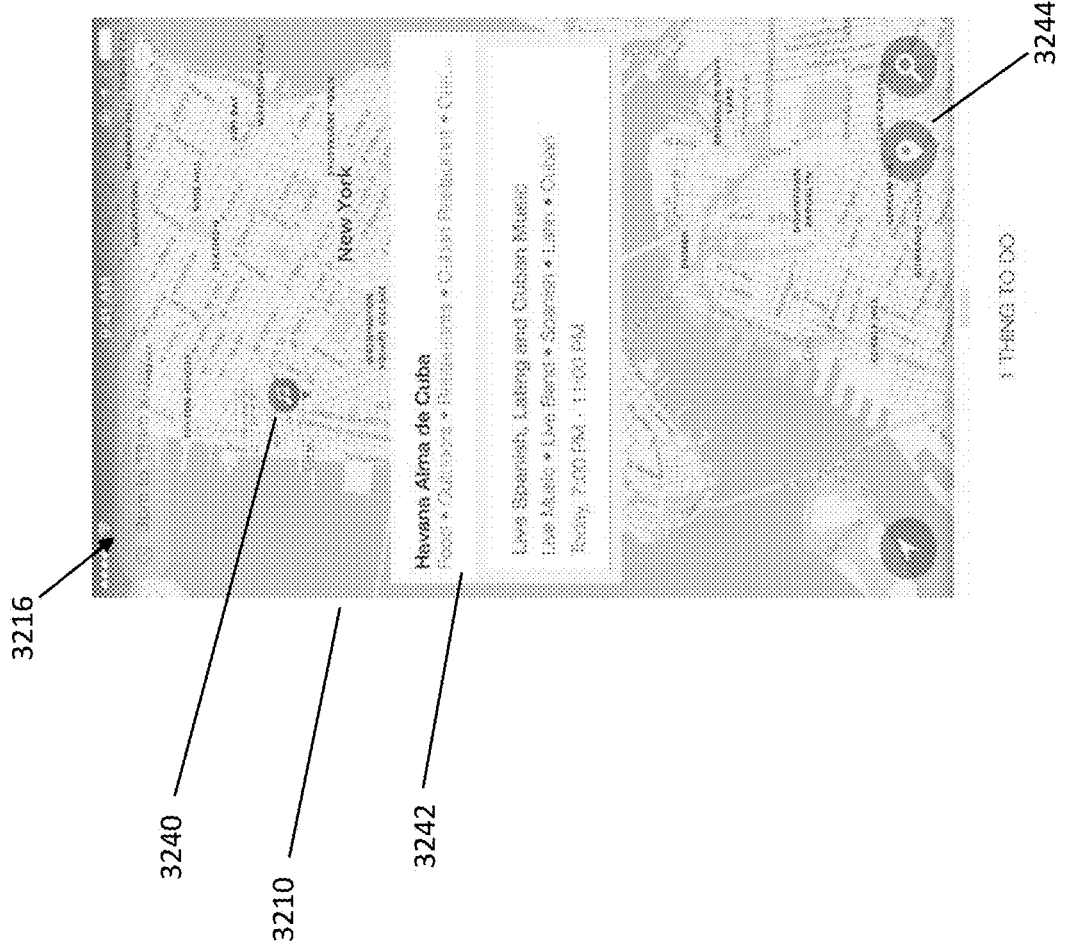
Figure 32J:
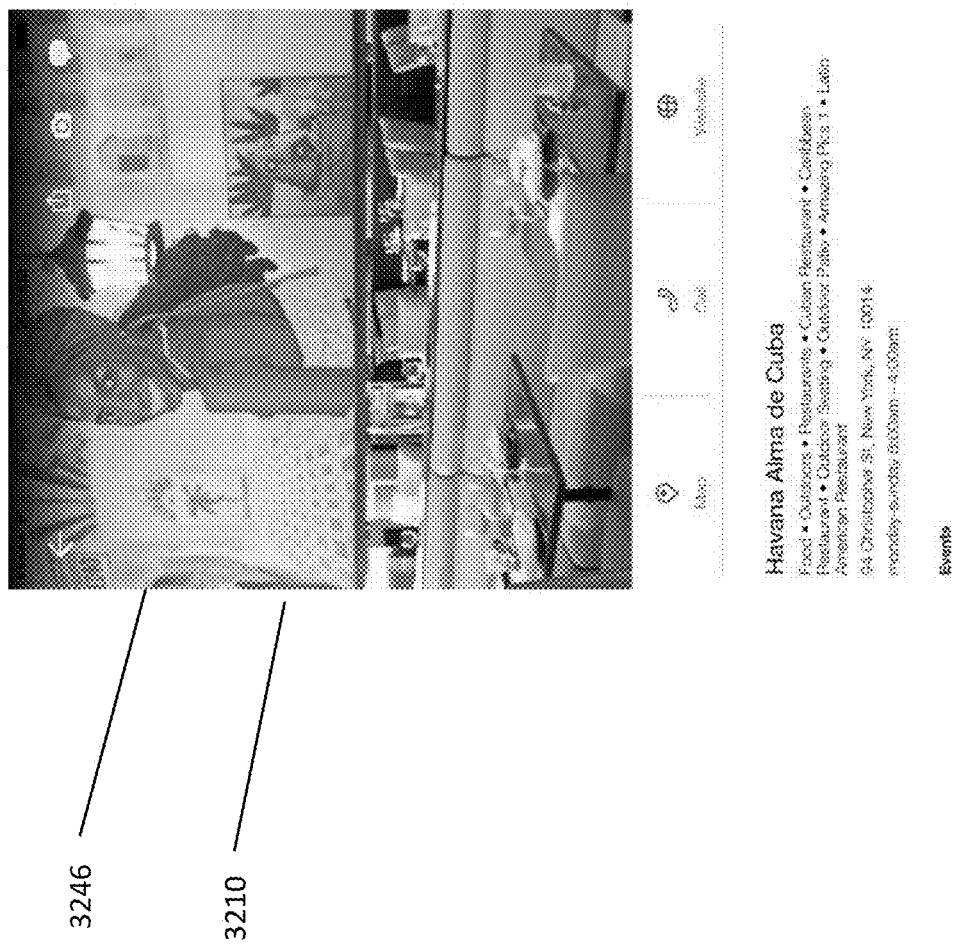
Figure 32K:
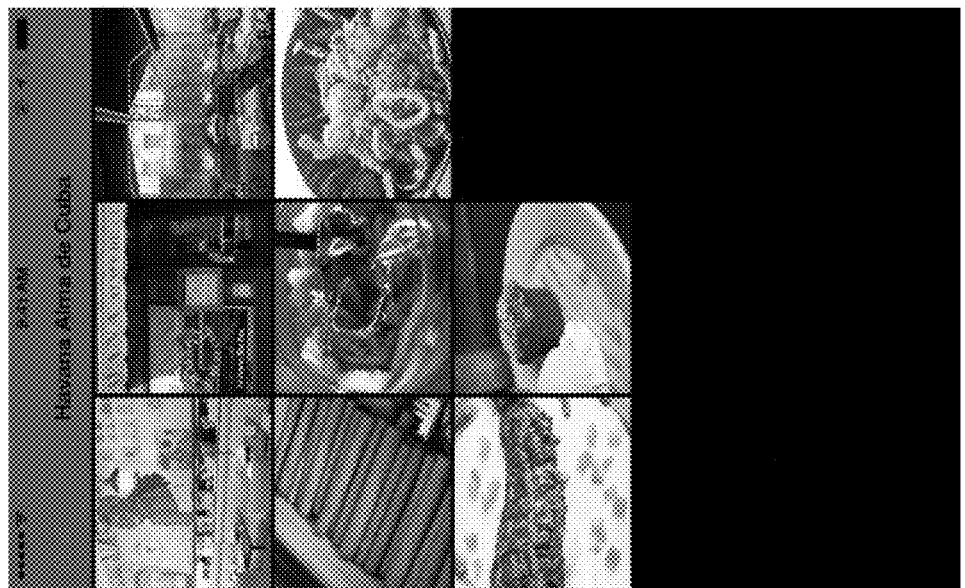
Figure 32L:
Figure 32M:
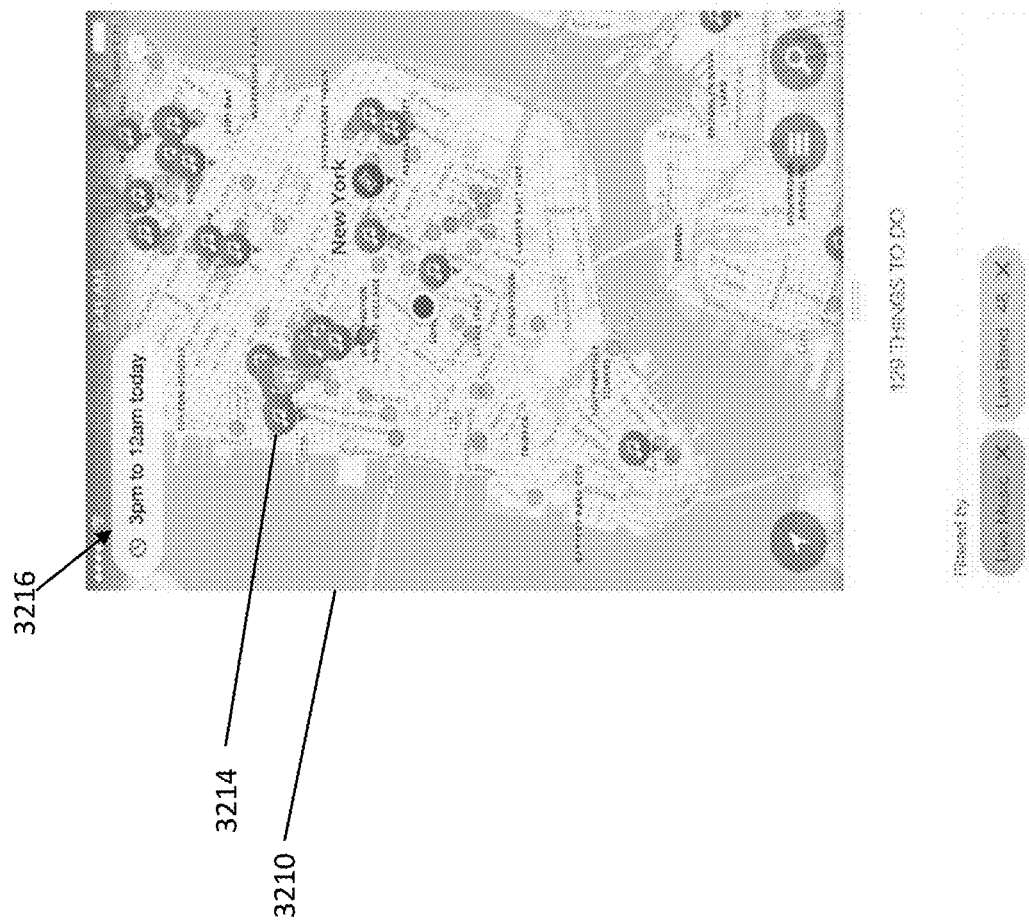
Figure 32N:
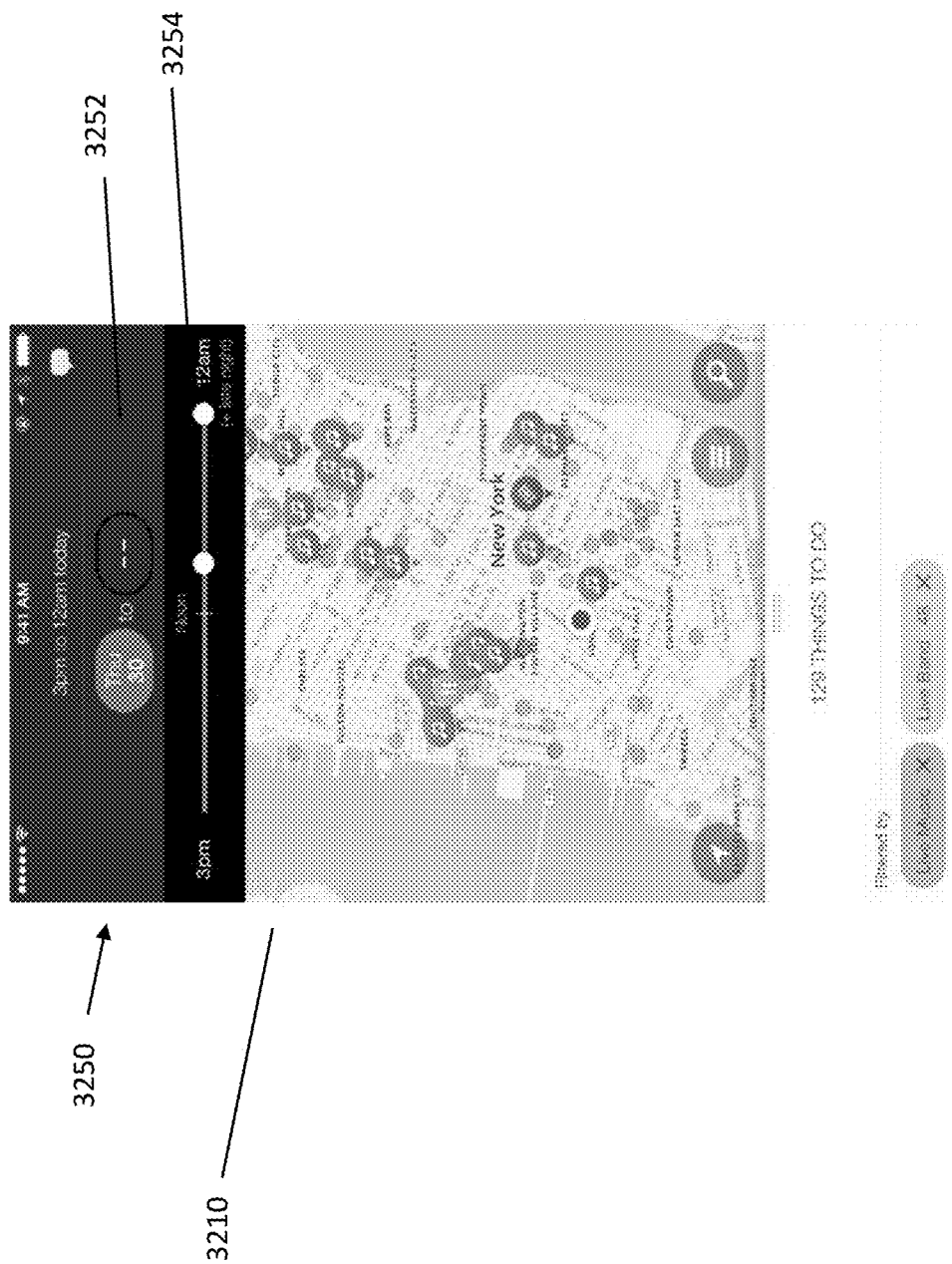
Figures 1, 32O:
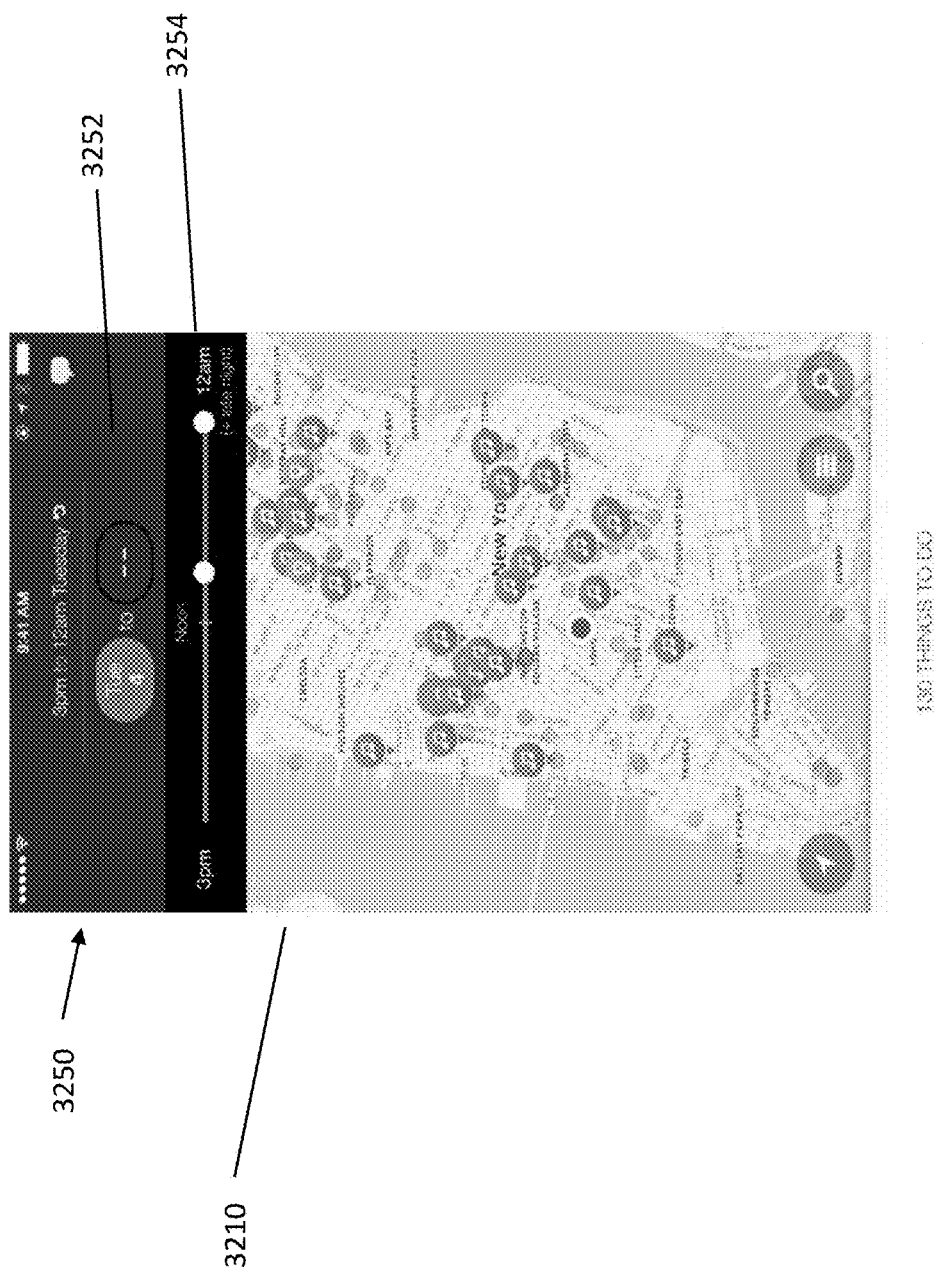
Figures 2, 32O:
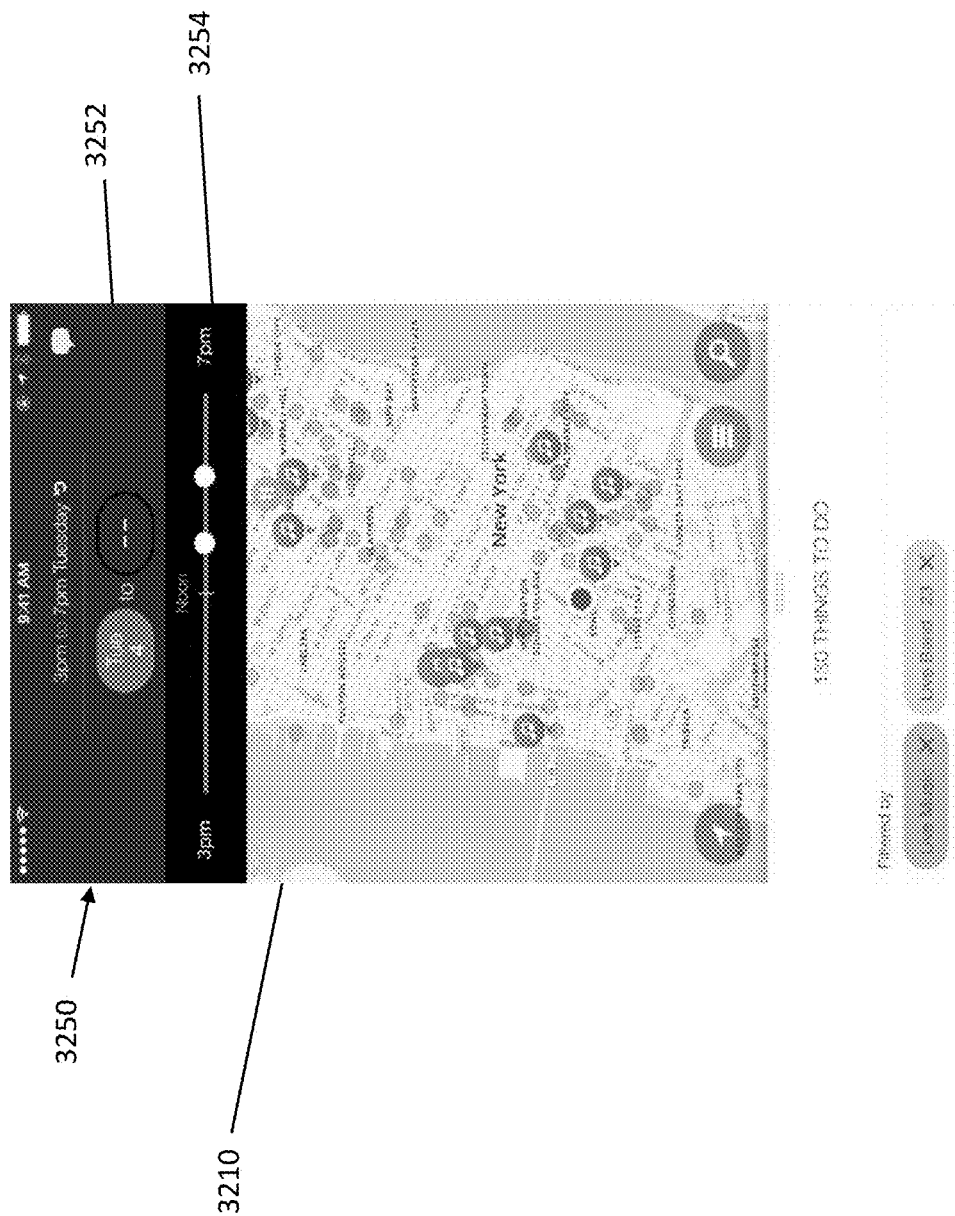
Figure 32P:
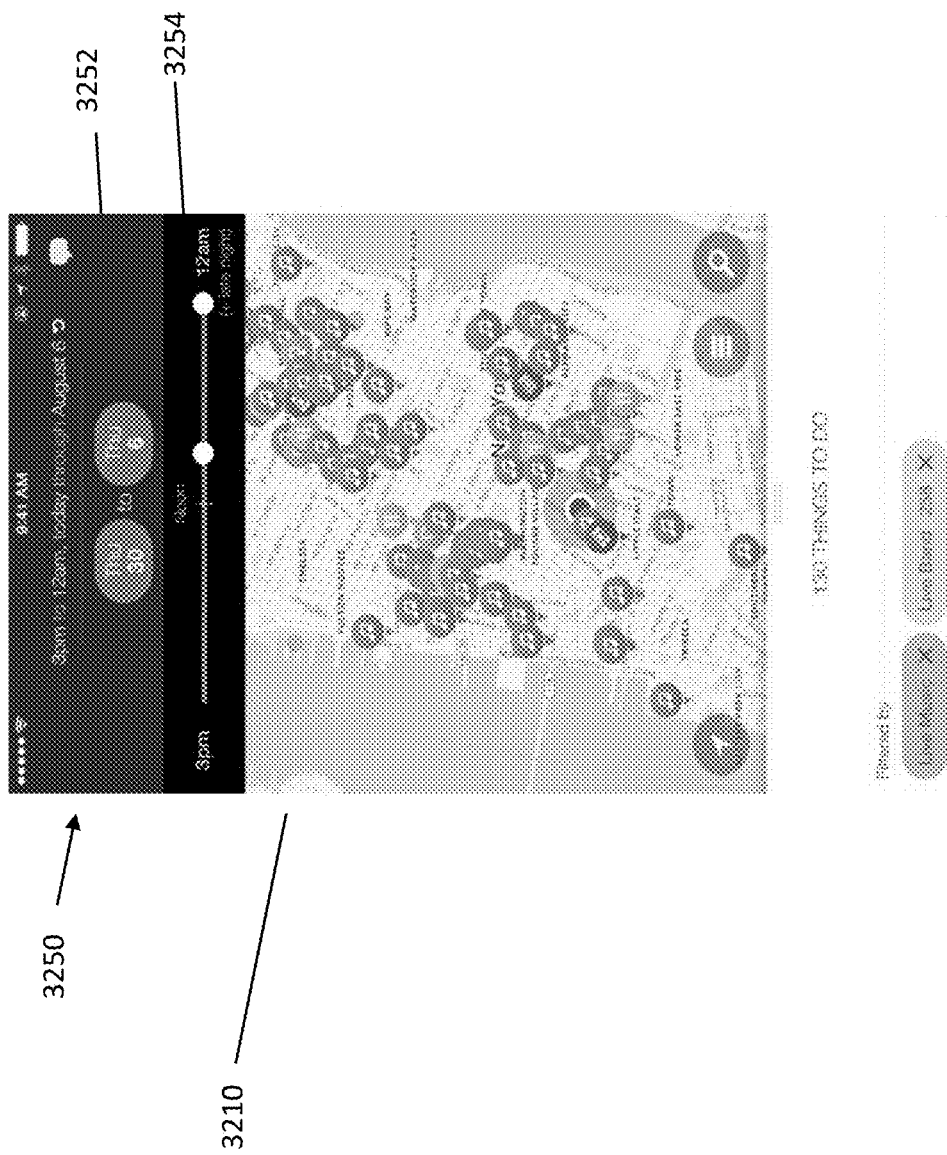

Referring to FIGS. 32A-32P, one embodiment of a process incorporating aspects of the disclosed embodiments is illustrated. FIGS. 32A-32P are screen shots from a device incorporating aspects of the disclosed embodiments. Referring to FIGS. 32A and 32B, in one embodiment, the user opens the map interface application of the disclose embodiments, which presents the map interface 3310. The map interface 3210 in this example presented on the viewing portion 3200 of a display of a device, such as a mobile communication device.

In this initial state, the map interface 3210 present venues represented by icons 3314 in the defined polygonal area, filtered by time as shown in the time window 3216. In this example, all possible venues within the given time period and are illustrated. The location of the device is represented by icon 3312, referred to as the location 3312 of the device.

In one embodiment, selection of the icon 3312 allows the user to re-define the polygonal area to be centered on the location of the device, as is shown in FIG. 32B. Relative to the view shown in FIG. 32A, the view in FIG. 32B is zoomed-in to provide a more detailed view of the area surrounding the detected device location 3212.

Referring to FIG. 32B, venues within the display area 3200 of the map 3210 are identified by icons 3314. In this example, the venues are identified with the substantially circular shaped icons 3214. In alternate embodiments, any suitable icon or identifier can be used. In embodiment the icons can be color coded, where the colors represent the different venues and types of venues.

In the example of FIG. 32C, the viewing area or portion 3200 of the display is divided into at least two portions, the map portion 3210 and the feature selection panel portion 3220. In one embodiment, once the possible venues are identified, the feature selection panel 3320 that includes the tags or filter options corresponding to the set of possible venues is presented. The user interface is updated to present the feature selection panel 3320. In this example, the feature selection panel 3220, also referred to as a filter menu or filter panel, is presented along the bottom portion of the map interface 3210. In alternate embodiments, the filter panel 3220 can be presented on any portion of the map interface 3210.

The filter panel 3220 generally includes or list the selection categories and features, also referred to as tags, which can be used to categorize and filter the venues identified by the icons 3214. These categories and filters can include for example, but are not limited to one or more, events, features and places.

In the example of FIG. 32C, venues identified by icons 3214 around the location 3212 are illustrated. The set of icons 3322 in the filter panel 3220 illustrates that the available filters for the illustrated venues are Shopping, Food, Outdoors, Drink and Beauty and Relaxation.

As shown in the example of FIG. 32C, the icons 3222 can be distinguished by one or more of a shape, graphical image, geometric shape, textual reference or color. In alternate embodiments, the icons 3222 can be identified or represented in any suitable manner, other than including shape, graphical image, geometric shape, textual reference or color.

Referring to FIG. 32D, the location is changed, which can be represented by movement of the map presented on the map interface 3210 in a manner that is generally understood. As the location is changed, the area defined by the polygon will change, and the dataset will be redefined. A new or redefined set of venues, represented by icons 3214 will be presented in the new polygonal area of the map interface 3310. As the venues are location and time based, changing the map view will alter the venues corresponding to events during the relevant time period indicated in the time window 3216. As the pins 3214 on the map 3210 change, the icons 3222 in filter panel 3220 will also change to reflect the available filter options corresponding to the venues represented by icons 3214 in this example.

Referring to FIGS. 32D and 32E, selection of an icon in the filter panel 3220, such as Live Music icon 3224, allows one to select and drill down into a particular category. As each filter is selected, the map interface 3210 will re-filter based on the redefined dataset, to show just what is available under the selected filter, or combination of filters, as is illustrated in FIG. 32E. The filters in the filter panel 3220 will also be modified or redefined. In the example of FIG. 32E, the set of icons 3226 illustrates the available filter options for the live music venues presented in the map interface 3310, as further defined by location and time.

Referring to FIG. 32E, the re-filtered map interface 3210, corresponding to the selection of the Live Music icon 3224 of FIG. 32E is illustrated, in a zoomed-out view. By zooming out on the view of the map interface 3210, as shown in FIG. 32F, the number of venues corresponding to the selected live music filter 3224 during the time period indicated in field 3216 is identified by the set of icons 3230 in the viewable display area. In this example, the icons 3230 are in the form of musical notes. The location of the device is indicated by icon 3212 in FIG. 32F.

In the example of FIG. 32G, the filters of "Live Music" 3324 and "Live Band" 3325 are selected. The view of the map interface 3210 in FIG. 32G has been re-filtered to show what is happening, i.e. the venues represented by icons 3330 that are associated with the selected filters or event categories of "Live Music" and "Live Band" during the time period indicated in field 3216.

The portion 3226 of the filter panel 3220 is also redefined to include further filter selection categories corresponding to the Live Music and Live Band filter selections and the venues 3330. These filters can be used to further filter and refine the possible venues. In FIG. 32H, the additional filters of "Latin" 3235 and "Outdoor Patio" 3236 are also selected and part of the filter criteria. The view of the map interface 3210 in FIG. 32H is refiltered and redefined based on the underlying dataset to shown only venues that are relevant to Live Music, Live Band, Latin and Outdoor Patio. As is illustrated in FIG. 32H, there is one venue identified by icon 3240 where there is Latin, Live Music, Live Band and Outdoor Patio occurring during the time period referenced in the time window 3216.

Referring to FIG. 32I, the aspects of the disclosed embodiments enable the user to pull up the details related to one or more of the venues that are identified on the view of the map interface 3210, such as the venue 3240 shown in FIG. 32H. In one embodiment, the user can select the venue icon 3240 to pull up the details, which are presented in the venue information frame or pop-up 3242. In alternate embodiments, the venue information frame or pop-up 3242 can be brought up in any suitable manner, including for example, selecting a location icon 3244 in a menu portion of the map interface 3210, for example. As shown in FIG. 32J, a more detailed venue panel 3246, including a picture of the venue can be presented. Other details and information about the venue 3240 can be provided, including for example one or more pictures, as is illustrated in the image gallery 3248. The images in the image gallery 3248 can be presented individually, in separate windows, or in a gallery form as is shown in FIG. 32K. FIG. 32K shows an example of how the event information might be presented or displayed.

The aspects of the disclosed embodiments also enable a user to provide feedback about a venue, such as posting reviews, photographs and images to the venue information. FIG. 32L illustrates an exemplary image upload screen. The user can take a picture, provide a description and submit the picture and description, which can then be associated with the venue information.

The aspects of the disclosed embodiments also enable viewing and comparing event data at different points or periods of time. Referring to FIG. 32M, the icons 3214 on the view of the map interface 3210 represent the venues corresponding to the filters of Live Music 3324 and Live Band 3325 with corresponding events for the period "3 pm to 12 am today." FIG. 32N illustrates another example of how the relevant time and date may be presented and selected.

In the example of FIG. 32N, the field 3250 includes a date selector 3252 and a time selector 3254. In alternate embodiments, the field 3250 can include any suitable mechanism for selecting and setting a suitable date and time period. Referring to FIG. 32O-1, the date and time is for the following Tuesday during the same time period of 3 pm to 12 am.

In the example of FIG. 32O-1, the view of the map 3210 re-filters or resets to display the event icons 3212 that correspond to the events that will occur on the following Tuesday, from 3 pm to 12 am. The icons 3212 on the view of the map 3210 change, relative to the view of the map 3210 shown in FIG. 32N. FIG. 32O-2 illustrates the results of changing the time, while FIG. 32P illustrates the map view for a period of time over a number of days. Here again, for the particular selection of filters for Live Music and Live Band, on the day and during time period selected in field 3250, the icons 3212 for this particular view of the map interface 3210 identify the venues with corresponding events. The aspects of the disclosed embodiments allow for looking at what occurs on any particular day, at any particular time or during a time period, as well as over a period of one or more days. In this manner, the view of the map interface 3310 will change, whether adjusted by the user, as described above, or automatically, based on the location of the device and a time detected by the device. The view of the map interface 3310 will thus be different at different points in time, even when the polygonal area defining the map interface 3310 remains the same.

In at least one aspect of the disclosed embodiments, the systems and methods disclosed herein may be executed by one or more computers or computing devices, under the control of one or more programs stored on a computer readable medium. FIG. 33 shows a block diagram of a computing apparatus 33400 that may be used to practice aspects of the disclosed embodiments. Although only one computing apparatus is shown, it will be understood that more than one computing apparatus can be implemented.

In at least one exemplary aspect, each of the user devices, servers and other disclosed devices and systems may be implemented using an instance or replica of the computing apparatus 3300 or may be combined or distributed among any number of instances or replicas of computing apparatus 3300. The user devices can comprise computing devices, mobile communication devices, wireless communication devices, smart phones, navigation equipped or enabled devices, tablets and any other such similar or compatible devices.

The computing apparatus 3300 may include computer readable program code stored on at least one computer readable medium 3302 for carrying out and executing the processes and methods described herein. The computer readable medium 3302 may be a memory of the computing apparatus 3300. In alternate aspects, the computer readable program code may be stored in a memory external to, or remote from, the apparatus 3300. The memory may include magnetic media, semiconductor media, optical media, or any media which is readable and executable by a computer. Computing apparatus 3300 may also include a processor 3304 for executing the computer readable program code stored on the at least one computer readable medium 3302. In at least one aspect, computing apparatus may include one or more input or output devices, generally referred to as a user interface 3406, similar to the user interface described above, which may operate to allow input to the computing apparatus 3300 or to provide output from the computing apparatus 3300, respectively. The user interface may include one or more of a display, touch screen, buttons, audio input device and audio output device.

Those skilled in the art will realize that the above-recognized advantages and other advantages described herein are merely exemplary and are not meant to be a complete rendering of all of the advantages of the various embodiments disclosed herein.

Thus, while there have been shown, described and pointed out, fundamental novel features of the invention as applied to the exemplary embodiments thereof, it will be understood that various omissions, substitutions and changes in the form and details of devices and methods illustrated, and in their operation, may be made by those skilled in the art without departing from the spirit and scope of the invention. Further, it is expressly intended that all combinations of those elements, which perform substantially the same function in substantially the same way to achieve the same results, are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A device comprising a processor and a user interface coupled to the processor, wherein the device is configured to execute machine readable instructions that cause the processor to:
    define a polygonal area around a pre-determined point, the point being defined by a latitude and a longitude associated with a current location of the device;
    associate a time window with the polygonal area based on a current time provided by a clock of the device;
    associate a geographical region with the polygonal area;
    specify a desired event type;
    create a dataset identifying one or more events of the desired event type taking place within the geographical region during the time window and one or more venues identified within the geographical region defined by the polygonal area at which an event of the desired event type is taking place during the associated time window;
    output the created dataset to the user interface, wherein the user interface is configured to be updated to present data objects on the user interface corresponding to the identified one or more venues in the created data set and wherein a selection of a data object is configured to generate data specific to an event or a venue that is presented on the user interface; and
    automatically update a presentation of data objects on the user interface as changes are detected in one or more of the location of the device or the current time of the clock of the device to present only data objects or an event corresponding to the specified event type is taking place during the time window associated with the current location of the device and the current time of the clock of the device.

2. The device of claim 1, wherein the device is configured to modify data objects in the dataset that have time-based events occurring during the associated time window.

3. The device of claim 2, wherein the device is configured to modify the data objects by changing an appearance of the data objects on the user interface.

4. The device according to claim 1, wherein the device is configured to generate a filter selection menu on the display of the user interface and detect a selection of one or more filter options from the filter selection menu, wherein upon detection of a selection of one or more of the filter options, the device is configured to update the dataset to include only venues and events to correspond to the detected filter options and cause the user interface to present data objects corresponding to the updated dataset.

5. The device of claim 1, wherein the user interface is a display of a mobile computing device and the generated data objects are presented in a visual form on the display.

6. The device of claim 1, wherein the user interface is an audio enabled device and the generated data objects are presented in an audible form.

7. The device of claim 1, further comprising a filter selection device, the filter selection device configured to receive an input to apply one or more filters to the one or more venues in the created data set and wherein the processor is configured to execute machine readable instructions based on the applied one or more filters to redefine the created dataset, wherein the device is configured to reconfigure the data objects presented on the user interface device to present the data objects corresponding to the redefined data set.

8. The device of claim 1, wherein the one or more events are linked to a latitude, a longitude and a time.

9. The device of claim 8, wherein the processor is configured to automatically update the created dataset based on a change in time, and output the updated dataset to the output device.

10. The device of claim 8, wherein the processor is configured to automatically update the created dataset based on a change in the latitude and longitude of the pre-determined point around which the polygonal area is defined.

11. The device of claim 10, wherein the processor is configured to re-define the polygonal area based on the change in the latitude and longitude of the pre-determined point.

12. The device of claim 1, wherein the processor is configured to identify at least one event within the defined polygonal area, the at least one event being linked to a latitude, a longitude and a time, and output an instruction to the output device to generate a data object corresponding to the at least one event.

13. The device of claim 12, wherein the user interface presents the data object on a display, the polygonal area being presented on the display and the data object located within the polygonal area.

14. The device of claim 1, wherein the user interface comprises a display, and the device is configured to cause the output device to present the data objects on the display, wherein the data objects correspond to the one or more venues, the one or more venues defined by a latitude and longitude within the geographical region defined by the polygonal area.

15. The device according to claim 14, wherein the device is configured to cause the user interface to change an appearance of one or more of the data objects presented on the display, the one or more data objects with the changed appearance corresponding to venues with events occurring during the associated time window.

16. The device according to claim 15, wherein the device is configured to generate a filter selection menu on the display of the output device and detect a selection of one or more filter options from the filter selection menu, wherein upon detection of a selection of one or more of the filter options, the device is configured to generate at least another dataset of venues and events that correspond to the associated time window and the selected one or more filter options and cause the output device to change an appearance of the display to show only data objects from the another dataset.

17. The device according to claim 16, wherein the device is configured to limit a number of data objects included in the another dataset based on one or more of a type of venue and a type of event based on detection of a selection of one or more of the filter options on the filter selection menu.

18. The device according to claim 16, wherein the device is configured to adjust the time window to a new time window and reconfigure the data objects in the third dataset to present only data objects associated with the new time window.

19. A method of reconfiguring an event based display, comprising executing one or more machine readable instructions by a processor of a device, wherein execution of the instructions causes the device to:

define a polygonal area around a pre-determined point, the point being defined by a latitude and a longitude associated with the current location of the device;

associate a time window with the polygonal area based on a current time provided by a clock of the device;

associate a geographical region with the polygonal area;

specify a desired event type;

create a dataset identifying one or more events of the desired event type taking place within the geographical region during the time window and one or more venues identified within the geographical region defined by the polygonal area at which an event of the desired event type is taking place during the associated time window;

output the created dataset to the user interface, wherein the user interface is configured to be updated to present data objects on the user interface corresponding to the identified one or more venues in the created data set and wherein a selection of a data object is configured to generate data specific to an event or a venue that is presented on the user interface; and automatically update a presentation of data objects on the user interface of the device as changes are detected in one or more of the location of the device or the current time of the clock of the device to present only data objects or an event corresponding to the specified event type is taking place during the time window associated with the current location of the device and the current time of the clock of the device.

20. The method according to claim 19, wherein execution of the machine readable instructions by the device causes the device to generate a filter selection menu on the display of the user interface and detect a selection of one or more filter options from the filter selection menu, wherein upon detection of a selection of one or more of the filter options, the device is configured to redefine the dataset to include only venues and events corresponding to the detected filter options and cause the user interface to update the user interface to present data objects corresponding to the updated dataset.

* * * * *